United States Patent
Tanaka

(10) Patent No.: US 12,333,118 B2
(45) Date of Patent: Jun. 17, 2025

(54) DISPLAY DEVICE WITH TOUCH AND FINGERPRINT SENSOR

(71) Applicant: MIKUNI ELECTRON CORPORATION, Saitama (JP)

(72) Inventor: Sakae Tanaka, Saitama (JP)

(73) Assignee: MIKUNI ELECTRON CORPORATION, Saitama (JP)

( * ) Notice: Subject to any disclaimer, the term of this patent is extended or adjusted under 35 U.S.C. 154(b) by 0 days.

(21) Appl. No.: 18/307,845

(22) Filed: Apr. 27, 2023

(65) Prior Publication Data

US 2023/0259243 A1    Aug. 17, 2023

Related U.S. Application Data

(63) Continuation of application No. PCT/JP2021/040143, filed on Oct. 29, 2021.

(30) Foreign Application Priority Data

Oct. 30, 2020   (JP) .................................. 2020-182821

(51) Int. Cl.
G06F 3/044    (2006.01)
G02F 1/1362   (2006.01)
G02F 1/1365   (2006.01)

(52) U.S. Cl.
CPC ...... G06F 3/0446 (2019.05); G02F 1/136218 (2021.01); G02F 1/136286 (2013.01); G02F 1/1365 (2013.01)

(58) Field of Classification Search
CPC ............. G06F 3/0446; G02F 1/136218; G02F 1/136286; G02F 1/1365
See application file for complete search history.

(56) References Cited

U.S. PATENT DOCUMENTS 10,204,563 B2   2/2019  Takahashi et al.
10,345,977 B2   7/2019  Kimura et al.
(Continued)

FOREIGN PATENT DOCUMENTS

CN      104520790 A    4/2015
JP      2005-331902 A  12/2005
(Continued)

OTHER PUBLICATIONS

International Search Report issued in Patent Application No. PCT/JP2021/040143 dated Feb. 1, 2022.
(Continued)

Primary Examiner — Ke Xiao
Assistant Examiner — Jennifer L Zubajlo
(74) Attorney, Agent, or Firm — MCDONALD HOPKINS LLC

(57) ABSTRACT

A display device with a touch and fingerprint sensor includes a display part including a plurality of data signal lines, at least one first sensor electrode, a terminal part including a first terminal, and a second terminal, and a switching circuit disposed between the display part and the terminal part and including one input terminal and a plurality of output terminals, and dividing an input signal input to the one input terminal to the plurality of output terminals. The one input terminal is connected to the first terminal, the plurality of data signal lines is connected to the plurality of output terminals, and the at least one first sensor electrode is connected to the second terminal.

14 Claims, 86 Drawing Sheets

(56) References Cited

U.S. PATENT DOCUMENTS

| | | | |
|---|---|---|---|
| 10,572,043 B2 | 2/2020 | Kim et al. | |
| 10,741,621 B2 | 8/2020 | Choo et al. | |
| 10,866,663 B2 | 12/2020 | Jun et al. | |
| 10,936,126 B2 | 3/2021 | Lee et al. | |
| 11,385,739 B2 | 7/2022 | Kurasawa et al. | |
| 2005/0237441 A1* | 10/2005 | Hotta | G02F 1/1368 349/43 |
| 2014/0111466 A1* | 4/2014 | Kim | G06F 3/0412 345/174 |
| 2015/0205170 A1 | 7/2015 | Tanaka et al. | |
| 2016/0202791 A1 | 7/2016 | Bae et al. | |
| 2017/0123566 A1* | 5/2017 | Noguchi | G06F 3/041661 |
| 2017/0212624 A1* | 7/2017 | Katsuta | G06F 3/0446 |
| 2017/0371462 A1 | 12/2017 | Kim et al. | |
| 2018/0107301 A1 | 4/2018 | Kimura et al. | |
| 2018/0164933 A1 | 6/2018 | Jun et al. | |
| 2018/0260062 A1 | 9/2018 | Ji et al. | |
| 2018/0321766 A1* | 11/2018 | Akimoto | G06F 3/0412 |
| 2019/0324580 A1* | 10/2019 | Tanaka | H10K 59/12 |
| 2020/0133414 A1* | 4/2020 | Lee | G06F 3/044 |
| 2021/0173545 A1 | 6/2021 | Kurasawa et al. | |
| 2021/0407385 A1* | 12/2021 | Ikeda | G09F 9/33 |
| 2022/0013063 A1 | 1/2022 | Ikeda et al. | |
| 2023/0259243 A1* | 8/2023 | Tanaka | G06F 3/0412 345/173 |

FOREIGN PATENT DOCUMENTS

| | | |
|---|---|---|
| JP | 2010-243769 A | 10/2010 |
| JP | 2015-187754 A | 10/2015 |
| JP | 2016-059041 A | 4/2016 |
| JP | 2017-084138 A | 5/2017 |
| JP | 2017-134592 A | 8/2017 |
| JP | 2018-005910 A | 1/2018 |
| JP | 2018-067308 A | 4/2018 |
| JP | 2018-085114 A | 5/2018 |
| JP | 2018-190193 A | 11/2018 |
| JP | 2019-191212 A | 10/2019 |
| JP | 2020-030767 A | 2/2020 |
| KR | 10-2015-0067476 A | 6/2015 |
| KR | 10-2018-0001677 A | 1/2018 |
| KR | 10-2018-0065735 A | 6/2018 |
| KR | 10-2020-0049959 A | 5/2020 |
| WO | 2020-183861 A1 | 9/2020 |
| WO | 2020/196788 A1 | 10/2020 |

OTHER PUBLICATIONS

Written Opinion issued in Patent Application No. PCT/JP2021/040143 dated Feb. 1, 2022.
English translation of written Opinion issued in Patent Application No. PCT/JP2021/040143 dated Feb. 1, 2022.
Japanese Office Action issued in Japanese Patent Application No. 2022-559279 dated Jan. 9, 2024.
Decision of Refusal issued on May 28, 2024 for Japanese application No. 2022-559279.
Reconsideration Report by Examiner before Appeal issued on Sep. 5, 2024 for Japanese Application No. 2022-559279.
Decision to Grant a Patent issued on May 7, 2025 for Japanese application No. 2024-145479.
Office Action issued on May 8, 2025 for Korean application No. 10-2023-7015557.

* cited by examiner

DISPLAY DEVICE WITH TOUCH AND FINGERPRINT SENSOR

CROSS-REFERENCE TO RELATED APPLICATIONS

This application is a Continuation of International Patent Application No. PCT/JP2021/040143, filed on Oct. 29, 2021, which claims the benefit of priority to Japanese Patent Application No. 2020-182821, filed on Oct. 30, 2020, the entire contents of which are incorporated herein by reference.

FIELD

An embodiment of the present invention relates to a display device with a sensor capable of detecting biological information such as fingerprints, palm prints in addition to its function as a touch sensor.

BACKGROUND

To prevent unauthorized use and protect personal information, the development of electronic devices that identify users through biometric identification is underway. For example, a display device having a fingerprint authentication sensor on the back of a display panel in which pixels are formed with an organic light emitting diode is disclosed (refer to Japanese Laid-Open Patent Publication No. 2018-085114). A touch sensor is also disposed on the display panel to disclose a display device capable of recognizing fingerprints and touch pressures (refer to Japanese Laid-Open Patent Publication No. 2018-005910).

The market needs for portable electronics, where display screens occupy the entire front of the device, are to allow fingerprint authentication anywhere on the display screen to enhance functionality. In response to this need, there is a problem that a display device, such as disclosed in Japanese Laid-Open Patent Publication No. 2018-085114, cannot detect fingerprints throughout the screen because a sensor for fingerprint authentication is mounted as a small discrete component. If you try to make fingerprint authentication possible on all screens, the casing becomes larger.

On the other hand, the display device disclosed in Japanese Laid-Open Patent Publication No. 2018-005910 has the problem of significantly increasing the number of connecting terminals for the input/output of signals due to the complete separation of the circuitry for performing image display and the circuitry for driving the fingerprint sensor. The dimensions of the display panels are determined by the electronics to be mounted, and the location where the connecting terminal can be located is limited. Accordingly, when adding a terminal that outputs the signals of the fingerprint sensor in addition to the connecting terminal for inputting the video signals, it is necessary to narrow the pitch of the connecting terminal. However, when the pitch of the terminal electrodes is narrowed, it becomes difficult to connect the flexible wiring board using a conventional anisotropic conductive film (ACF), resulting in a decrease in yield.

SUMMARY

A display device with a touch and fingerprint sensor in an embodiment according to the present invention includes a display part including a plurality of data signal lines, at least one first sensor electrode, a terminal part including a first terminal and a second terminal, and a switching circuit disposed between the display part and the terminal part, including one input terminal and a plurality of output terminals, and dividing an input signal input to the one input terminal to the plurality of output terminals. The one input terminal is connected to the first terminal, the plurality of data signal lines is connected to the plurality of output terminals, and the at least one first sensor electrode is connected to the second terminal.

A display device with a touch and fingerprint sensor in an embodiment according to the present invention includes a first sensor electrode extending in a first direction and a second sensor electrode extending in a second direction intersecting the first direction, a scanning signal line extending in the second direction, a pixel overlapping the second sensor electrode, and a transistor disposed in the pixel. A gate electrode of the transistor is connected to the scanning signal line, and the scanning signal line is connected to the second sensor electrode.

DESCRIPTION OF EMBODIMENTS

Hereinafter, embodiments of the present invention are described with reference to the drawings. However, the present invention can be implemented in many different aspects, and should not be construed as being limited to the description of the following embodiment. For the sake of clarifying the explanation, the drawings may be expressed schematically with respect to the width, thickness, shape, and the like of each part compared to the actual aspect, but this is only an example and does not limit the interpretation of the present invention. For this specification and each drawing, elements similar to those described previously with respect to previous drawings may be given the same reference sign (or a number followed by A, B, etc.) and a detailed description may be omitted as appropriate. The terms "first" and "second" appended to each element are a convenience sign used to distinguish them and have no further meaning except as otherwise explained.

As used herein, where a member or region is "on" (or "below") another member or region, this includes cases where it is not only directly on (or just under) the other member or region but also above (or below) the other member or region, unless otherwise specified. That is, it includes the case where another component is included in between above (or below) other members or regions.

First Embodiment

This embodiment shows an example of a display device in which a display part and a touch and a fingerprint sensor are disposed over each other.

1-1. Configuration of Display Device with Touch and Fingerprint Sensor

Figure 1:
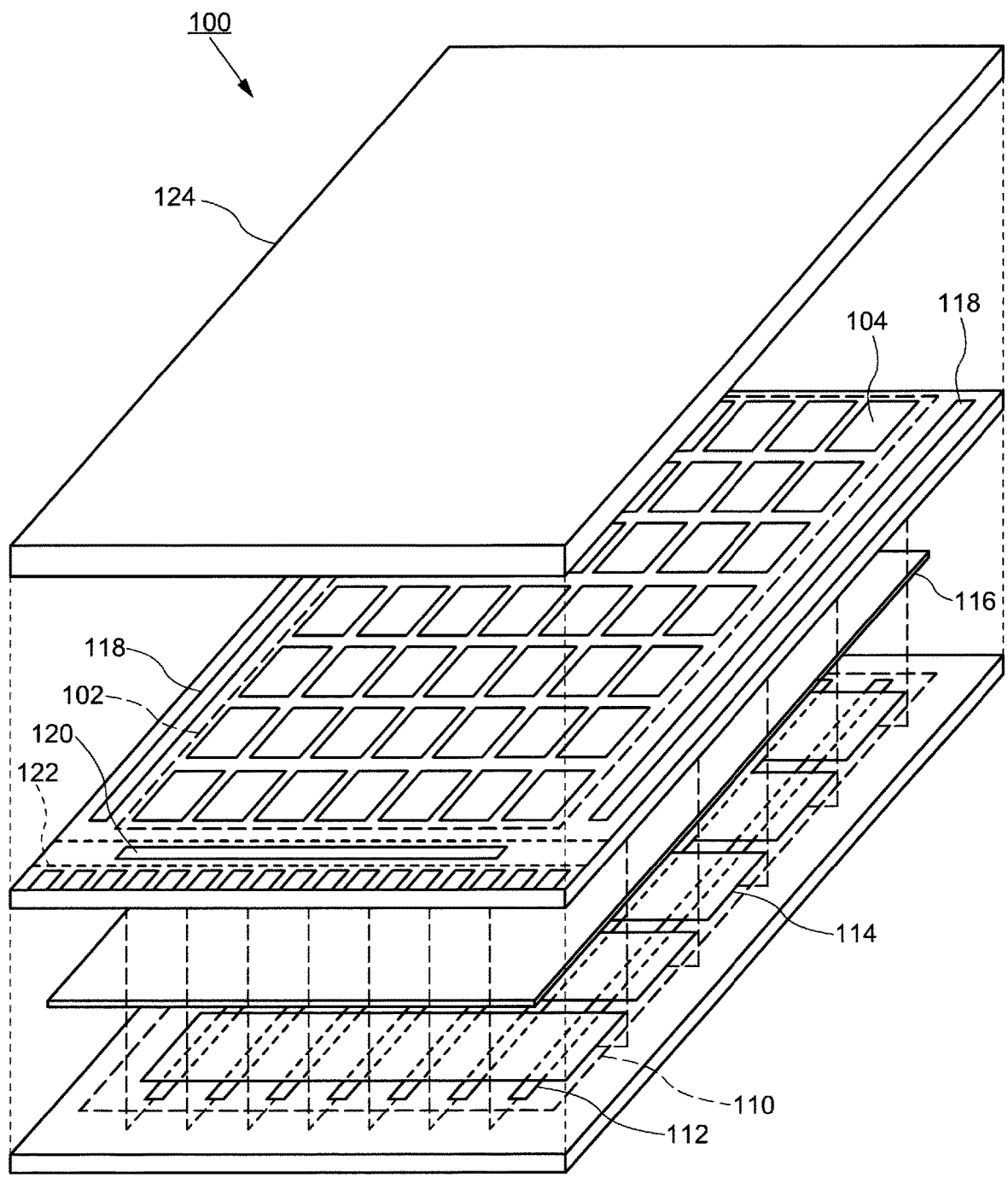
FIG. 1 is a developed view of a display device with a touch and fingerprint sensor according to an embodiment of the present invention.

FIG. 1 shows an expanded view of a display device with a touch and fingerprint sensor 100 according to an embodiment of the present invention. The display device with a touch and fingerprint sensor 100 includes a display part 102 with a plurality of pixels 104 arranged therein and a touch and fingerprint sensor 110 including at least one first sensor electrode 112 and at least one second sensor electrode 114. A shield electrode 116 is disposed between the display part 102 and the touch and fingerprint sensor 110.

The at least one first sensor electrode 112 is arranged to extend in a Y direction and the at least one second sensor electrode 114 is arranged to extend in an X direction. The at least one first sensor electrode 112 includes a plurality of first sensor electrodes (hereinafter similarly labeled "112") and the plurality of first sensor electrodes 112 are arranged in the X direction. The at least one second sensor electrode 114 includes a plurality of second sensor electrodes (hereinafter similarly labeled "114") and the plurality of second sensor electrodes 114 are arranged in the Y direction. The plurality of first sensor electrodes 112 and the plurality of second sensor electrodes 114 are arranged to intersect an insulating layer (not shown in the figure).

An outer region of the display part 102 is disposed with a first drive circuit 118, a switching circuit 120 (also referred to as a "multiplexer circuit" or a "demultiplexer"), and a terminal part 122. The shield electrode 116 is disposed to electrically isolate the display part 102 from the touch and fingerprint sensor 110. A constant potential (for example, ground potential) is applied to the shield electrode 116.

Each of the plurality of pixels 104 includes a light emitting element. For example, an electroluminescent element (hereinafter referred to as an "EL element") is used as a light emitting element. The EL elements disposed in each of the plurality of pixels 104 are bottom emission type elements that emit light toward the side of the shield electrode 116. The first sensor electrode 112, the second sensor electrode 114, and the shield electrode 116 are translucent. The first sensor electrode 112, the second sensor electrode 114, and the shield electrode 116 are formed of a transparent conductive film. Alternatively, the first sensor electrode 112, the second sensor electrode 114, and the shield electrode 116 may be disposed with openings in accordance with the placement of the plurality of pixels 104.

With such an arrangement, the light emission of the EL elements is emitted through the shield electrode 116 and the touch and fingerprint sensor 110.

The display device with a touch and fingerprint sensor 100 has a configuration for viewing the images displayed on the display part 102 from the side on which the touch and fingerprint sensor 110 is disposed. Since the touch and fingerprint sensor 110 is disposed to overlap the display part 102, the display device with the touch and fingerprint sensor 100 is capable of detecting a touch and fingerprint at any position on the display screen.

A sealing layer 124 may be disposed on the display part 102. The sealing layer 124 is disposed to protect the display part 102, the first drive circuit 118, and the switching circuit 120. A configuration of the sealing layer 124 is optional. For example, the sealing layer 124 is formed of an inorganic insulating film such as a silicon oxide film or a silicon nitride film. The sealing layer 124 may also be formed of a resinous material such as a polyimide resin, an acrylic resin, or an epoxy resin.

Figure 2:
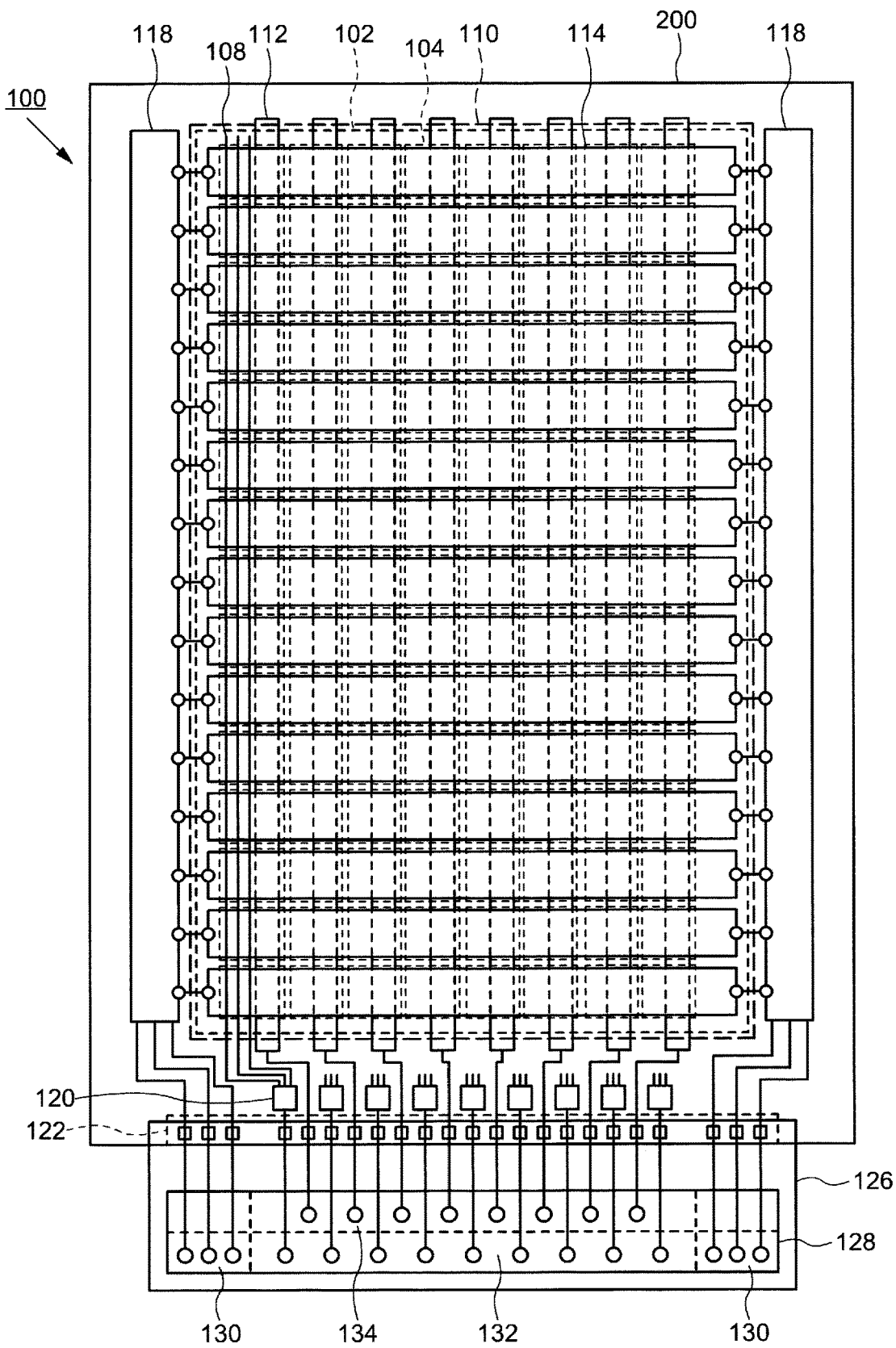
FIG. 2 is a configuration of a display part, a touch and fingerprint sensor part, a switching circuit, and a drive circuit of a display device with a touch and fingerprint sensor according to an embodiment of the present invention.

FIG. 2 shows the display part 102 of the display device with a touch and fingerprint sensor 100 according to the present embodiment, and shows the touch and fingerprint sensor 110, the first drive circuit 118, the switching circuit 120, the terminal part 122, and a second drive circuit 128. The display part 102, the touch and fingerprint sensor 110, the first drive circuit 118, the switching circuit 120, and the terminal part 122 are disposed on a transparent resin substrate 200. The second drive circuit 128 is disposed on a flexible circuit board 126. The second drive circuit 128 is implemented in the flexible circuit board 126 by a COF (Chip on Film) method.

The display part 102 includes the plurality of pixels 104. The plurality of pixels 104 may be arranged in an array such as, for example, a stripe array, a delta array, a "Bayer" array, a "PenTile" array, a "Diamond PenTile" array, or the like. The display part 102 is disposed with a data signal line 108 and a scanning signal line (not shown in the figure). For the plurality of pixels 104 arranged in a first (column) direction and a second (row) direction, the data signal line 108 extends in the first (column) direction and the scanning signal line extends in the second (row) direction intersecting the first direction.

The first drive circuit 118 is disposed in an outer region of the display part 102 (hereinafter referred to as the "peripheral area"). The first drive circuit 118 is connected to a scanning signal line not shown in the figure. The first drive circuit 118 is disposed along one side of the display part 102. The plurality of data signal lines 108, not shown, are arranged in the first direction (column direction) and connected to the switching circuit 120.

The terminal part 122 with an array of a plurality of connecting terminals is disposed at one end of the transparent resin substrate 200. The switching circuit 120 is disposed in an area between the display part 102 and the terminal part 122. The switching circuit 120 has the ability to distribute one input to a plurality of output terminals. The switching circuit 120 connects one connecting terminal disposed in the terminal part 122 to a plurality of data signal line 108.

The touch and fingerprint sensor 110 includes the plurality of first sensor electrodes 112 extending in the first direction (column direction) and a plurality of second sensor electrodes 114 extending in the second direction (row direction). Each of the plurality of first sensor electrodes 112 is connected to a connecting terminal disposed on the terminal part 122. The plurality of second sensor electrodes 114 are connected to the first drive circuit 118. The plurality of first sensor electrodes 112 and the plurality of second sensor electrodes 114 are arranged to intersect an insulating layer (not shown) and serve as fingerprint sensors and touch sensors.

The flexible circuit board 126 includes wirings that connect the first drive circuit 118, the switching circuit 120, and the first sensor electrode 112 to the second drive circuit 128. The flexible circuit board 126 is connected to the connecting terminal of the terminal part 122 via anisotropic conductive materials. A scanning signal line drive circuit block 130 of the second drive circuit 128 is connected to the first drive circuit 118, a data signal line drive circuit block 132 is connected to the switching circuit 120, and a touch and fingerprint sensor detection circuit block 134 is connected to the first sensor electrode 112.

In the second drive circuit 128, the scanning signal line drive circuit block 130 has the function of outputting a signal for driving the first drive circuit 118 outputting the scanning signal of the display unit 102 and the scanning signal of the touch and fingerprint sensor unit 110, the data signal line drive circuit block 132 has the function of outputting a video signal, and the touch and fingerprint sensor detection circuit block 134 has the function of amplifying the sensing signal output from the first sensor electrode 112 to generate a digital signal as a sensor output.

FIG. 2 shows an example in which the second drive circuit 128 is disposed with a composite integrated circuit (composite IC) that integrates a plurality of circuit blocks into one semiconductor chip. Such a composite integrated circuit can reduce the number of processes compared to mounting individual IC chips, thereby reducing manufacturing costs. Note that the second drive circuit 128 is not limited to this example, and may employ one in which each of the circuit blocks is implemented in a separate integrated circuit.

Figure 3A:
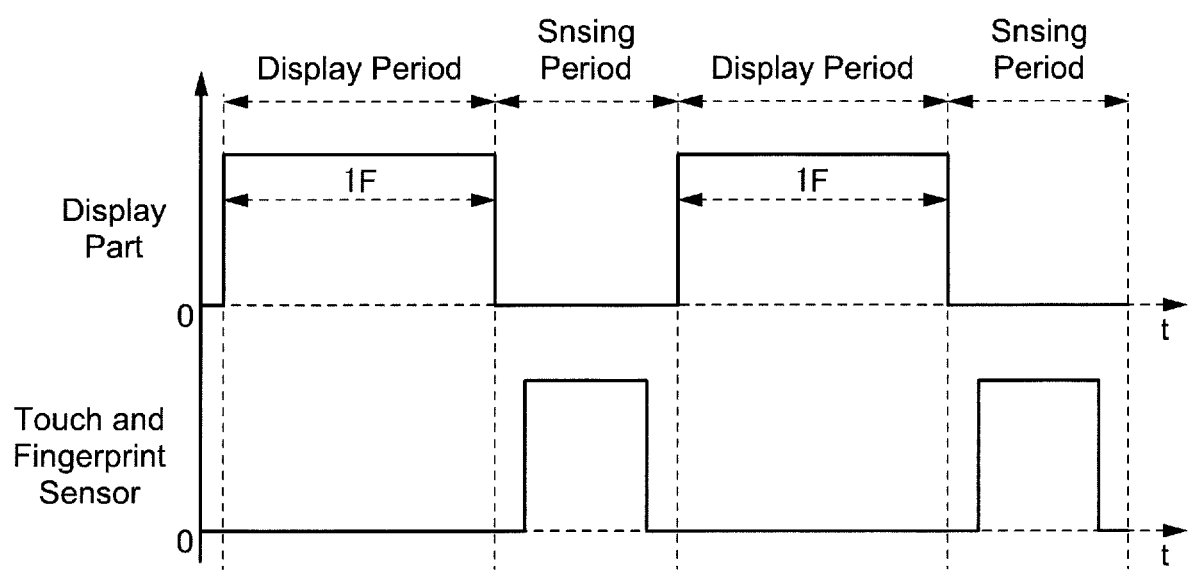
FIG. 3A is a timing chart explaining the operation of a display device with a touch and fingerprint sensor according to an embodiment of the present invention.
Figure 3B:
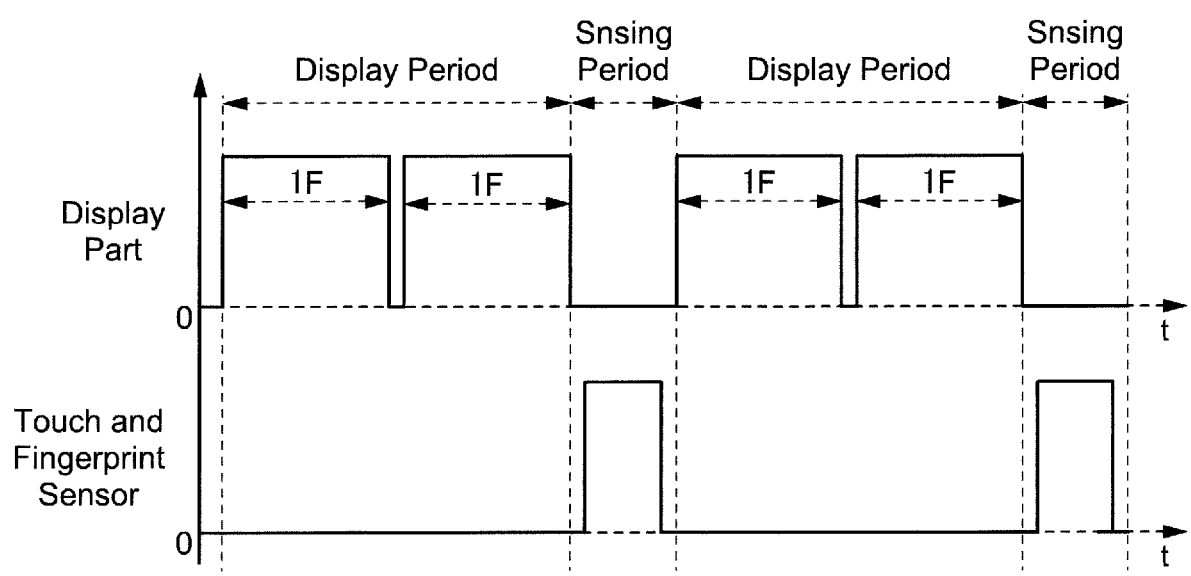
FIG. 3B is a timing chart explaining the operation of a display device with a touch and fingerprint sensor according to an embodiment of the present invention.

FIG. 3A and FIG. 3B shows timing charts of the display device with the touch and fingerprint sensor 100 shown in FIG. 2. The first drive circuit 118 of the display device with the touch and fingerprint sensor 100 serves as the scanning signal line drive circuit for the display part 102 and the scan signal output circuit for the touch and fingerprint sensor unit 110. Thus, the display device with the touch and fingerprint sensor 100 is driven to alternate between the display period and the sensing period.

FIG. 3A shows an example of a sensing period occurring for each display period of one frame. FIG. 3B shows an example of a sensing period occurring at one time during a two-frame display period. The length of the sensing period is optional and can be set shorter than one frame period. Since the frame frequency is 60 Hz or higher, the touch or fingerprint sensing can be performed while displaying the image, with no visual impact on the display part 102, even if there is a sensing period between frames.

1-2. Equivalent Circuit of Pixel

Figure 4:
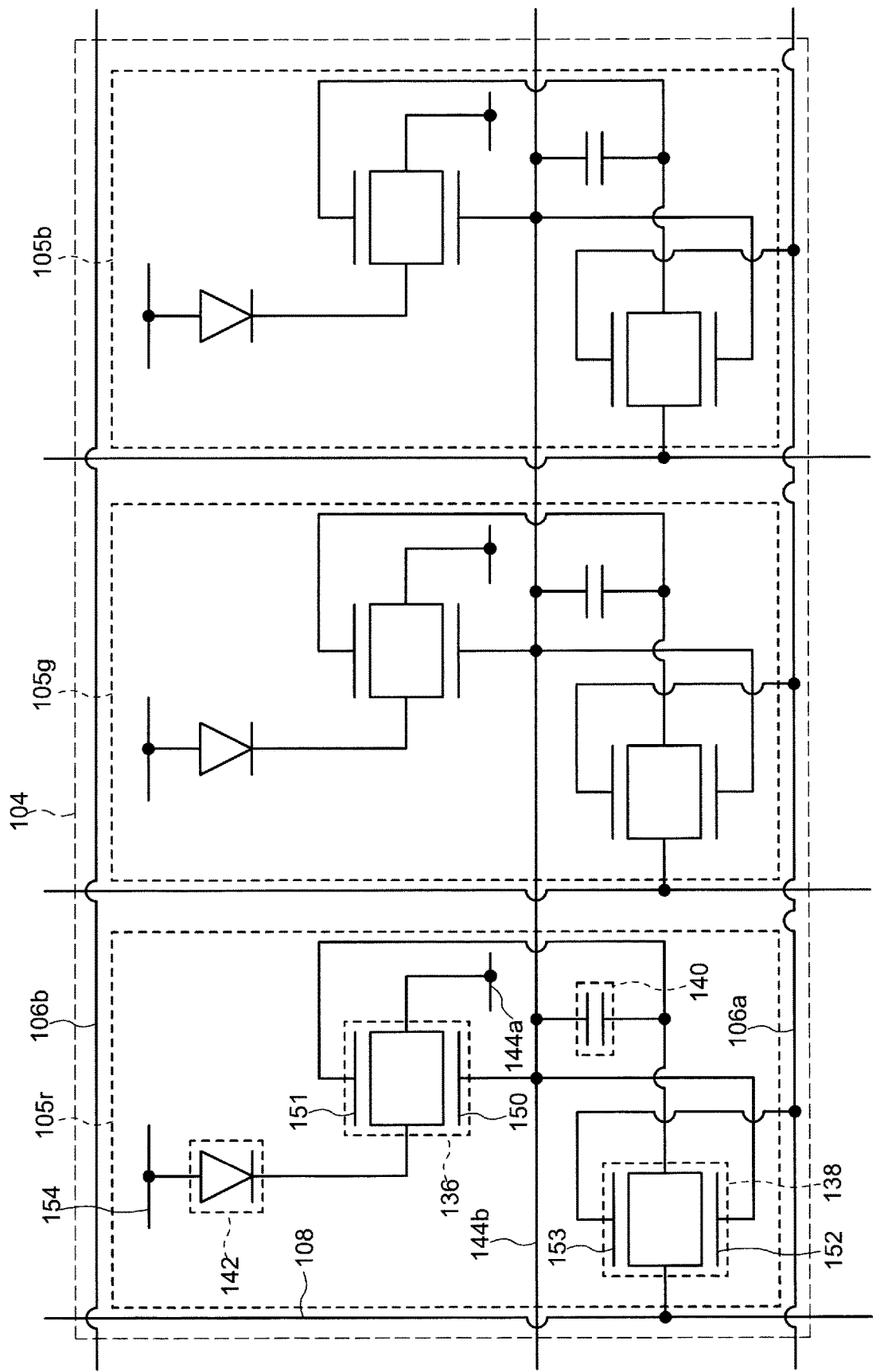
FIG. 4 is an example of an equivalent circuit of a pixel of a display device with a touch and fingerprint sensor according to an embodiment of the present invention.

FIG. 4 shows an example of an equivalent circuit of a pixel 104. The pixel 104 includes a first sub-pixel 105$r$, a second sub-pixel 105$g$, and a third sub-pixel 105$b$. The first sub-pixel 105$r$ includes a drive transistor 136, a select transistor 138, a capacitive element 140, and an EL element 142. The second sub-pixel 105$g$ and the third sub-pixel 105$b$ have the same configuration. In FIG. 4, the symbol representing the drive transistor 136 and the select transistor 138 is a dual gate structure that sandwiches the semiconductor layer with two gate electrodes. The drive transistor 136 has a first gate electrode 150 which is arranged on the lower side and a second gate electrode 151 which is arranged on the upper side, and the select transistor 138 has a first gate electrode 152 which is arranged on the lower side and a second gate electrode 153 which is arranged on the upper side. The drive transistor 136 and the select transistor 138 are n-channel transistors.

The second gate electrode 153 of the select transistor 138 is connected to a scanning signal line 106a, the source to the data signal line 108, and the drain to the capacitive element 140 and the second gate electrode 151 of the drive transistor 136. The first gate electrode 150 of the drive transistor 136 is connected to a common wiring 144b, the source to a common electrode 144a, and the drain to the cathode of the EL element 142. One terminal (first terminal) of the capacitive element 140 is connected to the drain of the selectable transistor 138 and the other terminal is connected to the common wiring 144b. The anode of EL element 142 is connected to a power line 154.

In FIG. 4, the common electrode 144a and the common wiring 144b are shown separately in the equivalent circuit, but both are functionally identical in that they are at the same potential and are secured to a constant potential (for example, a ground potential). The power line 154 is applied with a power supply potential VDD that is higher than the potential of the common electrode 144a, and common wiring 144b. When the drive transistor 136 is on, the EL element 142 is in a state in which current flows from the power line 154 to the common electrode 144a. The current flowing at this time is also the drain current of the drive transistor 136, and the potential of the second gate electrode 151 can control the current amount (which is also the emission intensity of the EL element).

The equivalent circuit of the pixel shown in FIG. 4 is an example, and the display device with the touch and fingerprint sensor 100 according to the present embodiment can also apply pixel circuitry having other circuit configurations. For example, the pixel circuit incorporating a circuit that compensates for the threshold voltage of the drive transistor may be applied.

1-3. Switching Circuit

Figure 5:
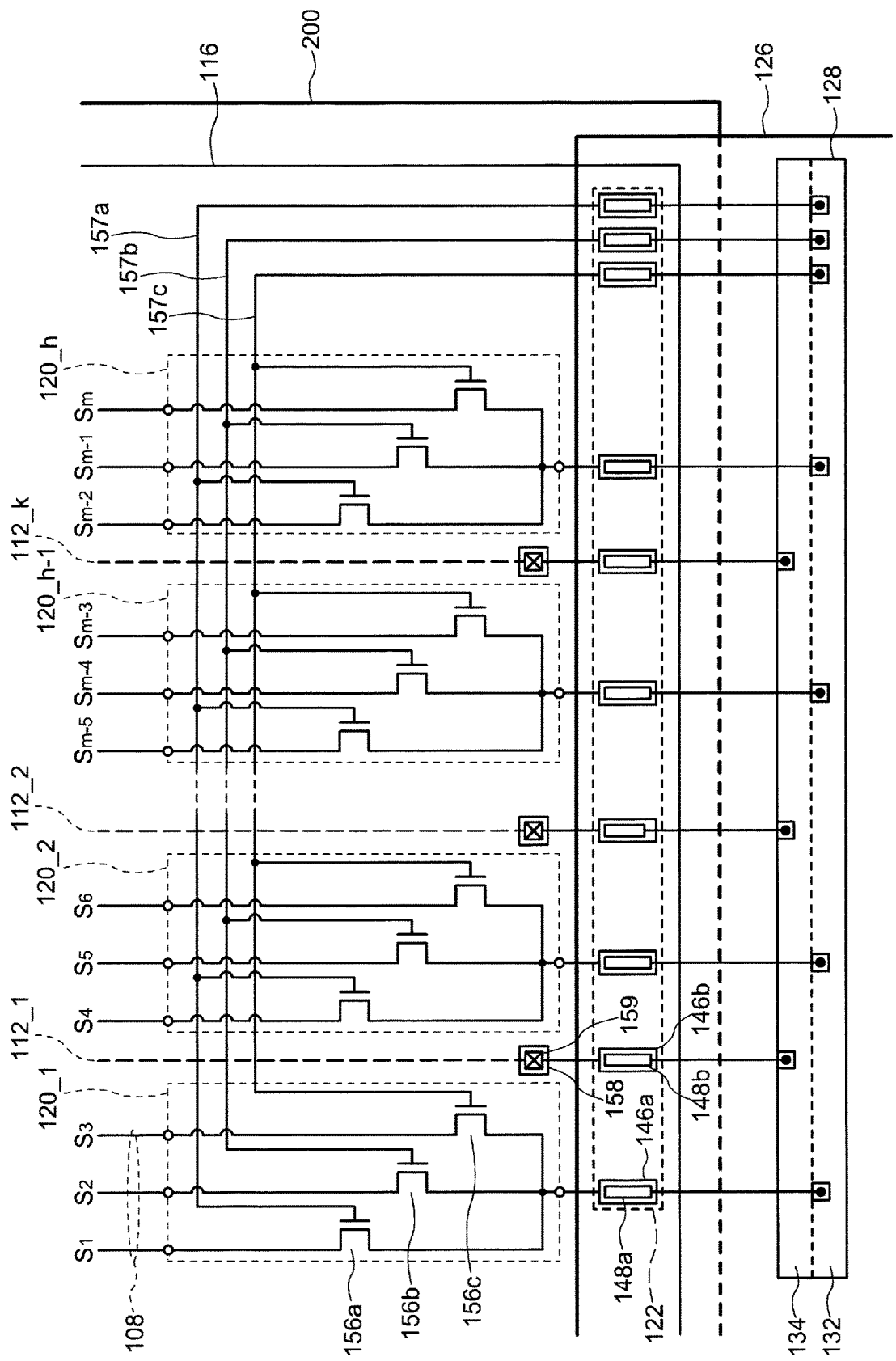
FIG. 5 is a configuration of switching circuits, a terminal part, and a second drive circuit of a display device with touch and fingerprint sensor according to an embodiment of the present invention.

FIG. 5 shows the configuration of the switching circuit 120 (120_1 to 120_h), the terminal part 122, and the second drive circuit 128 of the display device with the touch and fingerprint sensor 100 according to the present embodiment. The switching circuit 120 (120_1 to 120_h) and the terminal part 122 are disposed in the transparent resin substrate 200. The second drive circuit 128 is implemented in the flexible circuit board 126.

The terminal part 122 includes a first connecting terminal 146a and a second connecting terminal 146b. The first connecting terminal 146a is a terminal connected to the switching circuit 120 (120_1 to 120_h), and the second connecting terminal 146b is a terminal connected to the first sensor electrode 112 (112_1 to 112_k). The flexible circuit board 126 includes a third connecting terminal 148a and a fourth connecting terminal 148b. The first connecting terminal 146a is connected to the third connecting terminal 148a and the second connecting terminal 146b is connected to the fourth connecting terminal 148b. The connecting terminals disposed on the transparent resin substrate 200 and the connecting terminals disposed on the flexible circuit board 126 are connected by an anisotropic conductive adhesive.

The switching circuit 120 (120_1 to 120_h) includes one input terminal and three output terminals. The switching circuit 120 (120_1 to 120_h) includes a first switching element 156a, a second switching element 156b, and a third switching element 156c disposed between the input terminal and the output terminal. The first switching element 156a, the second switching element 156b, and the third switching element 156c are formed of transistors. The first switching element 156a, the second switching element 156b, and the third switching element 156c are turned on and off by control signal lines 157a, 157b, 157c connected to the gate of these transistors.

The first switching circuit 120_1 includes the first switching element 156a, the second switching element 156b, and the third switching element 156c and is exclusively switched by the control signals of the control signal lines 157a, 157b, 157c. That is, the first switching element 156a is controlled by the control signal of the control signal line 157a, the second switching element 156b is controlled by the control signal of the control signal line 157b, and the third switching element 156c is controlled by the control signal of the control signal line 157c so that any one of these switching elements is turned on and the other two switching elements are turned off. Such operations are similar for other switching circuits 120_2 to 120_h.

The first connecting terminal 146a is connected to the input terminal, and the plurality of data signal lines 108 (S1-S3) are connected to the output terminal, in the first switching circuit 120_1. Specifically, the first switching element 156a is connected between the first connecting terminal 146a and the data signal line 108 (S1), the second switching element 156b is connected between the first connecting terminal 146a and the data signal line 108 (S2), and the third switching element 156c is connected between the first connecting terminal 146a and the data signal line 108 (S3), in the first switching circuit 120_1. Other switching circuits 120_2 to 120_h have similar circuitry. The first switching circuit 120_1 has the function of distributing the signals input to the first connecting terminal 146a to a plurality of the data signal lines 108 (S1-S3) through the switching operation of the first switching element 156a, the second switching element 156b, and the third switching element 156c. Other switching circuits 120_2 to 120_h have similar functions.

The first sensor electrode 112_1 is disposed between the first switching circuit 120_1 and the second switching circuit 120_2. The first sensor electrode 112_1 is connected to the second connecting terminal 146b. Other first sensor electrode 112_2 to 112_k is also disposed between other switching circuit 120_2, 120_h.

The shield electrode 116 is disposed overlapping the area of the terminal part 122. An end of the shield electrode 116 is located outside the first connecting terminal 146a and the second connecting terminal 146b. The first connecting terminal 146a and the second connecting terminal 146b are disposed on the upper side of the shield electrode 116, across an insulating layer (not shown). The first connecting terminal 146a and the second connecting terminal 146b are disposed on the upper side of the shield electrode 116 to withstand the crimping process when connecting the flexible circuit board 126 and to prevent sinking, deformation, and peeling. Also, the first connecting terminal 146a and the second connecting terminal 146b are disposed on the upper side of the shield electrode 116 to prevent video signals from propagating as noise to the touch and fingerprint sensor 110.

The first sensor electrodes 112_1 to 112_k is disposed on the underlayer side of the shield electrode 116 across an insulating layer (not shown). To connect the first sensor electrode 112_1 to the wiring extending from the second connecting terminal 146b, a first opening 158 is disposed in the shield electrode 116 and the first contact hole 159 extending through the insulating layer, not shown, inside the first opening 158. The first sensor electrode 112_1 and the second connecting terminal 146*b* are connected via the first contact hole 159 having a hole diameter smaller than the diameter of the first opening 158.

The second drive circuit 128 includes the data signal line drive circuit block 132 and the touch and fingerprint sensor detection circuit block 134 (further including the scanning signal line drive circuit block 130, not shown). The data signal line drive circuit blocks 132 include circuitry for controlling the operation of the switching circuits 120 (120_1 to 120_*h*). The arrangement of the respective circuit blocks in the second drive circuit 128 is optional, and the arrangement of the data signal line drive circuit blocks 132 and the touch and fingerprint sensor detection circuit blocks 134 may be replaced with the arrangement illustrated.

In the terminal part where the connecting terminals are arranged, if all the plurality of data signal lines and the plurality of first sensor electrodes are to be connected separately and independently at individual connecting terminals, the pitch of the connecting terminals becomes small. Generally, as the pitch of the connecting terminals in the terminal part becomes smaller, connection with the flexible circuit board becomes more difficult, resulting in defects and a lower manufacturing yield.

In contrast, the display device with the touch and fingerprint sensor 100 in the present embodiment has a reduced number of connecting terminals due to the provision of switching circuits 120 (120_1 to 120_*h*). That is, it is possible to connect the plurality of data signal lines 108 (for example, S1 to S3) to one first connecting terminal 146*a*, and reduce the number of connecting terminals, by providing the switching circuit 120. Thus, the addition of the second connecting terminal 146*b* connected to the first sensor electrode 112 to the terminal part 122 prevents a simple increase in the terminal number of connections and prevents a narrower pitch for the connecting terminal. As a result, defective connections with the flexible circuit board 126 can be prevented.

Figure 6:
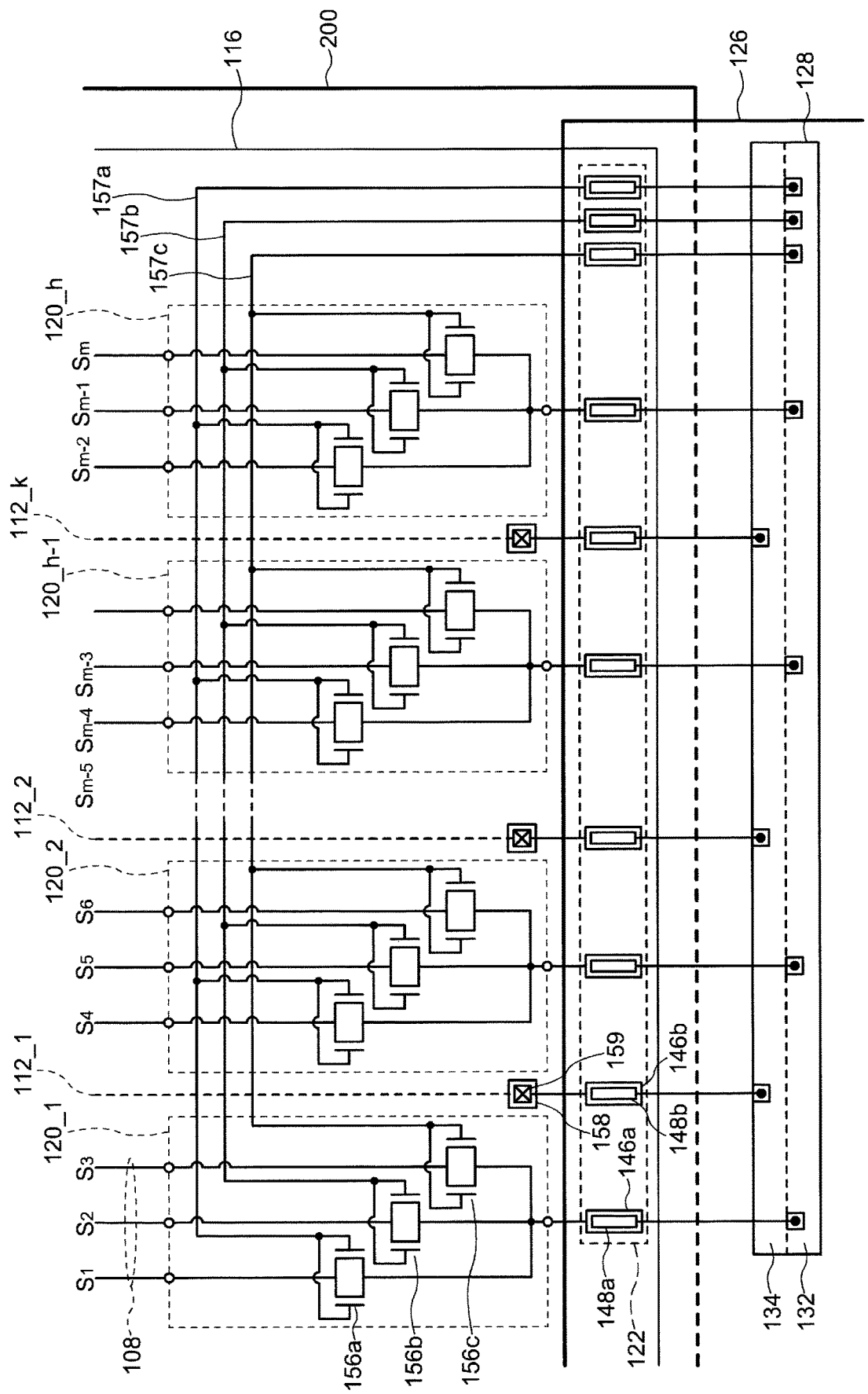
FIG. 6 is a configuration of switching circuits, a terminal part, and a second drive circuit of a display device with a touch and fingerprint sensor according to an embodiment of the present invention.

FIG. 6 shows an example in which the first switching element 156*a*, the second switching element 156*b*, and the third switching element 156*c* constituting the switching circuits 120 (120_1 to 120_*h*) are configured with dual-gate transistors. The use of a dual-gate transistor as the first switching element 156*a*, the second switching element 156*b*, and the third switching element 156*c* sharpens the rise and fall of the switching and can be operated even at high driving frequencies of the switching circuits 120 (120_1 to 120_*h*). This allows the switching circuits 120 (120_1-120_*h*) to operate synchronously with the frame frequency even when the frame frequency of the display device with the touch and fingerprint sensor 100 is high. In addition, it is possible to reduce the off-current (leakage current when the switch is off), which results in a reliable switching operation and reduces power consumption, by using dual-gate transistors as the first switching element 156*a*, the second switching element 156*b*, and the third switching element 156*c*.

Figure 7:
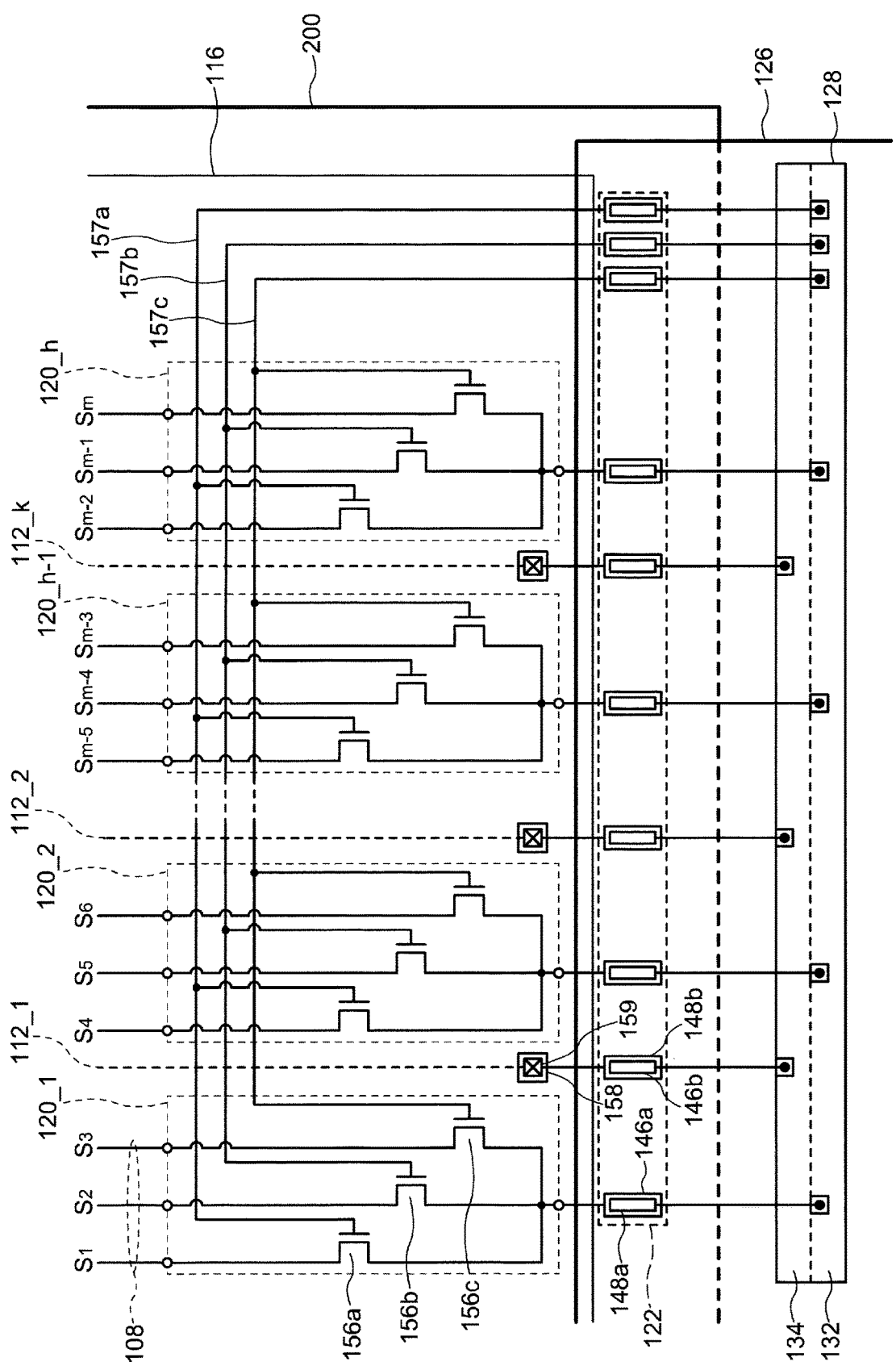
FIG. 7 is a configuration of switching circuits, a terminal part, and a second drive circuit of a display device with a touch and fingerprint sensor according to an embodiment of the present invention.

FIG. 7 shows examples in which the end of the shield electrode 116 is disposed inside the terminal part 122. The end of the shield electrode 116 is in the area between the terminal part 122 and the first opening 158 and the first connecting terminal 146*a* and the second connecting terminal 146*b* are located outside the shield electrode 116. According to such structures, the parasitic capacitance between the first connecting terminal 146*a* and the second connecting terminal 146*b* and the shield electrode 116 can be reduced and power consumption can be reduced. In FIG. 7, the configuration other than the shield electrode 116 is the same as that shown in FIG. 5.

Figure 8:
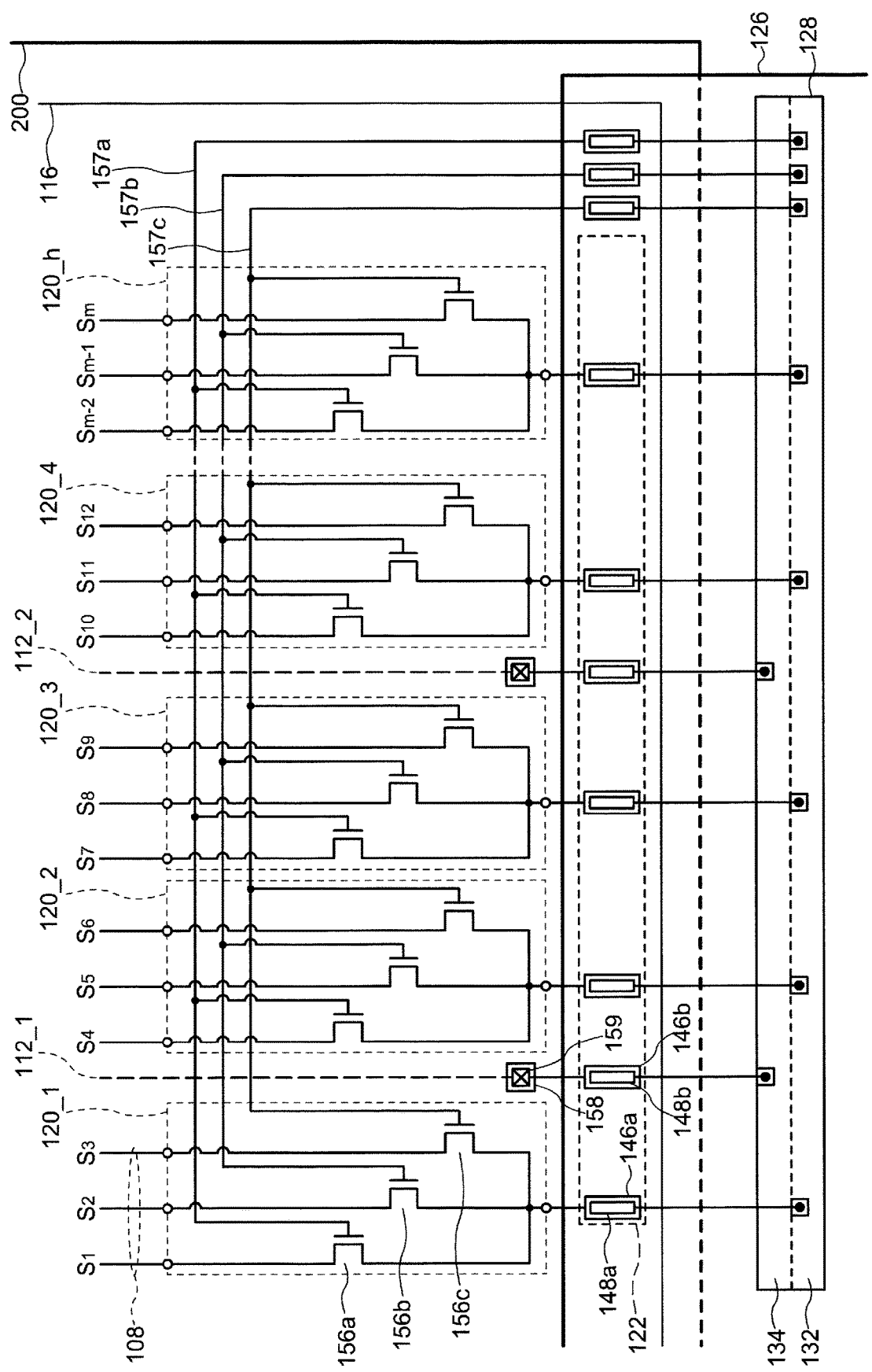
FIG. 8 is a configuration of switching circuits, a terminal part, and a second drive circuit of a display device with a touch and fingerprint sensor according to an embodiment of the present invention.

FIG. 5 shows the configuration when one first sensor electrode 112 is disposed for an array of one column of pixels 104. The number of the first sensor electrodes 112 may be reduced even if the sensitivity of the fingerprint sensor is reduced to some acceptable degree. For example, the first sensor electrode 112 may be disposed for the array of two columns of pixels 104. FIG. 8 shows an array of the switching circuit 120 and the first sensor electrode 112 in this case. As shown in FIG. 8, the switching circuit 120 can be disposed even if the number of the first sensor electrodes 112 is reduced, and the pitch of the connecting terminals of the terminal part 122 can be increased.

Although the pitches of the connecting terminal of the terminal part 122 are not uniformly disposed in FIG. 5, FIG. 6, FIG. 7, and FIG. 8, it is preferred that the pitches of the connecting terminal be uniformly disposed to further improve the yield of connecting the terminal part 122 to the flexible circuit board 126.

1-4. Structures of Sensor Electrode 1-4-1. First Sensor Electrode

Figure 9:
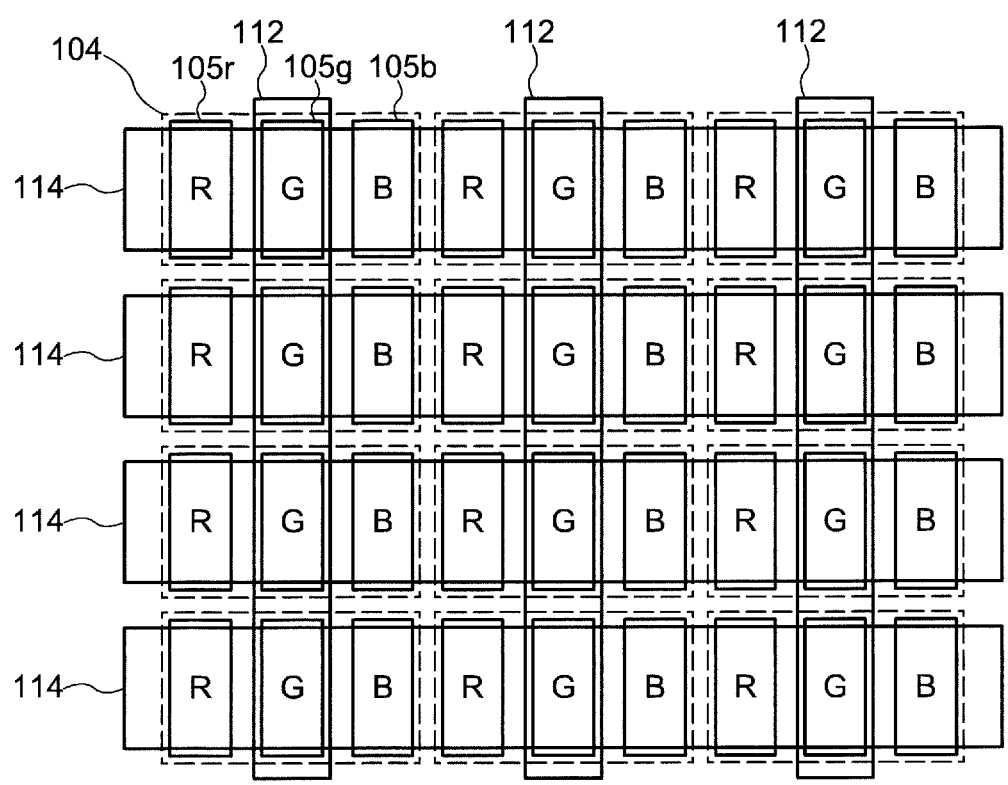
FIG. 9 is an arrangement of pixels and first and second sensor electrodes of a display device with a touch and fingerprint sensors according to an embodiment of the present invention.

FIG. 9 shows an arrangement of the plurality of pixels 104 and the plurality of first sensor electrodes 112 and the plurality of second sensor electrodes 114. FIG. 9 shows an example in which the plurality of pixels 104 include the first sub-pixel 105*r* corresponding to red (R), the second sub-pixel 105*g* corresponding to green (G), and the third sub-pixel 105*b* corresponding to blue (B), wherein the sub-pixel corresponding to each color is arranged in stripes in the first direction (column direction). The first sensor electrodes 112 extending in the first direction (column direction) are arranged corresponding to the arrangement of the plurality of pixels 104 in the first direction (column direction), and the second sensor electrodes 114 extending in the second direction (row direction) are also arranged corresponding to the arrangement of the plurality of pixels 104 in the second direction (row direction).

To detect fingerprints, the first sensor electrode 112 must be disposed at a pitch of 25 μm to 120 μm, and the pitch range of 45 μm to 75 μm is most suitable. The second sensor electrode 114 also needs to be disposed at similar pitches. If the pitch of the first sensor electrode 112 and the second sensor electrode 114 is too large, the resolution is reduced, and fingerprints cannot be detected accurately. On the other hand, even if the pitch is less than 25 μm, there is no improvement in the accuracy of detecting fingerprints, and the number of sensor electrodes increases, resulting in an over-engineering.

Although not shown in FIG. 9, the data signal line is disposed corresponding to the first (column) array of first sub-pixel 105*r*, the second sub-pixel 105*g*, and the third sub-pixel 105*b*. Accordingly, the first sensor electrode 112 is disposed in a ratio of one to three data signal lines. The pitch of the data signal line corresponding to the first sub-pixel 105*r*, the second sub-pixel 105*g*, and the third sub-pixel 105*b* is, for example, 17 μm for a 5.5 inch, full high definition smartphone display panel. Accordingly, when the first sensor electrode 112 is disposed corresponding to the column orientation of each pixel 104, the pitch of the first sensor electrode 112 is 51 μm. Referring now to FIG. 5, FIG. 6, and FIG. 7, since the first connecting terminal 146*a* is located at a pitch of 51 μm and the second connecting terminal 146*b* is located therebetween, the pitch of the connecting terminal in the terminal part 122 is 25.5 μm. With respect to the second sensor electrode 114, the pitch of the scanning signal line corresponding to the second direction (row direction) of the first sub-pixel 105*r*, the second sub-pixel 105g, and the third sub-pixel 105b becomes 51 µm, and the pitch of the second sensor electrode 114 becomes 51 µm as well.

As a sensor for detecting fingerprints, it is considered that the pitch of the sensor electrode is about 50 µm from the viewpoint of resolution. The number of the first sensor electrode 112 may be reduced even when the sensitivity of the fingerprint sensor is reduced to some acceptable degree. For example, the first sensor electrode 112 may be disposed at intervals of one pixel. In this case, according to the above examples, the pitch of the first sensor electrode 112 is 102 µm, and the pitch of the connecting terminal in the terminal part 122 can be increased to about 34 µm.

Figure 10:
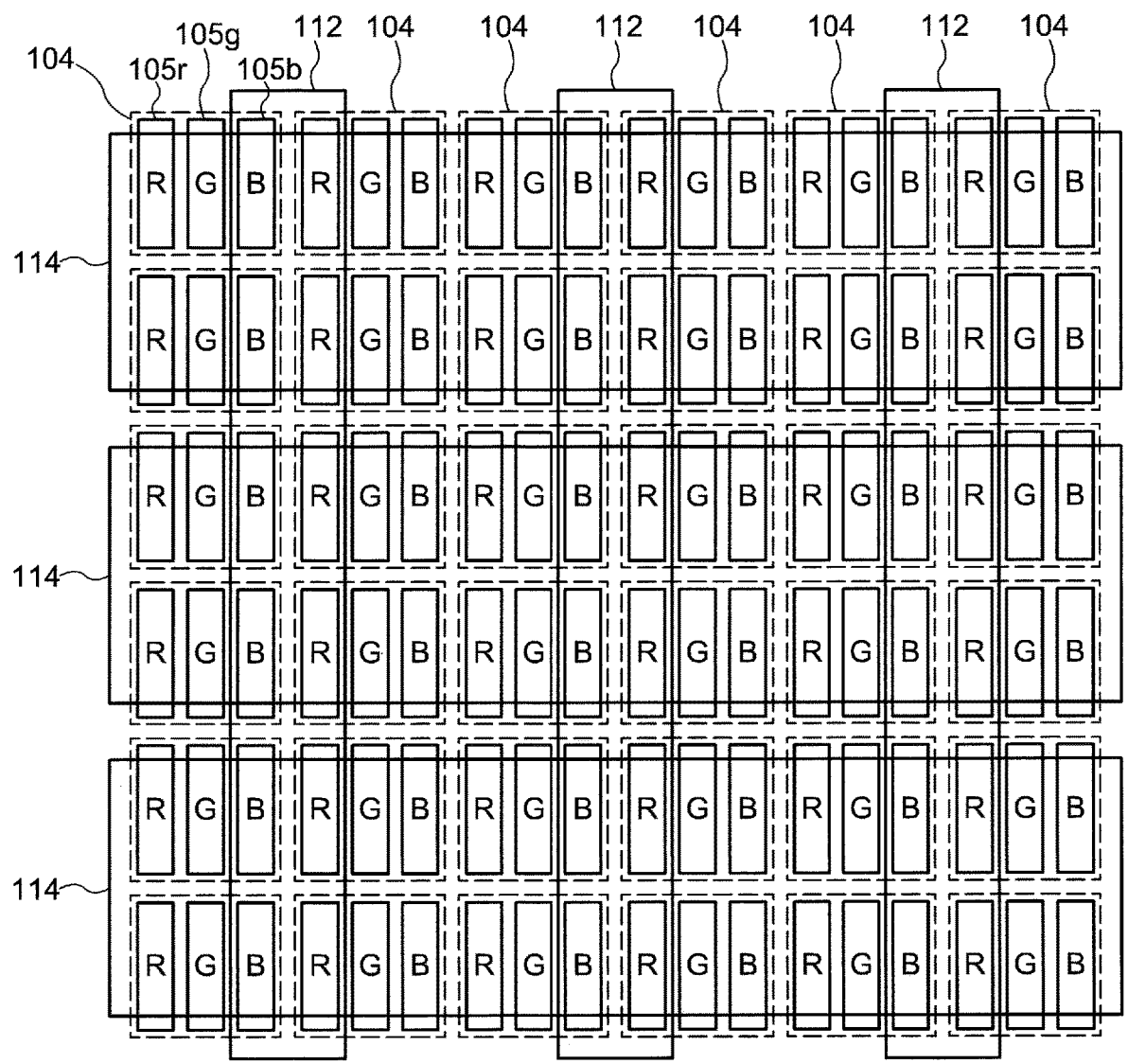
FIG. 10 is an arrangement of pixels and first and second sensor electrodes of a display device with touch and fingerprint sensors, and shows an example where the first sensor electrode is disposed at a ratio of one for two pixel rows and the second sensor electrode is disposed at a ratio of one for two pixel rows.

FIG. 10 shows an example when the pitches of both sensor electrode are increased for the arrangement of the first sensor electrode 112 and the second sensor electrode 114 shown in FIG. 9. That is, FIG. shows an example in which one first sensor electrode 112 is disposed for two columns of arrays of pixels 104 in the column direction and one second sensor electrode 114 is disposed for two rows of arrays in the row direction. As described above, the pitches of the first sensor electrode 112 and the second sensor electrode 114 are about 100 µm, but fingerprints can be detected even in such pitches. In contrast to the arrangement of the first sensor electrode 112 shown in FIG. 10, the arrangement of the connecting terminals in the switching circuit 120 and the terminal part 122 is as shown in FIG. 8, allowing a wider pitch for the connecting terminals.

Figure 11A:
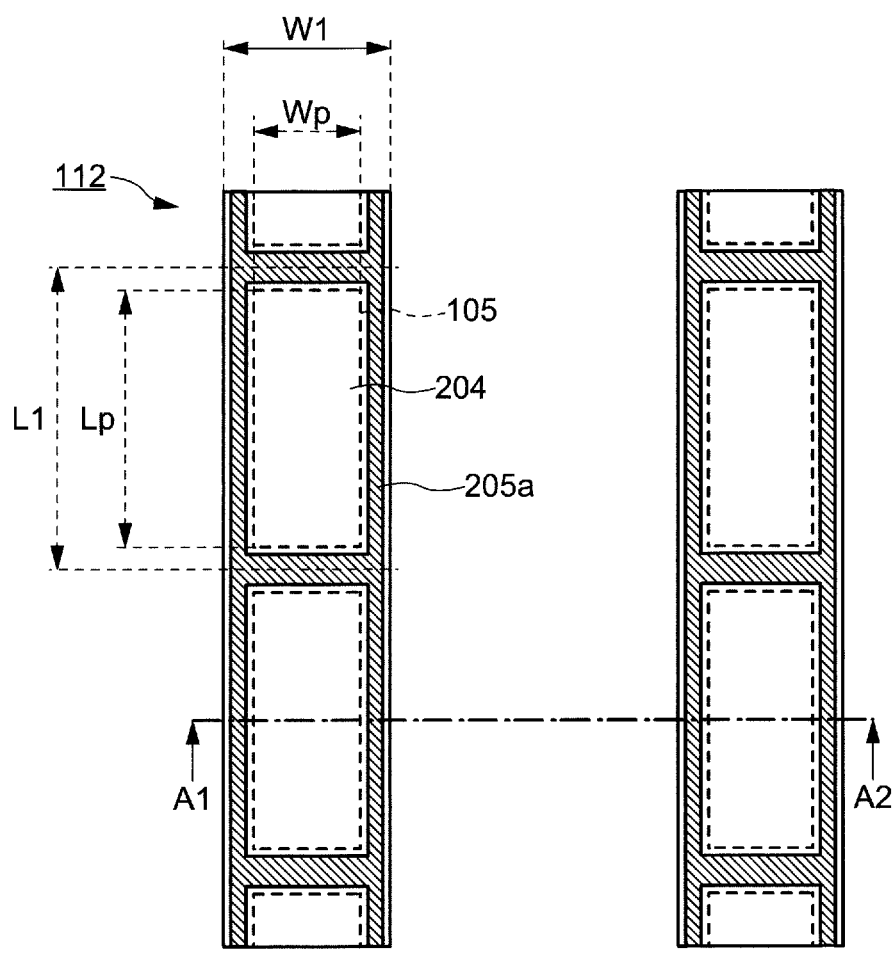
FIG. 11A is a top view of a first sensor electrode of a display device with a touch and fingerprint sensor according to an embodiment of the present invention.
Figure 11B:
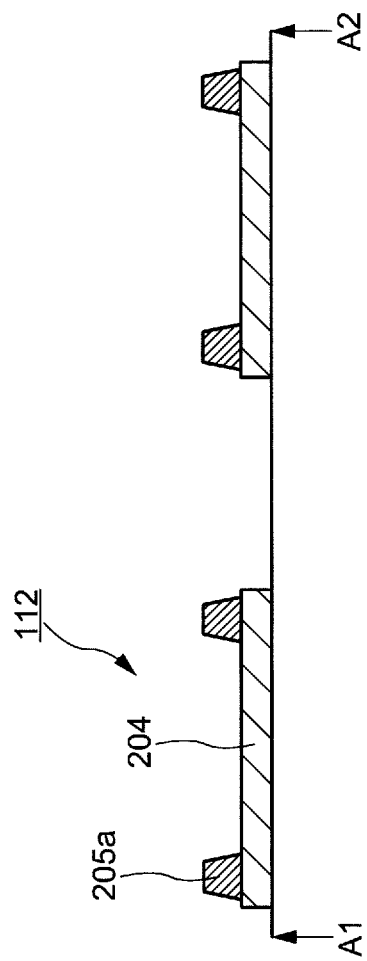
FIG. 11B is a cross-sectional view corresponding to the line A1-A2 shown in a top view of a first sensor electrode of a display device with a touch and fingerprint sensor according to an embodiment of the present invention.

FIG. 11A and FIG. 11B shows an example of the first sensor electrode 112. FIG. 11A shows a plan view of the first sensor electrode 112, and FIG. 11B shows a corresponding cross-sectional view of the line A1-A2.

The first sensor electrode 112 has striped patterns extending along the first direction (column direction) in the display part 102. The first sensor electrode 112 is formed of a first sensor electrode layer 204 with translucency. The first sensor electrode layer 204 is formed of, for example, a conductive metal oxide such as indium tin oxide (ITO), aluminum (Al) or gallium (Ga) doped zinc oxide (ZnO), indium zinc oxide (IZO), tin oxide ($SnO_2$) or niobium (Nb) doped titanium oxide ($TiO_x$), a transparent conductive film such as metal nitride or metal oxynitride such as titanium nitride ($TiN_x$) or titanium oxynitride (TiON), or a conductive organic substance such as polyaniline or graphene. A width W1 of the first sensor electrode 112 is disposed so that it is wider than the width Wp of the sub-pixel 105. Since the first sensor electrode layer 204 is disposed in accordance with the array of the sub-pixels 105 in the first direction (column direction), the first sensor electrode 112 is disposed so as to cover the entire sub-pixel 105.

A first auxiliary electrode 205a may be added to the first sensor electrode layer 204. The first auxiliary electrode 205a has thin linear patterns along the upper edges of the striped patterns of the first sensor electrode layer 204. The first auxiliary electrode 205a may also include a strip-like pattern connecting thin-linear patterns on both sides of the sub-pixel 105 arranged in a first direction (row direction) at spaced apart regions. The first auxiliary electrode 205a may also include a strip-like pattern connecting thin-linear patterns on both sides of the sub-pixel 105 arranged in a first direction (row direction) at spaced apart regions. The first auxiliary electrode 205a is formed of a lower resistivity material than the transparent conductive film material forming the first sensor electrode layer 204. For example, the first auxiliary electrode 205a is formed of a metal film such as aluminum (Al), a metal nitride such as titanium nitride (TiN), a metal silicide such as titanium silicide ($TiSi_x$), or the like. The first auxiliary electrode 205a formed of such conductive materials is formed of substantially the same width (thickness) as the data signal line 108 disposed in the display part 102 and is disposed in a position overlapping the data signal line 108. The first auxiliary electrode 205a contacting the first sensor electrode layer 204 can be disposed to reduce the resistivity of the first sensor electrode 112.

Since the width W1 of the first sensor electrode layer 204 is greater than the width Wp of the sub-pixel 105, the resistivity of the first sensor electrode 112 can be reduced without reducing the aperture ratio of the sub-pixel 105. For example, for the 5.5 inch, full high definition smartphone display panel shown above, the width of the first sensor electrode 112 may be greater than 17 µm (51 µm/3) and 20 µm. Also, the pitch L1 of the strip-like pattern of the first auxiliary electrode 205a is preferably greater than the length Lp of the sub-pixel 105. The pitch L1 of this strip-like pattern may be the same as the pitch of the scanning signal line. According to the preceding example, the pitch L1 may be 51 µm.

The width (thickness) of this strip-like pattern is formed in substantially the same width (thickness) as a scanning signal line 106 and is placed in a position overlapping the scanning signal line 106. Such an arrangement allows a low resistivity of the first sensor electrode 112 without reducing the aperture ratio.

Thus, it is possible to lower the resistance of the first sensor electrode 112 by providing the first auxiliary electrode 205a in the first sensor electrode layer 204. Thereby, the sensitivity of the touch and fingerprint sensor part 110 can be prevented from decreasing and a drop in the response speed can be prevented.

Figure 12A:
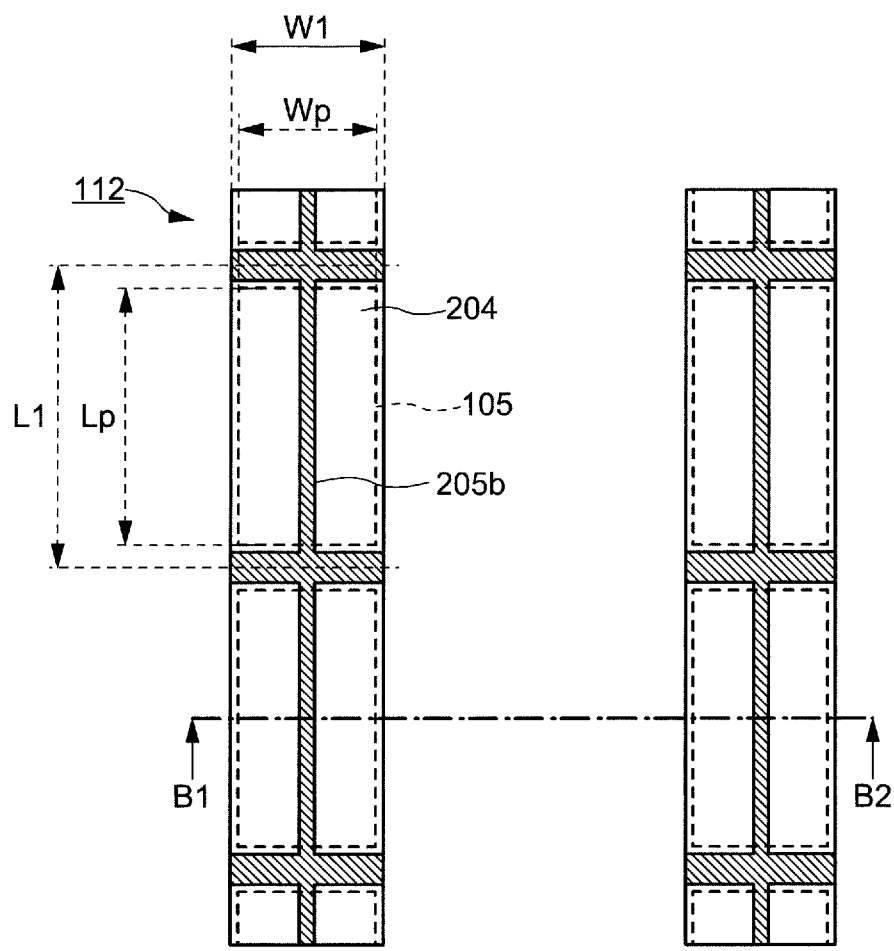
FIG. 12A is a top view of a first sensor electrode of a display device with a touch and fingerprint sensor according to an embodiment of the present invention.
Figure 12B:
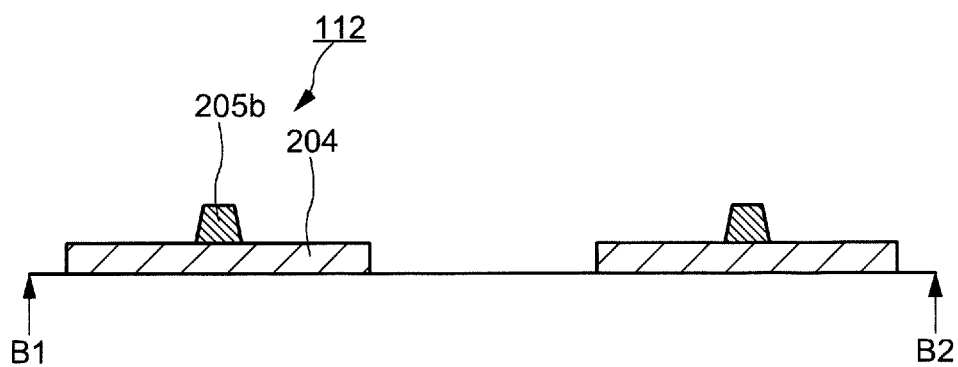
FIG. 12B is a cross-sectional view corresponding to the line B1-B2 shown in a top view of a first sensor electrode of a display device with a touch and fingerprint sensor according to an embodiment of the present invention.

FIG. 12A and FIG. 12B shows another example of the first sensor electrode 112. FIG. 12A shows a plan view of the first sensor electrode 112, and FIG. 12B shows a corresponding cross-sectional view of the line B1-B2.

A first auxiliary electrode 205b is disposed in contact with the first sensor electrode layer 204. The first auxiliary electrode 205b has a composite shape of a thin linear pattern disposed in the central portion of the first sensor electrode layer 204 and a strip-shaped pattern disposed in the area between the arrays of the sub-pixel 105. The first auxiliary electrode 205b is formed of a metal film, a metal nitride film, or a metal silicide film. The first auxiliary electrode 205b of the configuration shown in FIG. 12A and FIG. 12B is formed of substantially the same width (thickness) as the data signal line 108 of the display part 102 and is disposed overlapping the data signal line 108. The strip-like pattern of the first auxiliary electrode 205b is formed of substantially the same width (thickness) as the scanning signal line 106 and is disposed to overlap the scanning signal line 106. This type of first auxiliary electrode 205b may also reduce the resistivity of the first sensor electrode 112.

1-4-2. Second Sensor Electrode

Figure 13A:
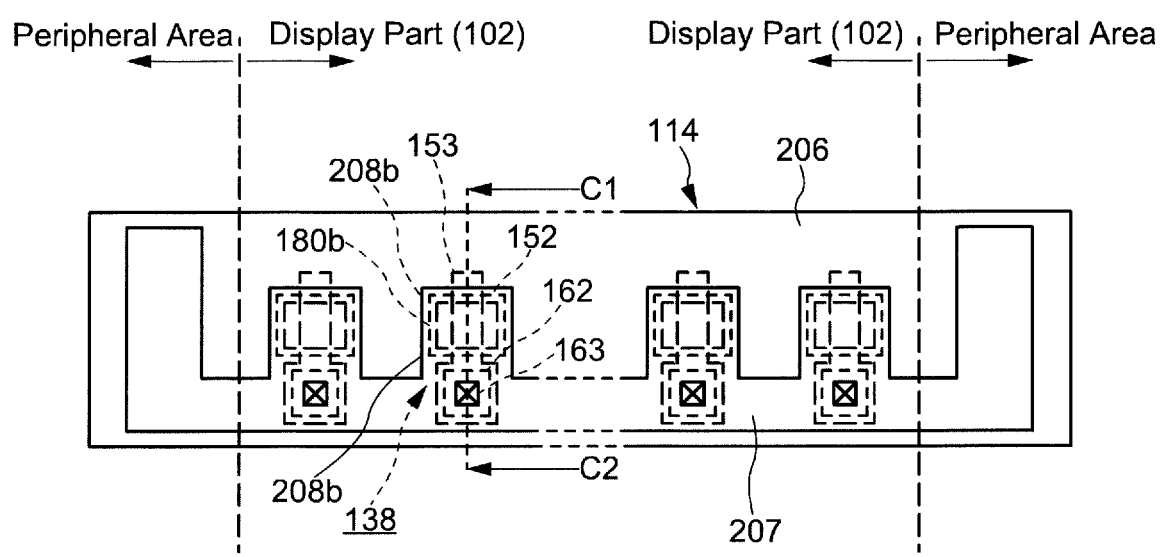
FIG. 13A is a top view of a second sensor electrode of a display device with a touch and fingerprint sensor according to an embodiment of the present invention.
Figure 13B:
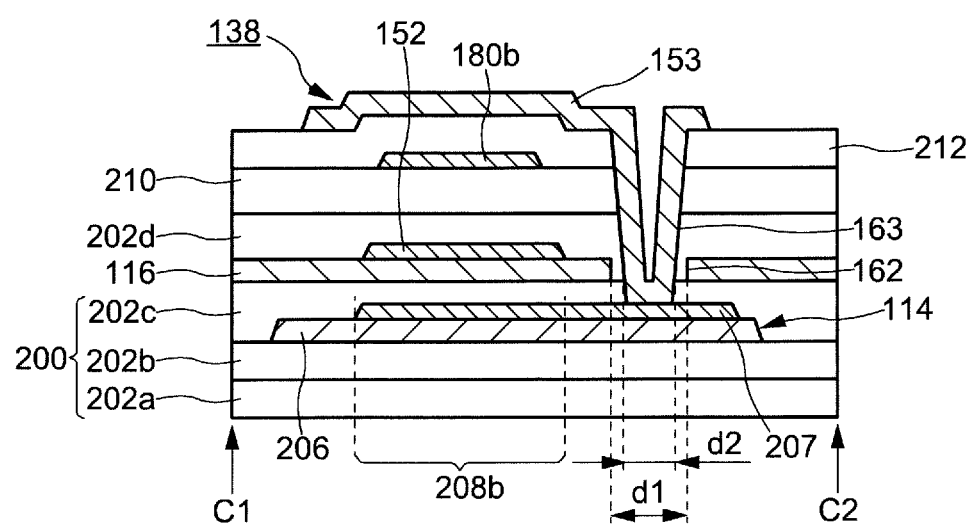
FIG. 13B is a cross-sectional view corresponding to the line C1-C2 shown in a top view of a second sensor electrode of a display device with a touch and fingerprint sensor according to an embodiment of the present invention.

FIG. 13A shows a plan view of the second sensor electrode 114. FIG. 13A further shows the structures (first gate electrode 152, second oxide semiconductor layer 180b, second gate electrode 153) of a portion of the select transistor 138 on the second sensor electrode 114 as dotted lines. FIG. 13B shows a corresponding cross-sectional structure of the line C1-C2 shown in FIG. 13A.

The second sensor electrode 114 has striped patterns extending along the second direction (row direction) in the display part 102. The second sensor electrode 114 traverses the display part 102 in the second direction (row direction) and is disposed so that both ends reach the peripheral area. The second sensor electrode 114 is formed of a second sensor electrode layer 206 with translucency. The second sensor electrode layer 206 is formed of a transparent conductive film similar to the first sensor electrode layer 204.

The second sensor electrode 114 is disposed with a second auxiliary electrode 207. The second auxiliary electrode 207 is disposed in contact with the second sensor electrode layer 206. The second auxiliary electrode 207 is disposed along a longitudinal direction of the second sensor electrode layer 206. The second auxiliary electrode 207 is formed of a metal film, a metal nitride film, or a metal silicide film. Similar to the first sensor electrode 112, the second sensor electrode 114 is formed of the second sensor electrode layer 206 and the second auxiliary electrode 207 to reduce the resistivity.

FIG. 13B shows the structures in which a first transparent resin layer 202a, a second transparent resin layer 202b, a third transparent resin layer 202c, a fourth transparent resin layer 202d, a first insulating layer 210, and a second insulating layer 212 are laminated as the transparent resin substrate 200. The second sensor electrode layer 206 is disposed between the second transparent resin layer 202b and the third transparent-resin layer 202c. The second auxiliary electrode 207 is disposed between the second sensor electrode layer 206 and the third transparent resin layer 202c. The shield electrode 116 is disposed on the third transparent resin layer 202c. The fourth transparent resin layer 202d is disposed on the shield electrode 116. The first insulating layer 210 is disposed on the fourth transparent resin layer 202d. A second oxide semiconductor layer 180b is also disposed between the first insulating layer 210 and the second insulating layer 212, and the second gate electrode 153 is disposed on the second insulating layer 212.

A second light shielding layer 208b is disposed on the lower layer side of the first gate electrode 152. The second light shielding layer 208b is formed of a conductive film consecutively formed from the second auxiliary electrode 207. Alternatively, as shown in FIG. 13A, the linear pattern of the second auxiliary electrode 207 extending in the second direction (row direction) has a convex pattern protruding in the area where the select transistor 138 is disposed. The second auxiliary electrode 207 having such patterns functions as the second light shielding layer 208b for the sub-pixel 105. The shape of the second light shielding layer 208b protruding from the second auxiliary electrode 207 in a plan view is arbitrary and is not limited to the shape shown in FIG. 13A.

The second auxiliary electrode 207 also functions as a scanning signal line (gate bus line) 106 of the display part 102. The second gate electrode 153 is disposed on the second insulating layer 212. The second gate electrodes 153 are separated and individually disposed for each sub-pixel 105. The second gate electrode 153 is connected to the second auxiliary electrode 207 by the second insulating layer 212, the first insulating layer 210, the fourth transparent resin layer 202d, and a third contact hole 163 through the third transparent resin layer 202c. The shield electrode 116, which is disposed between the third transparent resin layer 202c and the fourth transparent resin layer 202d, is disposed with a third opening 162 having a diameter d1 larger than the diameter d2 of the third contact hole 163. The third contact hole 163 is disposed to pass through an area inside the third opening 162.

The first gate electrode 152 is disposed connected to the shield electrode 116. The first gate electrode 152 is secured to the same potential as the shield electrode 116. The select transistor 138 is disposed with the first gate electrode 152 to which a constant potential is applied on the opposite side (back channel side) of the second gate electrode 153, thereby preventing fluctuations in electrical characteristics.

A structure shown in FIG. 13A and FIG. 13B allows a thickness of the second insulating layer 212 to be thinned to 100 nm to 200 nm because the scanning signal lines 106 are disposed on the lower layer than the second oxide semiconductor layer 180b. Since the second gate electrode 153 does not cross the data signal line 108, even if the thickness of the second insulating layer 212 is reduced, both will not short-circuit. It is possible to obtain the select transistor 138 with excellent switching characteristics and fast response speed by thinning the second insulating layer 212, which functions as the gate insulating layer.

FIG. 13A shows only the select transistor 138 and the drive transistor 136 is omitted. However, the metallic layers forming the second auxiliary electrode 207 can also be used to dispose a light shielding layer for the drive transistor 136.

Figure 14A:
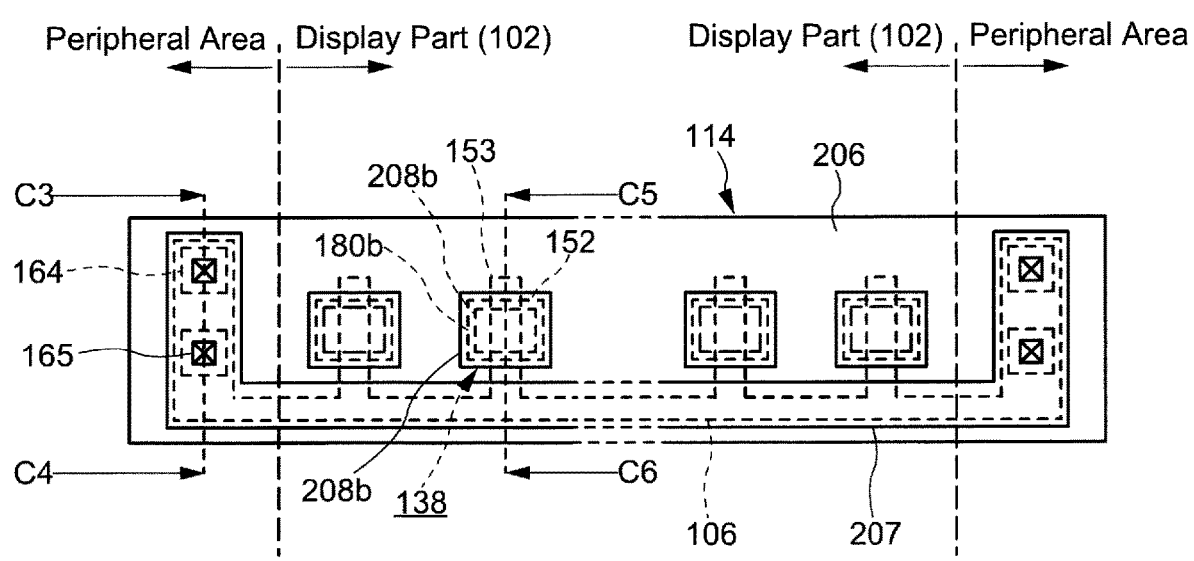
FIG. 14A is a top view of a second sensor electrode of a display device with a touch and fingerprint sensor according to an embodiment of the present invention.
Figure 14B:
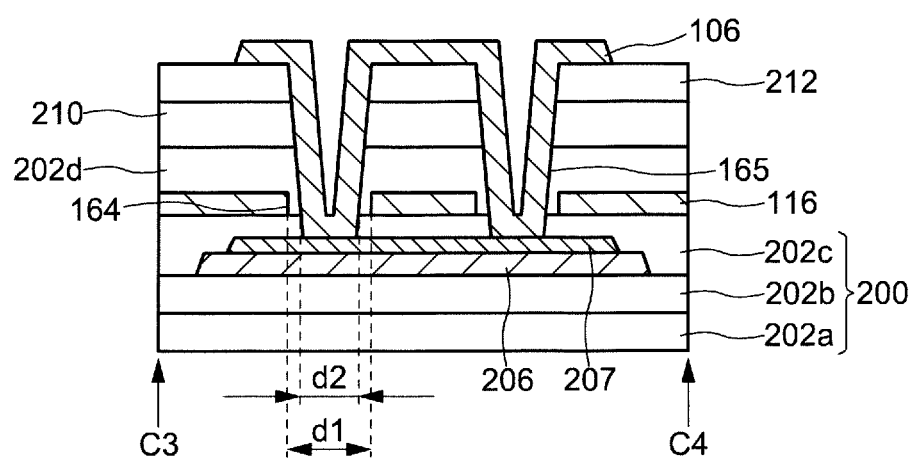
FIG. 14B is a cross-sectional view corresponding to the line C3-C4 shown in a top view of a second sensor electrode of a display device with a touch and fingerprint sensor according to an embodiment of the present invention.
Figure 14C:
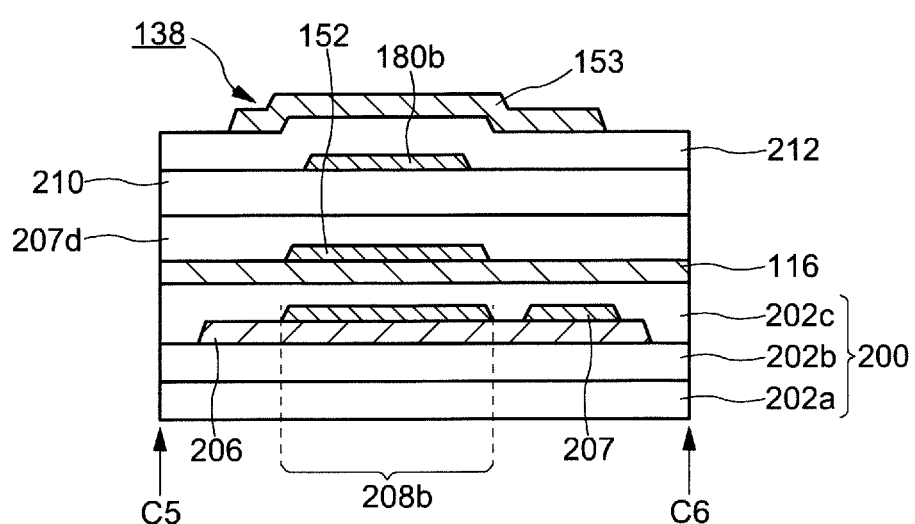
FIG. 14C is a cross-sectional view corresponding to the line C5-C6 shown in a top view of a second sensor electrode of a display device with a touch and fingerprint sensor according to an embodiment of the present invention.

FIG. 14A and FIG. 14B show an embodiment in which the second sensor electrode 114 differs from the structures shown in FIG. 13A and FIG. 13B. FIG. 14A shows a plan view of the second sensor electrode 114. FIG. 14A further shows some of the structures (first gate electrode 152, second oxide semiconductor layer 180b, second gate electrode 153, scanning signal line 106) of the select transistor 138 disposed on the second sensor electrode 114. FIG. 14B shows the corresponding cross-sectional structure of the line C3-C4 shown in FIG. 14A, and FIG. 14C shows the corresponding cross-sectional structure of the line C5-C6 shown in FIG. 14A.

The second sensor electrode 114 is formed of the second sensor electrode layer 206 and the second auxiliary electrode 207. The second auxiliary electrode 207 has linear patterns extending longitudinally in the second sensor electrode 114 in the display part 102. The second light shielding layer 208b overlapping the second oxide semiconductor layer 180b formed by the metal film forming the second auxiliary electrode 207 is disposed above the second sensor electrode 114.

The second gate electrode 153 and the scanning signal line 106 are disposed on the second insulating layer 212. The second gate electrodes 153 are formed in consecutive patterns from the scanning signal line 106. That is, the second gate electrode 153 and the scanning signal line 106 are formed of the same conductive layer. The second gate electrode 153 is disposed with the scanning signal line 106 coupled to each row of the sub-pixel 105.

The scanning signal line 106 is connected to the second auxiliary electrode 207 in the peripheral area. A fourth opening 164 is disposed in the shield electrode 116 in the peripheral area. The scanning signal line 106 is disposed inside the fourth opening 164 and is connected to the second auxiliary electrode 207 by a fourth contact hole 165 having a diameter smaller than the diameter of the fourth opening 164. The second light shielding layer 208b may be separated from the second auxiliary electrode 207 as shown in the figure, or may be disposed sequentially from the second auxiliary electrode 207 as shown in FIG. 13B.

It is possible to reduce wiring resistance by connecting the scanning signal line 106 to the second auxiliary electrode 207 in the peripheral area. In other words, the second auxiliary electrode 207 can be used as auxiliary wiring for the scanning signal line 106.

Note that FIG. 14A and FIG. 14C show only the select transistor 138, and the drive transistor 136 is omitted. The drive transistor 136 is similar in construction to the select transistor 138 and may be disposed with the second light shielding layer 208b using the metal film forming the second auxiliary electrode 207.

1-5. Partial Structure of Pixel and Sensor

Figure 15:
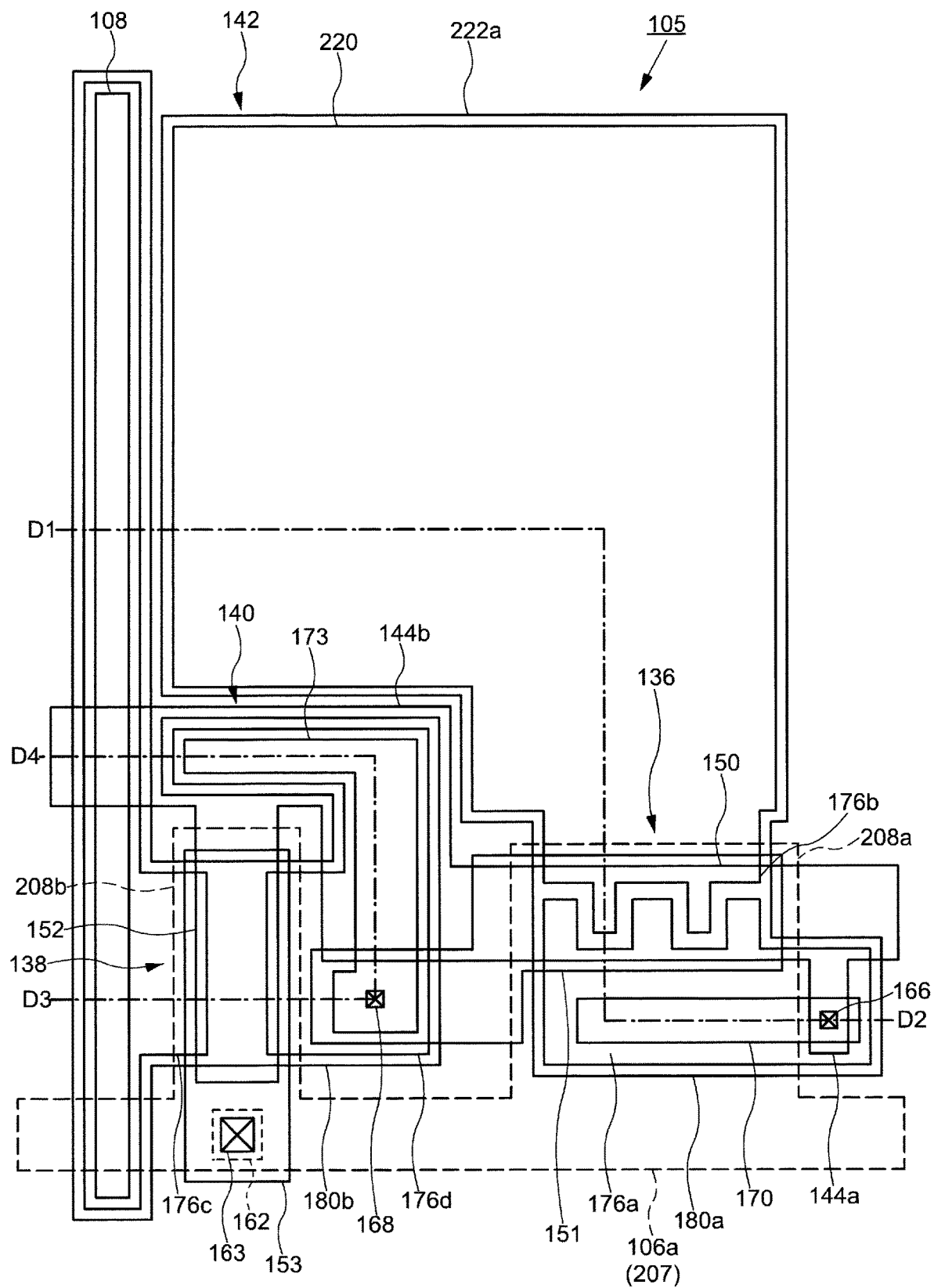
FIG. 15 is an example of a planar layout of a drive transistor, a select transistor, a capacitive element, and an EL element that constitute a sub-pixel of a display device with a touch and fingerprint sensor according to an embodiment of the present invention.

FIG. 15 shows an example of a planar layout of the sub-pixel 105 (corresponding to each of the first sub-pixel 105r, second sub-pixel 105g, and third sub-pixel 105b) shown in the equivalent circuit of FIG. 4. Details of the stacked structures of the first sensor electrode 112 and the second sensor electrode 114, and the EL element 142 are omitted in FIG. 15.

As shown in FIG. 15, the sub-pixel 105 includes the drive transistor 136, the select transistor 138, the capacitive element 140, and the EL element 142. Areas of the sub-pixel 105 are disposed with the scanning signal line 106a, the data signal line 108, the common electrodes 144a, and the common wiring 144b. The drive transistor 136 has a structure in which the first gate electrode 150 (lower layer side) and the second gate electrode 151 (upper layer side) are disposed sandwiched between a first oxide semiconductor layer 180a. The select transistor 138 has a structure in which the first gate electrode 152 (lower layer side) and the second gate electrode 153 (upper layer side) are disposed between the second oxide semiconductor layer 180b. A first light shielding layer 208a is disposed on the lower side of the drive transistor 136 and the second light shielding layer 208b is disposed on the lower side of the select transistor 138. The first light shielding layer 208a and the second light shielding layer 208b are formed of the same conductive layer as the conductive layer forming the scanning signal line 106a. The first light shielding layer 208a and the second light shielding layer 208b are formed in consecutive patterns from the scanning signal line 106a.

The drive transistor 136 includes the first oxide semiconductor layer 180a, a first metal oxide conductive layer 176a, and a second metal oxide conductive layer 176b. The first metal oxide conductive layer 176a and the second metal oxide conductive layer 176b are disposed in contact with the first oxide semiconductor layer 180a. The first metal oxide conductive layer 176a and the second metal oxide conductive layer 176b include regions in which the ends are spaced apart and facing each other. The ends and separated apart regions are and overlap the first gate electrode 150, the second gate electrode 151, and the first oxide semiconductor layer 180a. A channel of the drive transistor 136 is formed at a portion where the first metal oxide conductive layer 176a and the second metal oxide conductive layer 176b are separated apart.

The first metal oxide conductive layer 176a is disposed in contact with a source wiring 170. The source wiring 170 is connected to the common electrode 144a via a fifth contact hole 166. The second metal oxide conductive layer 176b is formed in contact with a first electrode 220 forming the EL element 142. The second metal oxide conductive layer 176b and the first electrode 220 are disposed in a continuous pattern.

The second metal oxide conductive layer 176b is extended to the region of the EL element 142 to form the first electrode (cathode) 220. The first oxide semiconductor layer 180a extends into the region of the EL element 142 to form a first electron transport layer 222a. The first electron transport layer 222a is disposed over the first electrode 220.

The select transistor 138 includes the second oxide semiconductor layer 180b, a third metal oxide conductive layer 176c, and a fourth metal oxide conductive layer 176d. The third metal oxide conductive layer 176c and the fourth metal oxide conductive layer 176d are disposed in contact with the second oxide semiconductor layer 180b. The third metal oxide conductive layer 176c and the fourth metal oxide conductive layer 176d include regions disposed so that the ends are spaced apart and opposite each other. The ends and separated apart regions overlap the first gate electrode 152, the second gate electrode 153, and the second oxide semiconductor layer 180b. A channel of the select transistor 138 is formed in a portion where the third metal oxide conductive layer 176c and the fourth metal oxide conductive layer 176d are separated apart.

The third metal oxide conductive layer 176c is disposed to include areas overlapping the data signal line 108. The fourth metal oxide conductive layer 176d is disposed in contact with a drain wiring 173. The fourth metal oxide conductive layer 176d and the drain wiring 173 are disposed to extend into the region of the capacitive element 140.

The second gate electrode 153 of the select transistor 138 is individually disposed for each sub-pixel 105 and is connected to the scanning signal line 106a (207) via the third contact hole 163. The second gate electrode 151 of the drive transistor 136 is connected to the drain wiring 173 via a seventh contact hole 168.

The capacitive element 140 is formed in the area where the drain wiring 173 and the fourth metal oxide conductive layer 176d overlap the common wiring 144b. An insulating layer is interposed between the drain wiring 173 and the fourth metal oxide conductive layer 176d and the common wiring 144b (not shown in FIG. 15).

Figure 16A:
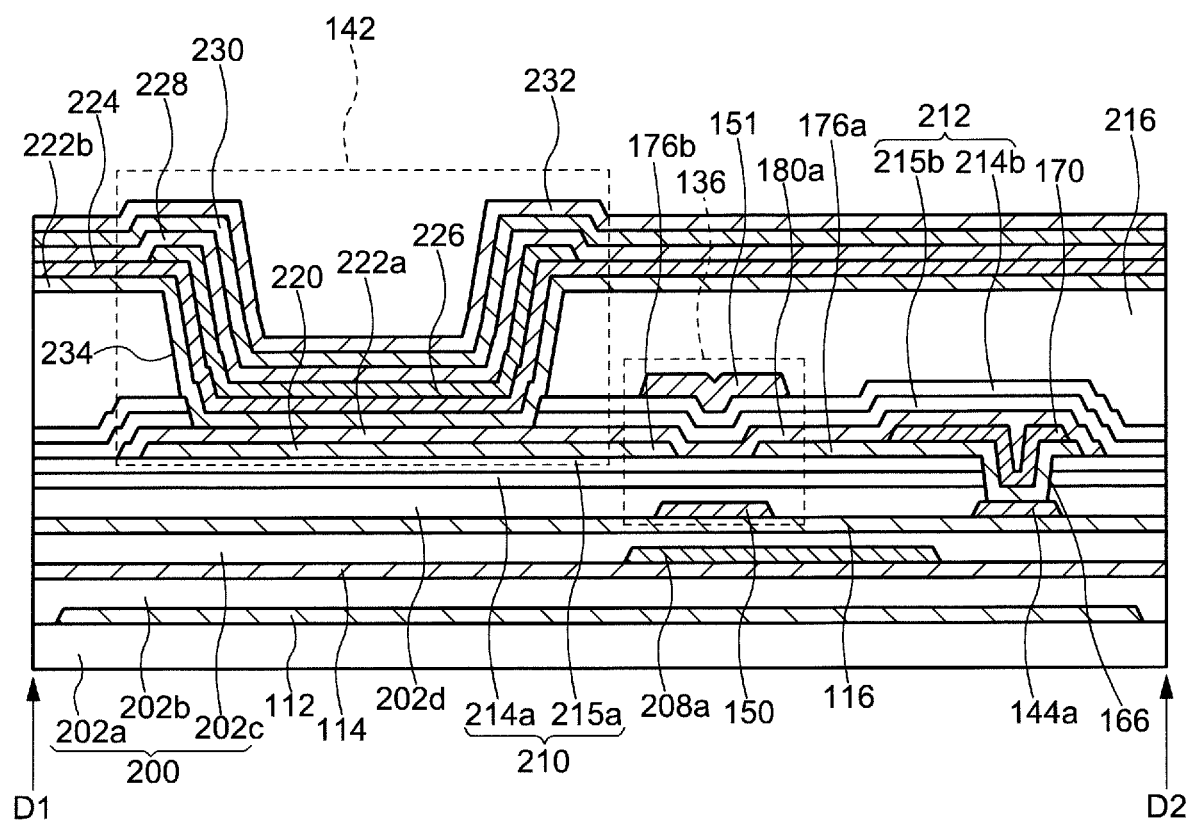
FIG. 16A is a cross sectional view corresponding to the line D1-D2 shown in FIG. 15, and shows the configuration of the sub-pixel of the display device with a touch and fingerprint sensor according to an embodiment of the present invention.
Figure 16B:
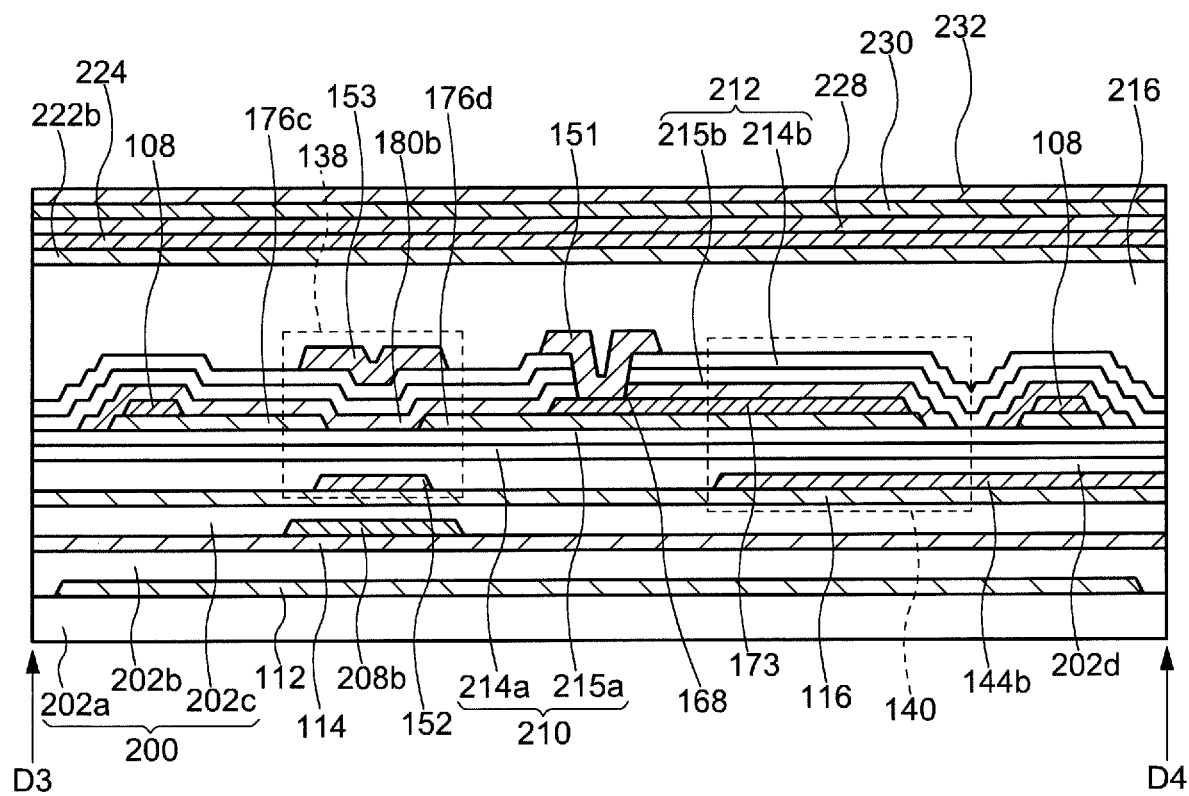
FIG. 16B is a cross sectional view corresponding to the line D3-D4 shown in FIG. 15, and shows the configuration of the sub-pixel of the display device with a touch and fingerprint sensor according to an embodiment of the present invention.

FIG. 16A shows the cross-sectional structure of sub-pixel 105 corresponding to the line D1-D2 shown in FIG. 15. FIG. 16B shows the cross-sectional structure of the sub-pixel 105 corresponding to the line D3 and D4 shown in FIG. 15. FIG. 16A shows the cross-sectional structure of the drive transistor 136 and the EL element 142, and FIG. 16B shows the cross-sectional structure of the select transistor 138 and the capacitive element 140.

The first sensor electrode 112 and the second sensor electrode 114 are disposed on the transparent resin substrate 200. The drive transistor 136, the select transistor 138, the capacitive element 140, and the EL element 142 are disposed on the transparent resin substrate 200. The transparent resin substrate 200 has a plurality of transparent resin layer laminated structures. The transparent resin substrate 200 has structures in which the first transparent resin layer 202a, the second transparent resin layer 202b, and the third transparent resin layer 202c are laminated. The first sensor electrode 112 is disposed between the first transparent resin layer 202a and the second transparent resin layer 202b, and the second sensor electrode 114 is disposed between the second transparent resin layer 202b and the third transparent resin layer 202c. The touch and fingerprint sensor 110 is disposed in an embedded state in the transparent resin substrate 200.

The display device with the touch and fingerprint sensor 100 according to the present embodiment emits light emission of the plurality of pixels 104 (specifically, the EL element 142 arranged in each sub-pixel 105) from the transparent resin substrate 200 side. The first sensor electrode 112 and the second sensor electrode 114 are disposed in an area overlapping the plurality of pixels 104 and are formed with a transparent conductive film to transmit light emitted from the plurality of pixels 104. Alternatively, the first sensor electrode 112 and the second sensor electrode 114 may each have openings through which light passes according to the arrangement of the pixel 105. That is, the first sensor electrode 112 and the second sensor electrode 114 may be formed of a metal film, such as aluminum (Al), having a ladder-shaped pattern, such as the first auxiliary electrode 205a shown in FIG. 11A and FIG. 11B, a metal nitride film, such as titanium nitride (TiN), a metal silicide film, such as titanium silicide ($TiSi_x$), or the like.

The first transparent resin layer 202a, the second transparent resin layer 202b, the third transparent resin layer 202c, and the fourth transparent resin layer 202d have a thickness of 3 μm to 20 μm, preferably 10 μm to 15 μm. The transparent resin substrate 200 has flexibility due to the construction in which a transparent resin layer of such a film thickness is laminated. The display device with the touch and fingerprint sensor 100 has the transparent resin substrate 200 side as the sensing and display surface. When the first sensor electrode 112 and the second sensor electrode 114 are used as electrodes to detect fingerprints, the thickness of the first transparent resin layer 202a is preferably thin. The first transparent resin layer 202a and the second transparent resin layer 202b may be disposed at a thickness of about 10 μm to 15 μm to obtain high sensitivity for detecting fingerprints. In order to form a contact hole, the second transparent resin layer 202b, the third transparent resin layer 202c, and the fourth transparent resin layer 202d are preferably as thin as possible unless a pinhole is formed, but preferably have a thickness of actually 3 μm to 5 μm because of problems with increasing parasitic capacitance. Since the first transparent resin layer 202a is a backbone layer of the transparent resin substrate 200, it is preferred to have a thickness of about 20 μm to 50 μm.

The first shading layer 208a overlapping the drive transistor 136 and the second shading layer 208b overlapping the select transistor 138 are disposed on the second sensor electrode 114. The first light shielding layer 208a and the second light shielding layer 208b are formed of a metal film, a metal nitride film, or a metal silicide film. The first light shielding layer 208a and the second light shielding layer 208b are disposed in the same layer as the scanning signal line 106a (also the second auxiliary electrode 207) disposed in the second sensor electrode 114 as shown in FIG. 15.

The shield electrode 116 is disposed between the drive transistor 136, the select transistor 138, the capacitive element 140, and the EL element 142 and the first sensor electrode 112 and the second sensor electrode 114. The shield electrode 116 is disposed between the third transparent resin layer 202c and the fourth transparent resin layer 202d. The shield electrode 116 is disposed over the entire the display part 102.

The shield electrode 116 is formed of a transparent conductive film. As the transparent conductive film, conductive metal oxides such as indium tin oxide (ITO), zinc oxide (ZnO), indium zinc oxide (IZO) and tin oxide ($SnO_2$), metal nitrides such as titanium nitride ($TiN_x$) and titanium oxynitride (TiON), and conductive organic materials such as polyaniline and graphene are used. Alternatively, the shield electrode 116 may be formed of a metallic material, such as aluminum, titanium, copper, or the like, and may have a construction in which openings are disposed to transmit light in accordance with the pixel arrangement. The common electrode 144a and the common wiring 144b are disposed in contact with the top surface of the shield electrode 116. The common wiring 144b is disposed to extend in the same direction as the scanning signal line 106a extends. The common electrode 144a and the common wiring 144b are formed of a metal film such as aluminum (Al). The common electrodes 144a, the common wiring 144b and the shield electrode 116 are at the same potential and are applied to a constant potential. For example, the shield electrode 116 and the common electrodes 144a and the common wiring 144b are applied to a ground potential.

The first gate electrode 150 of the drive transistor 136 and the first gate electrode 152 of the select transistor 138 are disposed above the shield electrode 116. The first gate electrode 150 and the first gate electrode 152 are formed on the same layer as the common electrode 144a and the common wiring 144b. The first gate electrode 150 and the first gate electrode 152 are formed of a metal film. The first gate electrode 150 and the first gate electrode 152 are disposed in contact with the top surface of the shield electrode 116. The first gate electrode 150 and the first gate electrode 152 are applied with the same potential as the shield electrode 116.

The first sensor electrode 112 is a receiver electrode (Rx electrode) and the second sensor electrode 114 functions as the transmitter electrode (Tx electrode), in the touch and fingerprint sensor part 110. When the touch and fingerprint sensor part 110 is driven, the second sensor electrode 114 is applied with a rectangular pulse voltage. An electric field generated by the rectangular pulse voltage applied to the second sensor electrode 114 is shielded by the shield electrode 116. It is possible to drive the display part 102 and the touch and fingerprint sensor part 110 without mutual interference due to the electric field shielding effect of the shield electrode 116. It is possible for the touch and fingerprint sensor section 110 to detect fingerprints with a high degree of accuracy because the influence of noise associated with driving the display part 102 is eliminated. In addition, the display part 102 can display images in a stable state without being affected by the touch and fingerprint sensor part 110.

The fourth transparent resin layer 202d is disposed on the shield electrode 116. Since the first transparent resin layer 202a, the second transparent resin layer 202b, the third transparent resin layer 202c, and the fourth transparent resin layer 202d are formed by using the resin composition, irregularities due to the first sensor electrode 112, the second sensor electrode 114, the first gate electrode 150, the first gate electrode 152, and the common electrode 144a, the common wiring 144b can be embedded and the surface of the fourth transparent resin layer 202d can be planarized.

As resinous materials forming the first transparent resin layer 202a, the second transparent resin layer 202b, the third transparent resin layer 202c, and the fourth transparent resin layer 202d, a transparent polyimide resin, a transparent polyethylene naphthalate resin, a transparent para-based polyamide resin, and the like are used. Since the transparent polyimide resin and the transparent polyethylene naphthalate resin have less gas barrier properties than the glass substrate, a gas barrier film formed by the silicon nitride film, or the like may be disposed. On the other hand, since the transparent para-polyamide resin has transparency, heat resistance, and gas barrier properties, it can be suitably used as a material to form the transparent resin substrate 200. The first transparent resin layer 202a, the second transparent resin layer 202b, the third transparent resin layer 202c, and the fourth transparent resin layer 202d may be formed of the same resinous materials, or some or all layers may be formed of different resinous materials. For example, the fourth transparent resin layer 202d can enhance the long-term reliability of the EL device 142 by using a rigid, gas-barrier transparent para-polyamide resin.

The transparent resin substrate 200 preferably has heat resistance from 150° C. to 400° C. When the maximum process temperature (heating temperature) when forming the drive transistor 136 and the select transistor 138 is 250° C. or lower, para-based polyamide resin can be used as the resin material. The use of para-based polyamide resin allows the transparent resin substrate 200 itself to have gas barrier properties. On the other hand, when the maximum process temperature (heating temperature) when forming the drive transistor 136 and the select transistor 138 is 250° C. or higher, it is preferable to use transparent polyimide resin as the material forming the transparent resin substrate 200 from the viewpoint of heat resistance.

In addition, the nanocellulose fiber (CNF) may be mixed with the transparent polyimide resin and the transparent para-based polyamide resin. The transparent polyimide resins and the transparent para-based polyamide resins with the nanocellulose fibers (CNF) are advantageous in that they improve stiffness, reduce shrinkage, and improve dimensional stability. Nanocellulose fibers (CNFs) may be mixed in at least one layer of the first transparent resin layer 202a, the second transparent resin layer 202b, the third transparent resin layer 202c, and the fourth transparent resin layer 202d, in order to improve the heat resistance of the transparent resin substrate 200. The mixture ratio of nanocellulose fibers (CNF) to transparent polyimide resin and transparent para-polyamide resin is preferably between 1% and 10% by weight.

The drive transistor 136 shown in FIG. 16A has a structure in which the first gate electrode 150, the first insulating layer 210, the first oxide semiconductor layer 180a, the second insulating layer 212, and the second gate electrode 151 are stacked. The first gate electrode 150 is disposed to overlap the first oxide semiconductor layer 180a via the first insulating layer 210, and the second gate electrode 151 is disposed to overlap the first oxide semiconductor layer 180a via the second insulating layer 212. The first gate electrode 150, the second gate electrode 151, and the first oxide semiconductor layer 180a have an overlapping region with each other, and a channel of the drive transistor 136 is formed in the overlapping region. The first gate electrode 150 is applied with the same potential as the shield electrode 116, and a voltage based on the data signal (a voltage based on the video signal) is applied to the second gate electrode 151 in the drive transistor 136.

The first metal oxide conductive layer 176a and the second metal oxide conductive layer 176b are disposed between the first insulating layer 210 and the first oxide semiconductor layer 180a. The first metal oxide conductive layer 176a and the second metal oxide conductive layer 176b are disposed so that the first gate electrode 150 and the second gate electrode 151 are sandwiched from both sides in a plane view. The first metal oxide conductive layer 176a and the second metal oxide conductive layer 176b are disposed to contact the underside of the first oxide semiconductor layer 180a. The drive transistor 136 has a drain region in which the second metal oxide conductive layer 176b contacts the first oxide semiconductor layer 180a, and a source region in which the first metal oxide conductive layer 176a contacts the first oxide semiconductor layer 180a.

The first oxide semiconductor layer 180a is formed using a metal oxide semiconductor material. A quaternary metal oxide material, a ternary metal oxide material, a binary metal oxide material, and a monolithic metal oxide semiconductor material are used as a metal oxide semiconductor material. These metal oxide semiconductor materials may be single layer structures or may have laminated structures. The metal oxide semiconductor material may also be amorphous or crystalline.

$In_2O_3$—$Ga_2O_3$—$SnO_2$—$ZnO$ oxide materials can be used as quaternary oxide materials, $In_2O_3$—$Ga_2O_3$—$SnO_2$ oxide materials, $In_2O_3$—$Ga_2O_3$—$ZnO$ oxide materials, $In_2O_3$—$SnO_2$—$ZnO$—$ZnO$ oxide materials, $In_2O_3$—$Al_2O_3$—$ZnO$ oxide materials, $Ga_2O_3$—$SnO_2$—$ZnO$ oxide materials, $Ga_2O_3$—$Al_2O_3$—$ZnO$ oxide materials, $SnO_2$—$Al_2O_3$—$ZnO$ oxide materials, and $Ga_2O_3$—$Al_2O_3$—$ZnO$ oxide materials can be used as ternary oxide materials, $In_2O_3$—$ZnO$ oxide materials, $SnO_2$—$ZnO$ oxide materials, $Al_2O_3$—$ZnO$ oxide materials, $MgO$—$ZnO$ oxide materials, $SnO_2$—$MgO$-based oxide materials, $In_2O_3$—$MgO$-based oxide materials can be used as binary oxide materials, $In_2O_3$-based metal oxide materials, $SnO_2$-based metal oxide materials, and $ZnO$-based metal oxide materials can be used as unary oxide materials. Silicon (Si), nickel (Ni), tungsten (W), hafnium (Hf), titanium (Ti), and tantalum (Ta) may be contained in the above oxide semiconductor materials. The In—Ga—Zn—O oxide material shown above is an oxide material containing at least In, Ga, and Zn, and there is no restriction on its composition ratio. The above quaternary, ternary, binary, and unary oxide materials are not limited to those in which the oxides contained are of stoichiometric composition, and may be composed of oxide materials having compositions deviating from the stoichiometric composition. Such metal oxide semiconductor materials have a band gap of 3.0 eV or higher and are transparent to light in the visible light band.

The first metal oxide conductive layer 176a and the second metal oxide conductive layer 176b are formed of a conductive metal oxide material, a metal nitride material, or a metal acid nitride material. For example, indium tin oxide (ITO), zinc oxide (ZnO), indium zinc oxide (IZO), tin oxide ($SnO_2$), and titanium oxide ($TiNbO_x$) with niobium added are used as the conductive metal oxide material. Metal nitrides and metal nitrides having transparency and conductivity can also be used, such as titanium nitride ($TiN_x$), titanium nitride acid (TiON).

The source electrode (first metal oxide conductive layer 176a) of the drive transistor 136 is connected to the common electrode 144a. The first metal oxide conductive layer 176a is disposed to contact the common electrode 144a through the fifth contact hole 166. The source wiring 170 formed of a metal film is disposed above the first metal oxide conductive layer 176a. The source wiring 170 is disposed extending into the region of the fifth contact hole 166. The fifth contact hole 166 is formed through the first insulating layer 210 and the fourth transparent resin layer 202d. The source wiring 170 and common electrode 144a and common wiring 144b are formed of a metallic material such as titanium (Ti), aluminum (Al), molybdenum (Mo), copper (Cu).

The first insulating layer 210, for example, has structures in which a first silicon nitride film 214a and a first silicon oxide film 215a are laminated from the side of the fourth transparent resin layer 202d. The second insulating layer 212, for example, has structures in which a second silicon oxide film 215b and a second silicon nitride film 214b are laminated from the side of the first oxide semiconductor layer 180a. The first oxide semiconductor layer 180a is disposed in contact with the first silicon oxide film 215a and the second silicon oxide film 215b. The first oxide semiconductor layer 180a is disposed with the upper and lower surfaces in contact with the silicon oxide film, thereby inhibiting the production of oxygen deficiency.

The first gate electrode 150 and second gate electrode 151 are formed from metallic materials such as aluminum (Al), molybdenum (Mo), tungsten (W), zirconium (Zr), and copper (Cu). Aluminum alloys such as aluminum-neodymium alloy (AlNd), aluminum-neodymium-nickel alloy (Al-NdNi), aluminum-carbon-nickel alloy (AlCNi), copper-nickel alloy (CuNi) can be used. For example, the first gate electrode 150 and the second gate electrode 151 are formed of aluminum (Al), molybdenum-tungsten (MoW) alloy, and molybdenum-titanium (MoTi) alloy.

The select transistor 138 has a structure in which the first gate electrode 152, the first insulating layer 210, the second oxide semiconductor layer 180b, the second insulating layer 212, and the second gate electrode 153 are stacked. A channel of the select transistor 138 is formed in the region where the second oxide semiconductor layer 180b overlaps the first gate electrode 152 and the second gate electrode 153. The first gate electrode 152 is disposed in contact with the shield electrode 116.

The third metal oxide conductive layer 176c and the fourth metal oxide conductive layer 176d are disposed between the first insulating layer 210 and the second oxide semiconductor layer 180b. The third metal oxide conductive layer 176c and the fourth metal oxide conductive layer 176d are disposed in contact with the lower surface of the second oxide semiconductor layer 180b to function as the source region and the drain region. The third metal oxide conductive layer 176c and the fourth metal oxide conductive layer 176d are disposed to be sandwiched from both sides of the first gate electrode 152 and the second gate electrode 153 in a plane view.

A third metal oxide conductive layer 176c is disposed in contact with the lower surface of the data signal line 108. The data signal lines 108 are in direct contact with the third metal oxide conductive layer 176c, which increases the contact area and reduces contact resistance compared to when they are connected via contact holes.

The drain wiring 173 is disposed in contact with the top surface of a fourth metal oxide conductive layer 176d. The second oxide semiconductor layer 180b is disposed to cover the top surface of the fourth metal oxide conductive layer 176d and the drain wiring 173. The drain wiring 173 is connected to the second gate electrode 151 of the drive transistor 136 via the seventh contact hole 168.

The capacitive element 140 shown in FIG. 16B is formed in the area where the drain wiring 173, the fourth metal oxide conductive layer 176d, the first insulating layer 210, the fourth transparent resin layer 202d, and the common wiring 144b overlap. The fourth metal oxide conductive layer 176d and the drain wiring 173 form one capacitance electrode, and the common wiring 144b forms the other capacitance electrode. The capacitive element 140 is disposed between the drain electrode of the select transistor 138 and the common wiring 144b.

The drive transistor 136 and the select transistor 138 are covered with a third insulating layer 216. The third insulating layer 216 is formed of an organic resinous material such as an acrylic resin, a polyimide resin, an epoxy resin, a polysiloxane resin, or a polyamide resin. The third insulating layer 216 has function as a planarizing film that embeds the drive transistor 136 and the selective transistor 138 formed by these resin compositions. The third insulating layer 216 may be formed of an inorganic insulating film such as a silicon oxide film, a silicon nitride film, or the like.

As shown in FIG. 16A, the EL element 142 has a structure in which the first electrode 220 corresponding to a cathode, the electron transport layer 222 (first electron transport layer 222a, second electron transport layer 222b), an electron injection layer 224, a light emitting layer 226, a hole transport layer 228, a hole injection layer 230, and a second electrode 232 corresponding to an anode are laminated from the side of the transparent resin substrate 200. For convenience, the EL element may be referred to as an inverse stacked structure when it has a hole transport layer, a light emitting layer, an electron transport layer, or a structure laminated from the anode side, such as a cathode, and vice versa. The EL element 142 shown in FIG. 16A is classified into an inverse stack structure.

The first electrode 220 is continuous from the first metal oxide conductive layer 176a, and the first electron transport layer 222a is continuous from the first oxide semiconductor layer 180a. The drive transistor 136 and the EL element 142 are connected without using a contact hole by having such a structure. The first electrode 220 corresponding to the cathode is formed of the same metal oxide conductive material as the first metal oxide conductive layer 176a. The first electron transport layer 222a is formed of the same oxide semiconductor material as the first oxide semiconductor layer 180a.

A third opening 234 is arranged in the third insulating layer 216 and the second insulating layer 212 in the region where the EL element 142 is formed. The third opening 234 exposes a top surface of the first electron transport layer 222a, which is disposed on the upper layer side of the first electrode 220. The second electron transport layer 222b, the electron injection layer 224, the light emitting layer 226, the hole transport layer 228, the hole injection layer 230, and the second electrode 232 as the anode are stacked on top of the first electron transport layer 222a. The area where these layers and the first electrode 220 overlap is the light emission area of the EL element 142.

The first electron transport layer 222a, which is formed of the same layer as the first oxide semiconductor layer 180a, is disposed on the upper layer of the first electrode 220. The first electron transport layer 222a is preferably transparent to visible light with a band gap of 3.0 eV or higher. The second electron transport layer 222b is formed of a metal oxide material containing one or more elements selected from indium oxide, zinc oxide, gallium (Ga) oxide, tin (Sn) oxide, magnesium (Mg) oxide, silicon (Si) oxide, hafnium (Hf) oxide, tantalum (Ta) oxide and niobium (Nb) oxide. These metal-oxide materials have a band gap of more than 3.0 eV and are translucent to visible light. The second electron transport layer 222b is formed with a film thickness of 50 nm to 1000 nm. The second electron transport layer 222b having a thickness in this range prevents a short circuit between the first electrode 220 and the second electrode 232.

A carrier concentration of the second electron transport layer 222b should be less than one-tenth of the carrier concentration of the first electron transport layer 222a, preferably less than one-hundredth of the carrier concentration of the first electron transport layer 222a. Specifically, the carrier concentration of the second electron transport layer 222b is $10^{13}/cm^3$ to $10^{17}/cm^3$, while that of the first electron transport layer 222a is in the range of $10^{15}/cm^3$ to $10^{19}/cm^3$, the difference in carrier concentration between both should be more than one order of magnitude, preferably more than two orders of magnitude, as described above. The first electron transport layer 222a has a carrier concentration in the range of $10^{15}/cm^3$ to $10^{19}/cm^3$, which reduces the resistance loss in the connection between the drive transistor 136 and the EL element 142 and prevents the drive voltage from increasing. When the carrier concentration of the second electron transport layer 222b is $10^{20}/cm^3$ or higher, the excited state in the light emitting layer 226 is deactivated and the luminous efficiency decreases. On the other hand, when the carrier concentration of the second electron transport layer 222b is less than $10^{13}/cm^3$, the carriers supplied to the light emitting layer 226 are reduced and sufficient brightness cannot be obtained. It is possible to prevent the drive voltage from increasing and increase the luminous efficiency of the EL element 142 by providing the first electron transport layer 222a in contact with the second electron transport layer 222b and by differentiating the carrier concentration of the two layers.

The carrier concentration of the first electron transport layer 222a and the second electron transport layer 222b can be controlled by the concentration of oxygen deficiency in the oxide semiconductor. The oxygen defects in an oxide semiconductor act as donors. Increasing the oxygen deficiency density of an oxide semiconductor increases the carrier concentration, while decreasing the oxygen deficiency density decreases the carrier concentration. The oxygen deficiency of an oxide semiconductor can be increased by, for example, the addition of hydrogen, and decreased by the supply of oxygen.

The electron injection layer is used in the EL device to reduce the energy barrier for injecting electrons from the cathode to the electron transport layer. The electron injection layer 224 is disposed to facilitate the injection of electrons from the second electron transport layer 222b to the light emitting layer 226. The electron injection layer 224 is disposed between the second electron transport layer 222b and the light emitting layer 226.

The electron injection layer 224 uses a material with a low work function. The electronic injection layer 224 is formed of an oxide semiconductor material including, for example, C12A7 (12CaO·7Al$_2$O$_3$) electride, Mg$_{0.3}$Zn$_{0.7}$O, Zn$_{0.7}$Si$_{0.3}$O$_x$. The electron injection layer 224 is formed at a thickness of 1 nm to 100 nm. It is possible to increase the number of electrons injected from the second electron transport layer 222b to the light emitting layer 226 by using this type of electron injection layer 224, thereby increasing the luminous efficiency.

The light emitting layer 226 is applicable to various light emission materials. The light emitting layer 226 is formed using, for example, a fluorescent material, a phosphorescent material that emits phosphorescence, and a thermally activated delayed fluorescence (TADF) material. The light emitting layer 226 is made of materials with different emission colors corresponding to the plurality of sub-pixels 105 included in the pixel 104. To make the light emitting layer 226 a white light emitting layer, a structure in which a blue light emitting layer and a yellow light emitting layer are stacked is used. The light emitting layer 226 can be made by vapor deposition, a transfer method, a spin-coating method, a spray-coating method, a gravure printing method, or other methods. The film thickness of the light emitting layer 226 may be selected as needed, but for example, it is formed in the range of 10 nm to 100 nm.

The hole transport layer 228 is formed, for example, of an arylamine compound, an amine compound comprising a carbazole group, and an amine compound comprising a fluorene derivative. The hole transport layer 228 is formed by vapor deposition, a coating method, or the like. The hole transport layer 228 is formed of a thickness between nm and 500 nm. When hole injection layer 230 is formed, the hole transport layer 228 may be omitted.

The hole injection layer 230 is formed of metal oxides such as molybdenum oxide, vanadium oxide, ruthenium oxide, tungsten oxide, manganese oxide, and the like. The hole infusion layer 230 is also formed of materials such as phthalocyanine (H$_2$Pc), copper (II) phthalocyanine (CuPc), and hexaazatriphenylene hexacarbonitrile (HAT-(CN)$_6$), and the like. The hole injection layer 230 is formed at a thickness of 1 nm to 10 nm.

The second electrode 232 corresponding to the anode is preferably formed of a material having a work function of 4.0 eV or more. The second electrode 232 is formed of a conductive metal oxide such as, for example, indium tin (ITO), indium zinc (IZO), tungsten oxide (WOx) and indium oxide containing zinc (ZnO) oxide (IWZO). Since the EL element 142 is a bottom emission type, the second electrode 232 preferably has a light reflective surface. Since the conductive metal oxide has light transmittance as described above, it is preferable to form a light reflection surface by laminating a metal film such as aluminum (Al) or silver (Ag).

Although omitted in FIG. 16A and FIG. 16B, passivation membranes may be disposed on the EL element 142 to block the penetration of oxygen and moisture.

Thus, the sub-pixel 105 according to the present embodiment has a configuration in which the n-channel drive transistor 136 and the EL element 142 are connected. The EL element 142 is a bottom emission type and is structured to emit light toward shield electrode 116. Since the electron transport layer and the electron injection layer are formed of an inorganic metal oxide semiconductor material, the EL element 142 has a structure that prevents the deterioration of the light emission characteristics due to moisture (H$_2$O) or oxygen (O$_2$).

Figure 17:
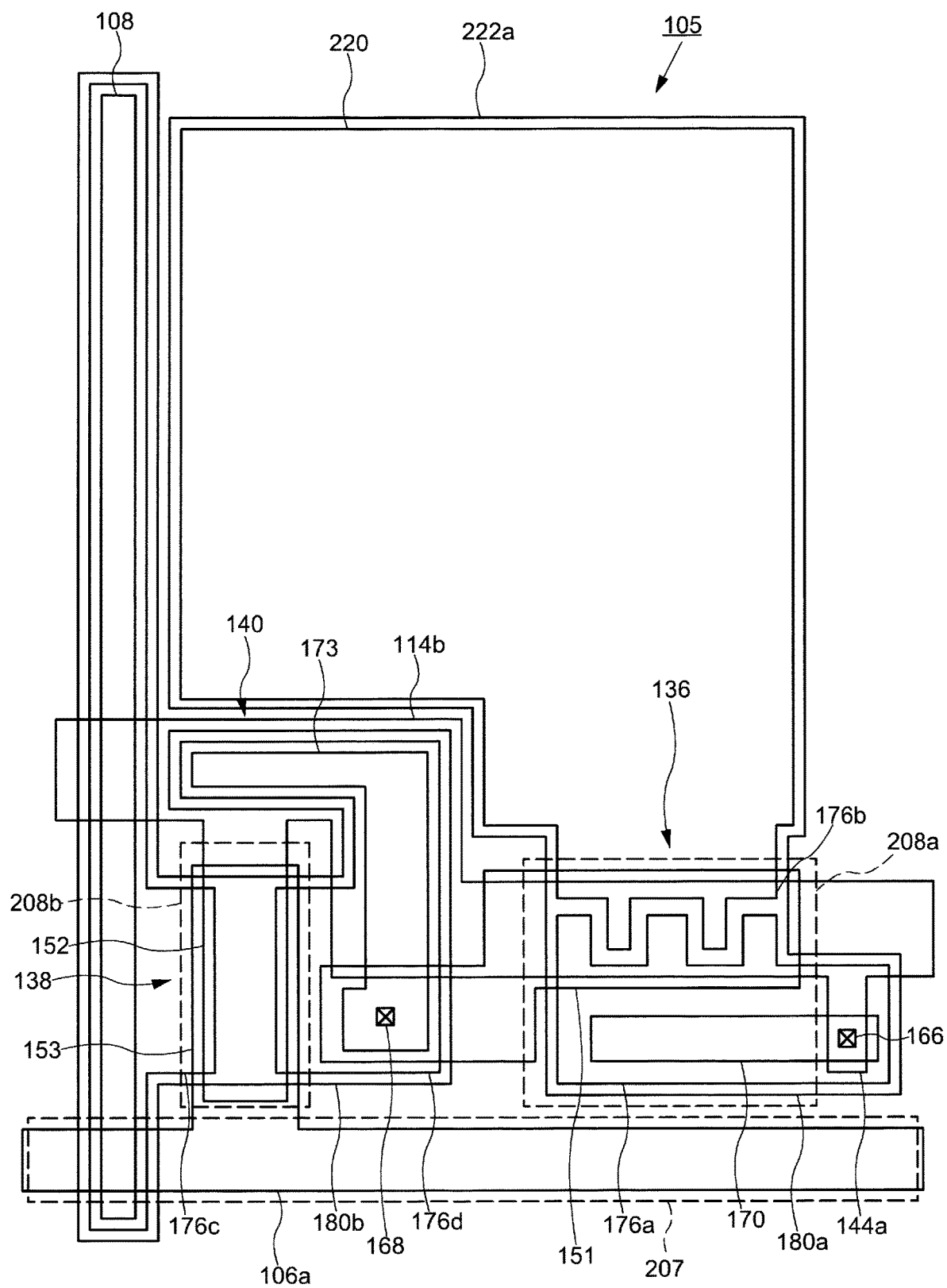
FIG. 17 is an example of a planar layout of a drive transistor, a select transistor, a capacitive element, and an EL element that constitute a sub-pixel of a display device with a touch and fingerprint sensor according to an embodiment of the present invention.

FIG. 17 shows a plan view showing another configuration of the sub-pixel 105. The sub-pixel 105 shown in FIG. 17 has structures in which the second gate electrode 153 of the select transistor 138 and the scanning signal line 106a are formed of the same conductive layer. The second auxiliary electrode 207 is disposed on the second sensor electrode 114 (FIG. 17 omits the patterns of the second sensor electrode 114 and only the second auxiliary electrode 207 is shown). The first light shielding layer 208a and the second light shielding layer 208b are formed of the same metallic film as the second auxiliary electrode 207 and are disposed on the second sensor electrode 114.

Figure 18:
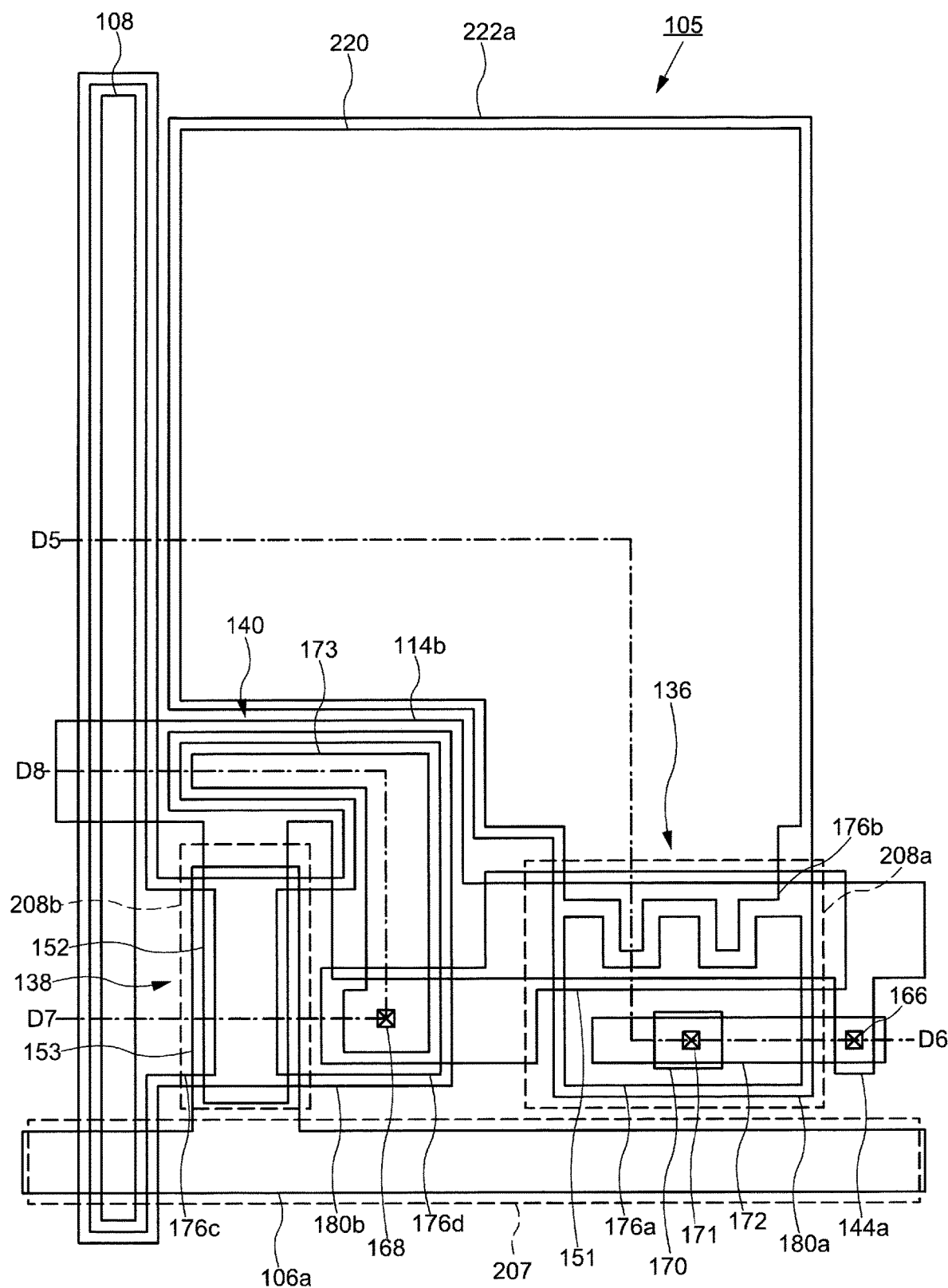
FIG. 18 is an example of a planar layout of a drive transistor, a select transistor, a capacitive element, and an EL element that constitute a sub-pixel of a display device with a touch and fingerprint sensor according to an embodiment of the present invention.
Figure 19A:
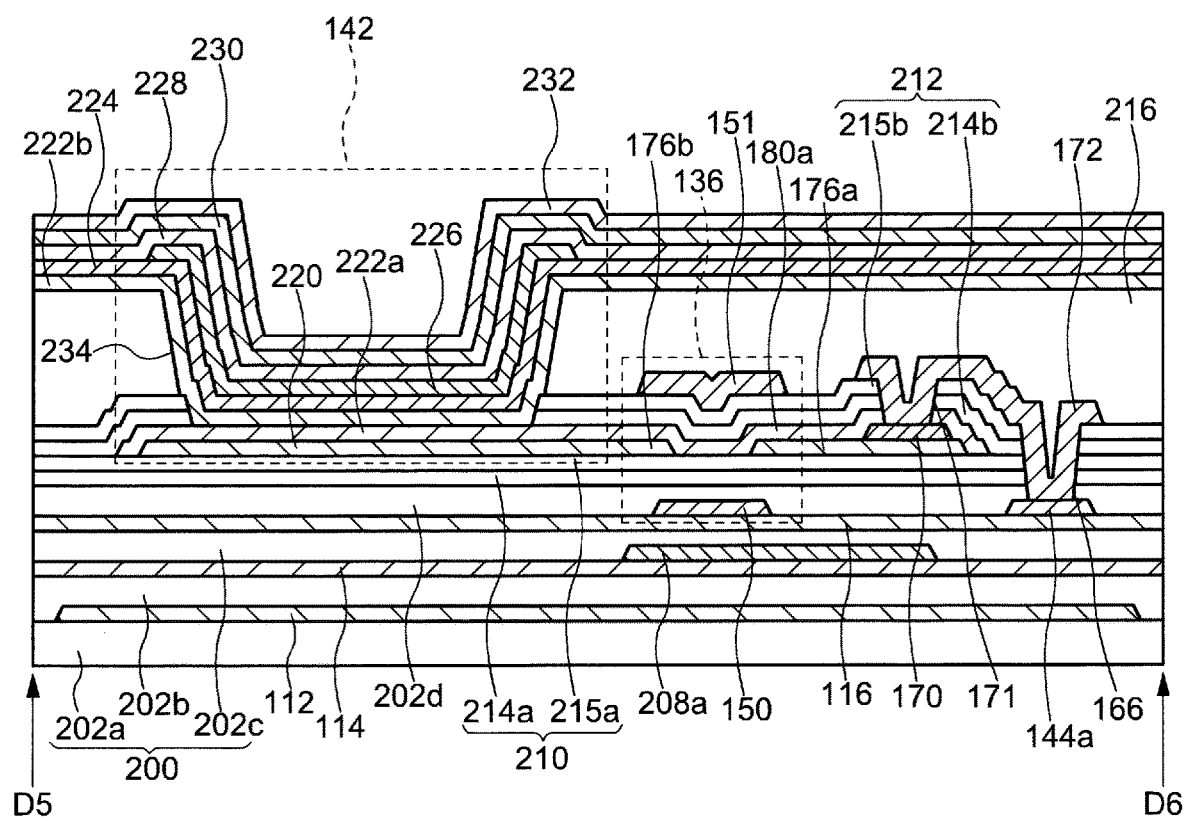
FIG. 19A is a cross sectional view corresponding to the line D5-D6 shown in FIG. 18, and shows the configuration of the sub-pixel of the display device with a touch and fingerprint sensor according to an embodiment of the present invention.
Figure 19B:
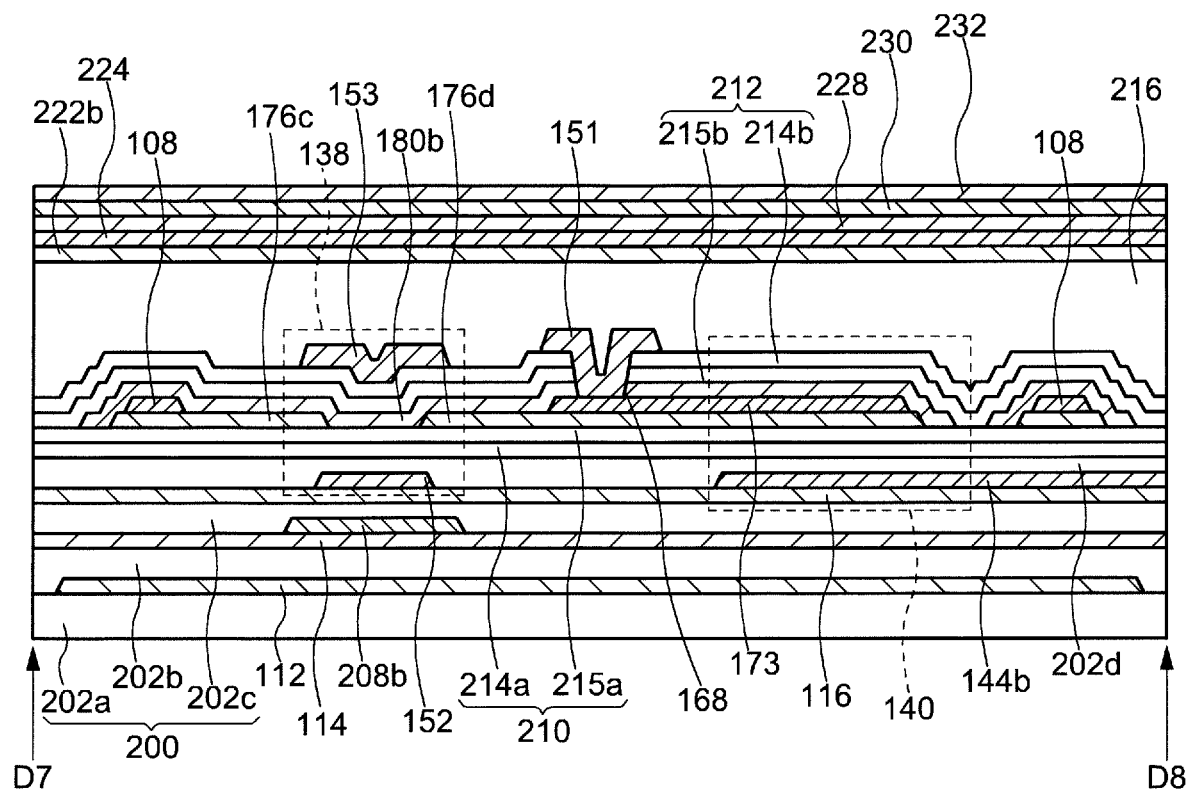
FIG. 19B is a cross sectional view corresponding to the line D7-D8 shown in FIG. 18, and shows the configuration of the sub-pixel of the display device with a touch and fingerprint sensor according to an embodiment of the present invention.

FIG. 18 shows a planar layout of the sub-pixel 105 and shows a different configuration of connections between the drive transistor 136 and the common electrode 144a with respect to the sub-pixel 105 shown in FIG. 15. FIG. 19A also shows a cross-sectional structure corresponding to the line D5-D6 shown in FIG. 18, and FIG. 19B shows a cross-sectional structure corresponding to the line D7-D8.

As shown in FIG. 18 and FIG. 19A, the source wiring 170 of the drive transistor 136 is connected to the common electrode 144a by a connecting wiring 172 formed of the same conductive layer as the second gate electrode 151. The connecting wiring 172 is connected to the source wiring 170 by a contact hole 171 formed in the second insulating layer 212 and is connected to the common electrode 144a by a contact hole 166 formed in the second insulating layer 212, the first insulating layer 210, and the fourth transparent resin layer 202d. Such connecting structures may also realize the first sub-pixel 105r, the second sub-pixel 105g, and the third sub-pixel 105b shown in the equivalent circuitry of FIG. 4.

Figure 20:
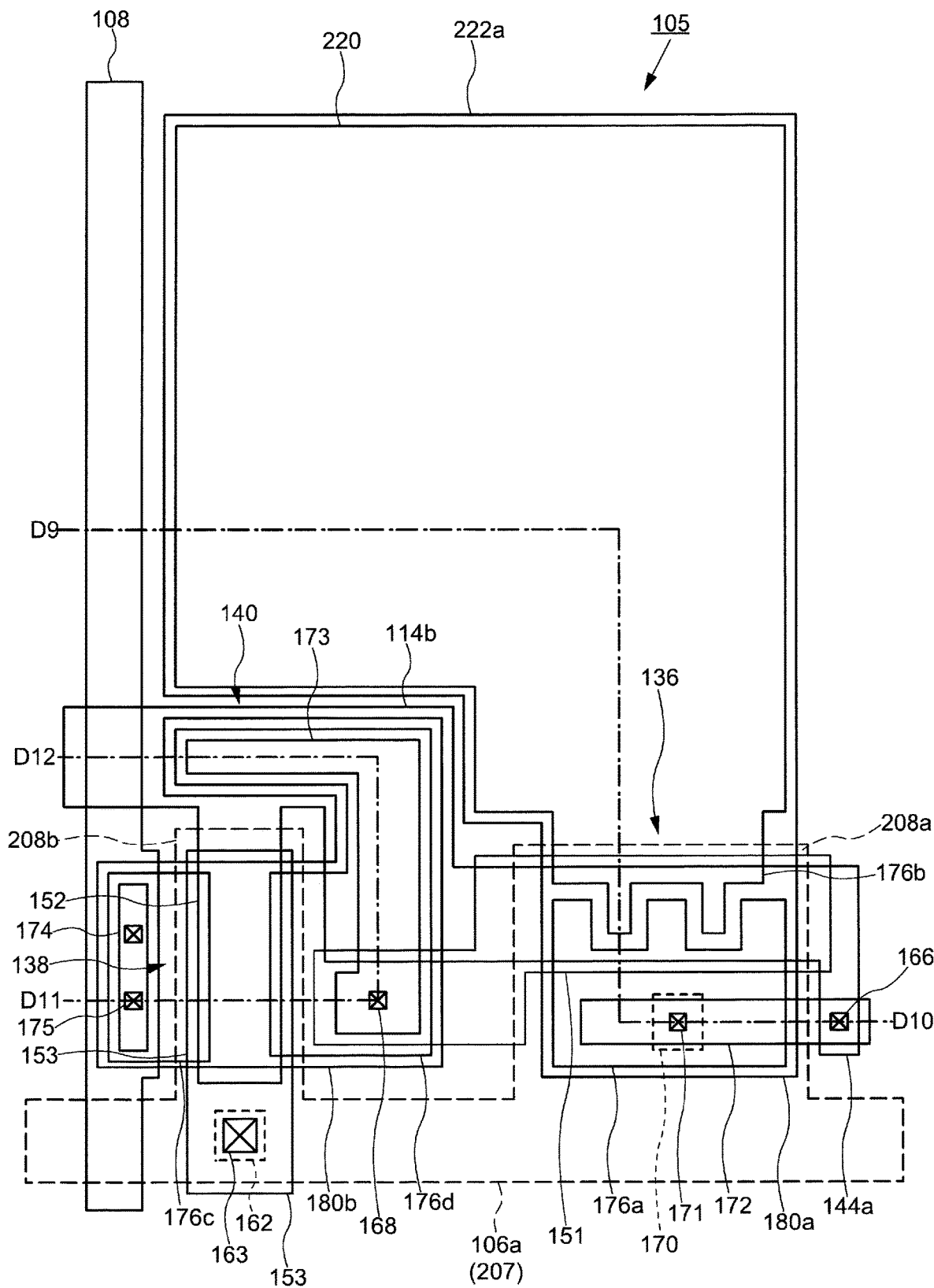
FIG. 20 is an example of a planar layout of a drive transistor, a select transistor, a capacitive element, and an EL element that constitute a sub-pixel of a display device with a touch and fingerprint sensor according to an embodiment of the present invention.
Figure 21A:
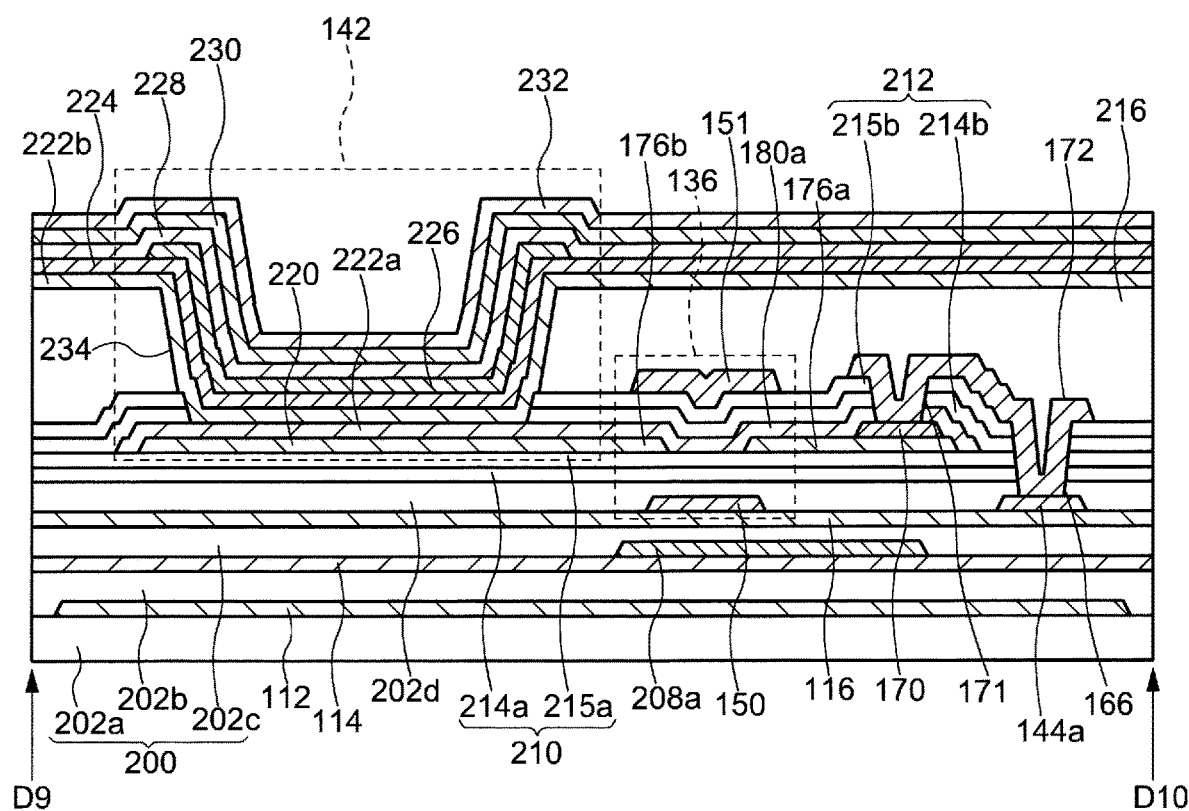
FIG. 21A is a cross sectional view corresponding to the line D9-D10 shown in FIG. 20, and shows the configuration of the sub-pixel of the display device with a touch and fingerprint sensor according to an embodiment of the present invention.

FIG. 20 shows a planar layout of sub-pixel 105 and shows a different configuration of connections between the select transistor 138 and the data signal line 108 with respect to the sub-pixel 105 shown in FIG. 18. FIG. 21A also shows a cross-sectional structure corresponding to the line D9-D10 shown in FIG. 20, and FIG. 21B shows a cross-sectional structure corresponding to the line D11-D12.

Figure 21B:
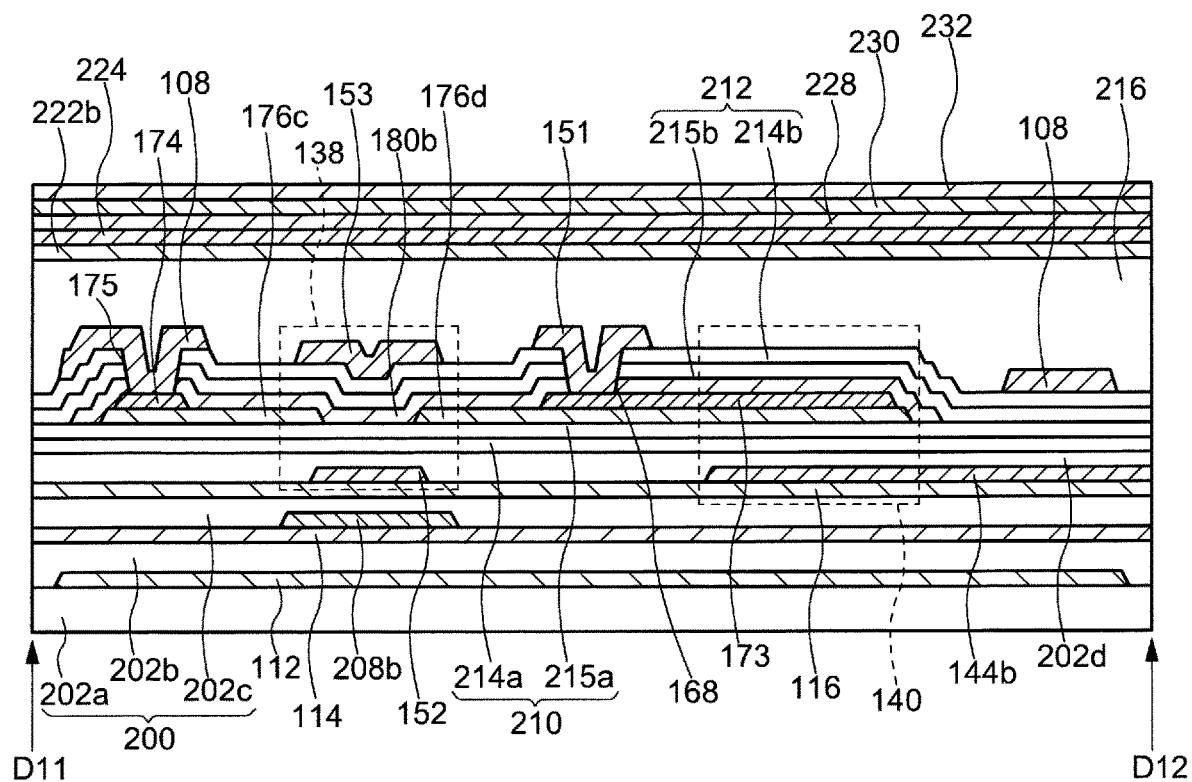
FIG. 21B is a cross sectional view corresponding to the line D11-D12 shown in FIG. 20, and shows the configuration of the sub-pixel of the display device with a touch and fingerprint sensor according to an embodiment of the present invention.

As shown in FIG. 20 and FIG. 21B, a source electrode 174 of the select transistor 138 is connected to the data signal line 108 formed of the same conductive layer as the second gate electrode 153. The data signal line 108 is disposed on the second insulating layer 212 and is connected to the source electrode 174 via a ninth contact hole 175. The scanning signal line 106a is disposed below the first insulating layer 210. Accordingly, even when the second insulating layer 212 is thin, even when the data signal line 108 disposed on the same layer as the second gate electrode 153 is disposed to intersect the scanning signal line 106a, short circuits at the intersection can be prevented.

1-6. Sealing Structure

Figure 22A:
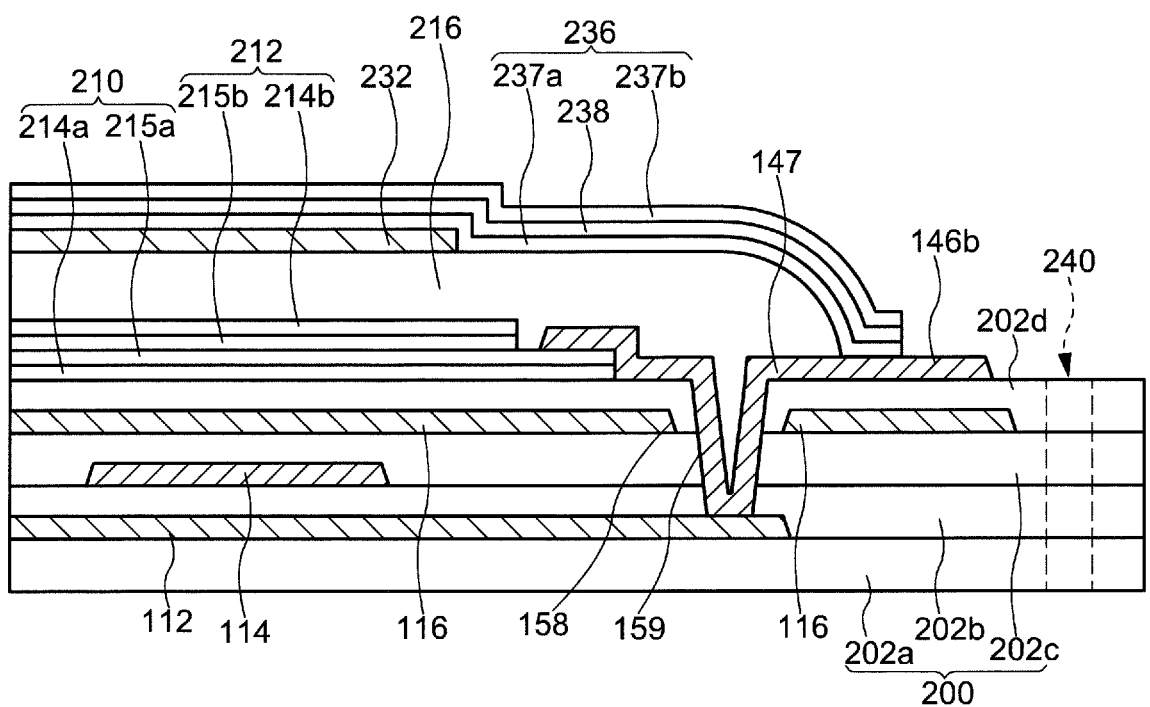
FIG. 22A is an example of a connection structure between a first sensor electrode and a drawer wiring of a display device with a touch and fingerprint sensor according to an embodiment of the present invention, in which a light shielding layer extends below a terminal part.

FIG. 22A shows an exemplary configuration of connections between the first sensor electrode 112 and a drawer wiring 147. The drawer wiring 147 is a wiring that connects the first sensor electrode 112 to the second connecting terminal 146b. The first sensor electrode 112 is connected to the drawer wiring 147 in the outer area of the display part 102. The drawer wiring 147 is disposed on the fourth transparent resin layer 202d as well as the second connecting terminal 146b. Similar to the construction shown in FIG. 5, the shield electrode 116 is disposed extending below the second connecting terminal 146b. The second connecting terminal 146b is disposed on the upper side of the shield electrode 116 to withstand the crimping process when connecting the flexible circuit board 126 and to prevent recess, deformation, and peeling of the second connecting terminal 146b.

The shield electrode 116 has the first opening 158. The first contact hole 159 with a hole diameter smaller than the diameter of the first opening 158 is disposed in this portion. The first contact hole 159 passes through the fourth transparent resin layer 202d, the third transparent resin layer 202c, and the second transparent resin layer 202b to expose a top surface of the first sensor electrode 112. The drawer wiring 147 extends from the second connecting terminal 146b to the first contact hole 159 and is connected to the first sensor electrode 112.

Figure 22B:
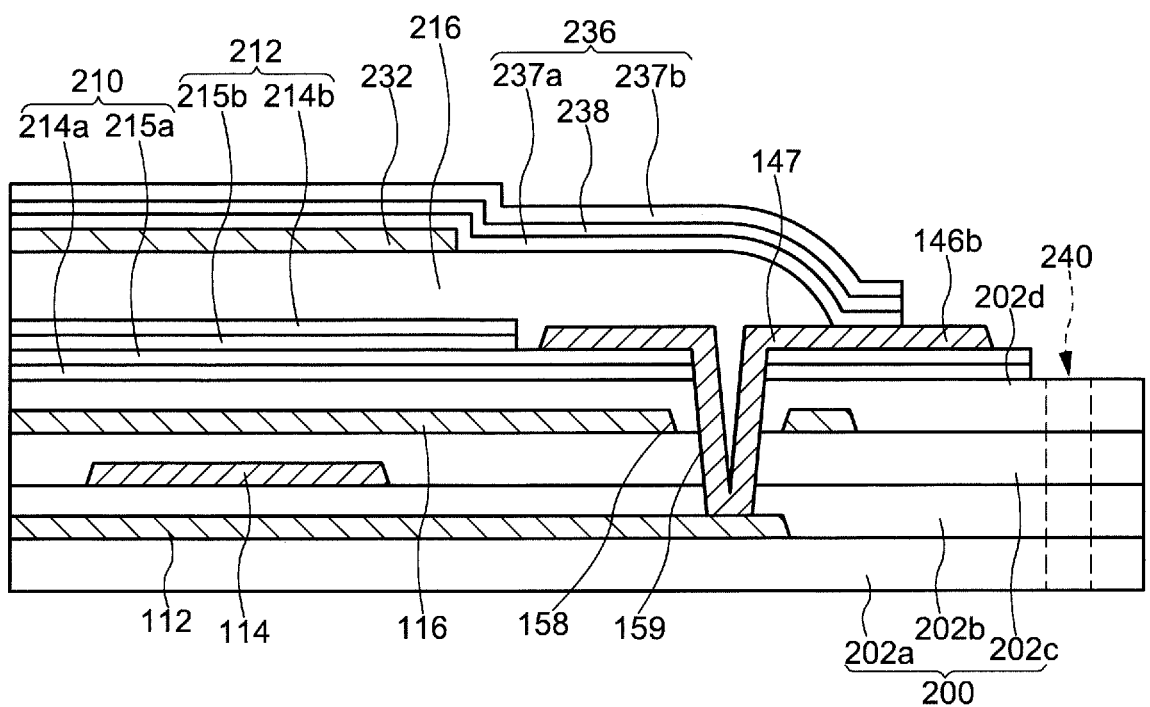
FIG. 22B is an example of a connection structure between a first sensor electrode and a drawer wiring of a display device with a touch and fingerprint sensor according to an embodiment of the present invention, in which a first insulating layer extends below a terminal part.

The first insulating layer 210, the second insulating layer 212, and the third insulating layer 216 are disposed on the fourth transparent resin layer 202d. The second electrode 232 is disposed on the third insulating layer 216. FIG. 22A and FIG. 22B show a structure in which a sealing layer 236 is disposed on the upper side of the second electrode 232. The sealing layer 236 has a variety of structures, but has a structure in which, for example, a silicon nitride carbon film 237a, a silicon nitride film 238, and a silicon carbon nitride film 237b are laminated is preferred.

The drawer wiring 147 is extended outward (toward the edge of the transparent resin substrate 200) from the area covered by the third insulating layer 216 and the sealing layer 236, and is connected to the second connecting terminal part 146b. The drawer wiring 147 and the second connecting terminal 146b are formed in the same conductive layer and in one continuous pattern.

FIG. 22A shows the transparent resin substrate 200 with a dividing region 240 in the area near the edge of the transparent resin substrate 200. The transparent resin substrate 200 is disposed on a support substrate, which is not shown in the figure, during the manufacturing process, and is divided at the dividing region 240 when it is broken into individual panels. The dividing region 240 is formed with a continuous aperture groove that surrounds the display panel. The aperture grooves are formed, for example, by laser processing. The transparent resin substrate 200 is peeled off from the support substrate by a laser ablation process after forming the dividing region 240.

FIG. 22B shows a configuration in which the shield electrode 116 does not extend to an area of the second connecting terminal 146b, as shown in FIG. 7. Preferably, the first insulating layer 210 is disposed below the drawer wiring 147 and the second connecting terminal 146b. The drawer wiring 147 is connected to the first sensor electrode 112 by the first contact hole 159 that passes through the first insulating layer 210, the fourth transparent resin layer 202d, the third transparent resin layer 202c, and the second transparent resin layer 202b.

Even if the shield electrode 116 is not disposed on the underside of the second connecting terminal 146b, the first insulating layer 210 can be disposed to withstand the crimping process when connecting the flexible circuit board 126, and to prevent sinking, deformation, and peeling of the second connecting terminal 146b. Although not shown in the figure, the same advantageous effect can be obtained even if both the first insulating layer 210 and the shield electrode 116 are disposed on the lower side of the second connecting terminal 146b. Although not shown in FIG. 22A and FIG. 22B, the structure of the first connecting terminal 146a in the terminal part is also similar to that of the second connecting terminal 146b, and the same advantageous effect can be achieved.

Figure 23A:
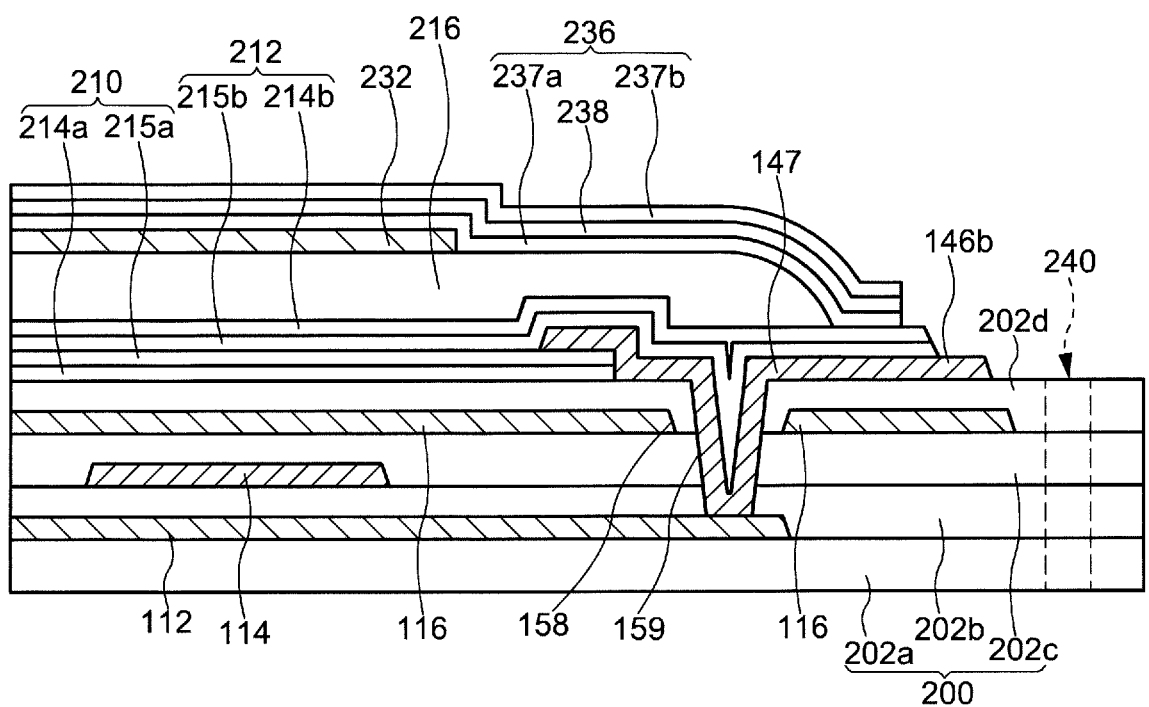
FIG. 23A is an example of a connection structure between a first sensor electrode and a drawer wiring of a display device with a touch and fingerprint sensor according to an embodiment of the present invention, in which a light shielding layer extends below a terminal part and a second insulating layer extends above the drawer wiring.
Figure 23B:
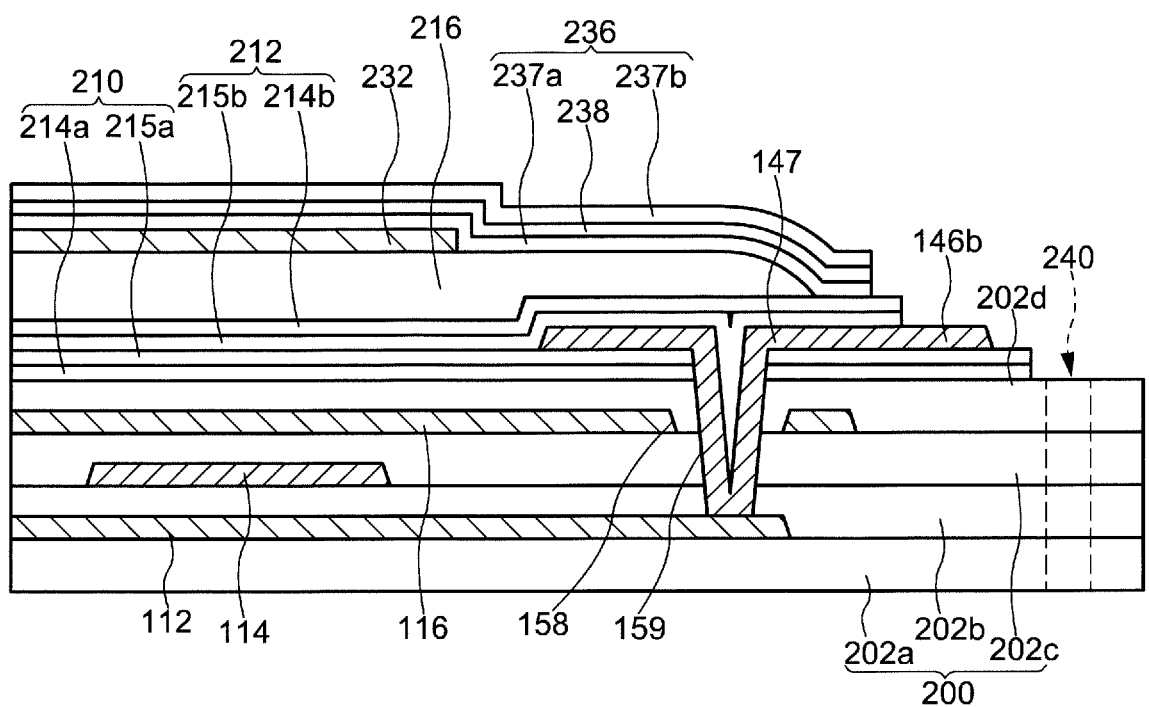
FIG. 23B is an example of a connection structure between a first sensor electrode and a drawer wiring of a display device with a touch and fingerprint sensor according to an embodiment of the present invention, in which a first insulating layer extends below a drawer wiring and a second insulating layer extends above the drawer wiring.

FIG. 23A and FIG. 23B show a different configuration of the second insulating layer 212 from FIG. 22A and FIG. 22B. The explanation of FIG. 23A and FIG. 23B will focus on the parts that differ from FIG. 22A and FIG. 22B.

FIG. 23A shows a structure in which the shield electrode 116 is disposed under the second connecting terminal 146b and the second insulating layer 212 is disposed over the drawer wiring 147. The second insulating layer 212 covers the top and sides of the drawer wiring 147 and is disposed in contact with the fourth transparent resin layer 202d in the area where the drawer wiring 147 is not disposed, which is not shown in the figure. The second insulating layer 212 is disposed extending outside of the third insulating layer 216 (on the side of the second connecting terminal 146b). The second insulating layer 212 has an area outside the third insulating layer 216 in contact with the sealing layer 236.

The second insulating layer 212 and the sealing layer 236 include an insulating film formed of an inorganic insulating material. Such a second insulating layer 212 and the sealing layer 236 may be disposed in contact with the outside of the third insulating layer 216 to improve the sealing performance. As shown in FIG. 16A, layers forming the EL elements 142 are disposed on the third insulating layer 216. The third insulating layer 216 in contact with the EL element 142 is sandwiched between the second insulating layer 212 and the sealing layer 236, and the edge of the third insulating layer 216 is located inside the outer edge of the second insulating layer 212 and the sealing layer 236 to improve the ability to prevent degradation of the EL element 142. Furthermore, since the second insulating layer 212 functions as a protective film for the drawer wiring 147, deterioration and damage to the wiring can be prevented. The other structure is similar to FIG. 22A, and the same advantageous effects can be obtained.

FIG. 23B has a structure in which the first insulating layer 210 is disposed under the second connecting terminal 146b and the second insulating layer 212 is disposed over the drawer wiring 147. This structure can also improve sealing performance in the same way as the structure shown in FIG. 23A. The other structure is similar to FIG. 22B, and the same advantageous effect can be obtained. Although not shown in FIG. 23B, the same advantageous effect can be obtained even if both the first insulating layer 210 and the shield electrode 116 are disposed on the lower side of the second connecting terminal 146b.

Figure 24A:
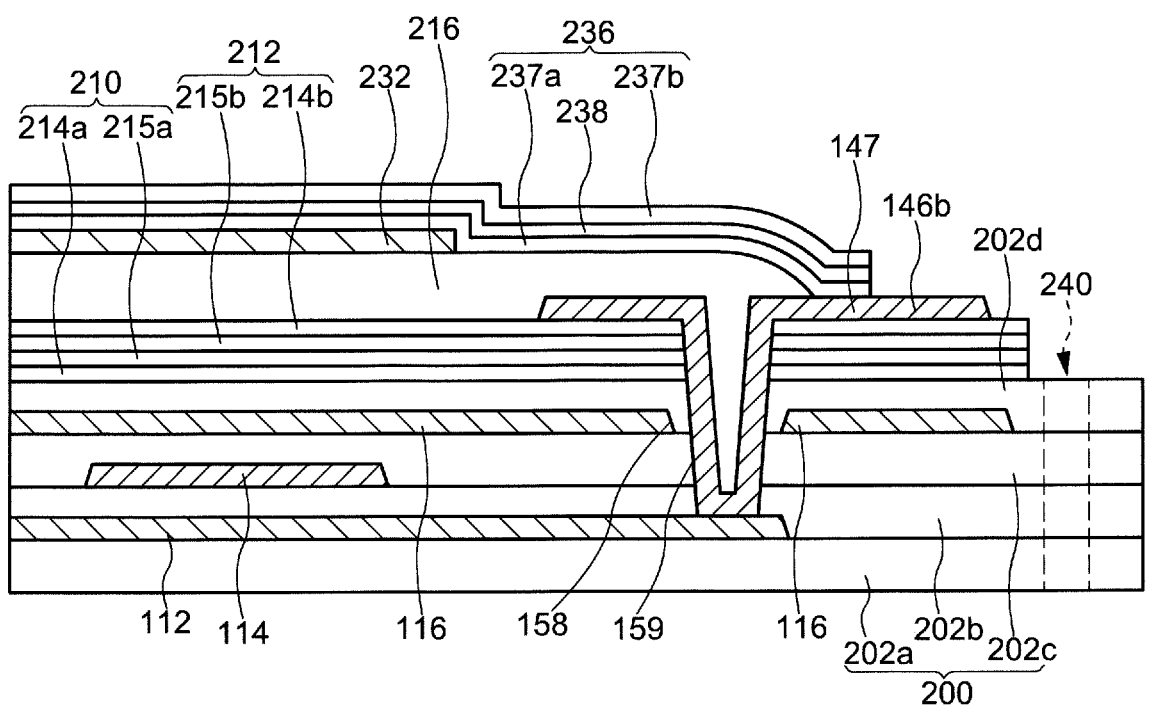
FIG. 24A is an example of a connection structure between a first sensor electrode and a drawer wiring of a display device with a touch and fingerprint sensor according to an embodiment of the present invention, in which a light shielding layer, a first insulating layer, and a second insulating layer extend below a drawer wiring and a terminal part.
Figure 24B:
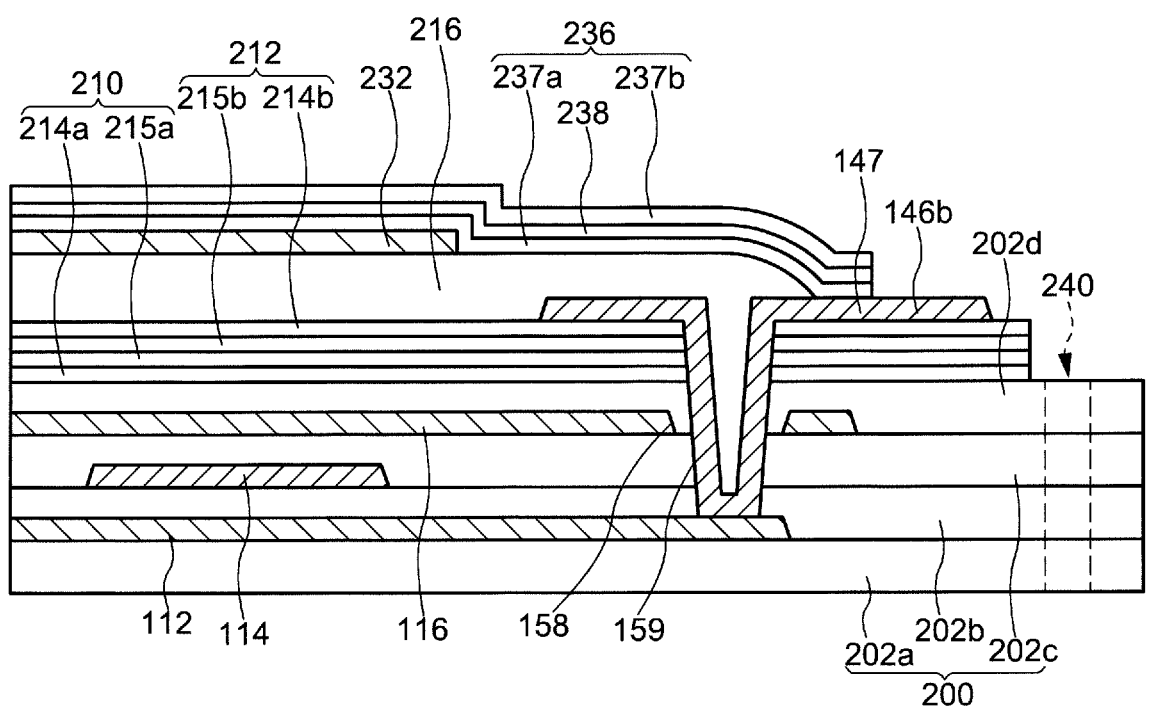
FIG. 24B is an example of a connection structure between a first sensor electrode and a drawer wiring of a display device with a touch and fingerprint sensor according to an embodiment of the present invention, in which a first insulating layer and a second insulating layer extend below a terminal part.

FIG. 24A and FIG. 24B show a different configuration of the first insulating layer 210 and the second insulating layer 212 from FIG. 23A and FIG. 23B. The explanation of FIG. 24A and FIG. 24B will focus on the parts that differ from FIG. 23A and FIG. 23B.

FIG. 24A and FIG. 24B have a structure in which the shield electrode 116 is disposed under the second connecting terminal 146b, and the first insulating layer 210 and the second insulating layer 212 are disposed under the drawer wiring 147 and the second connecting terminal 146b. Since the first insulating layer 210 and the second insulating layer 212 are disposed on the entire underside of the second connecting terminal 146b, the second connecting terminal 146b can withstand the crimping process when connecting the flexible circuit board 126, and the resistance to sinking, deformation, and peeling of the second connecting terminal 146b can be further enhanced.

The sealing layer 236 has an area outside the third insulating layer 216 where it contacts the drawer wiring 147 and also contacts the second insulating layer 212 (not shown), which enhances sealing performance and prevents degradation of the EL element 142.

Figure 25A:
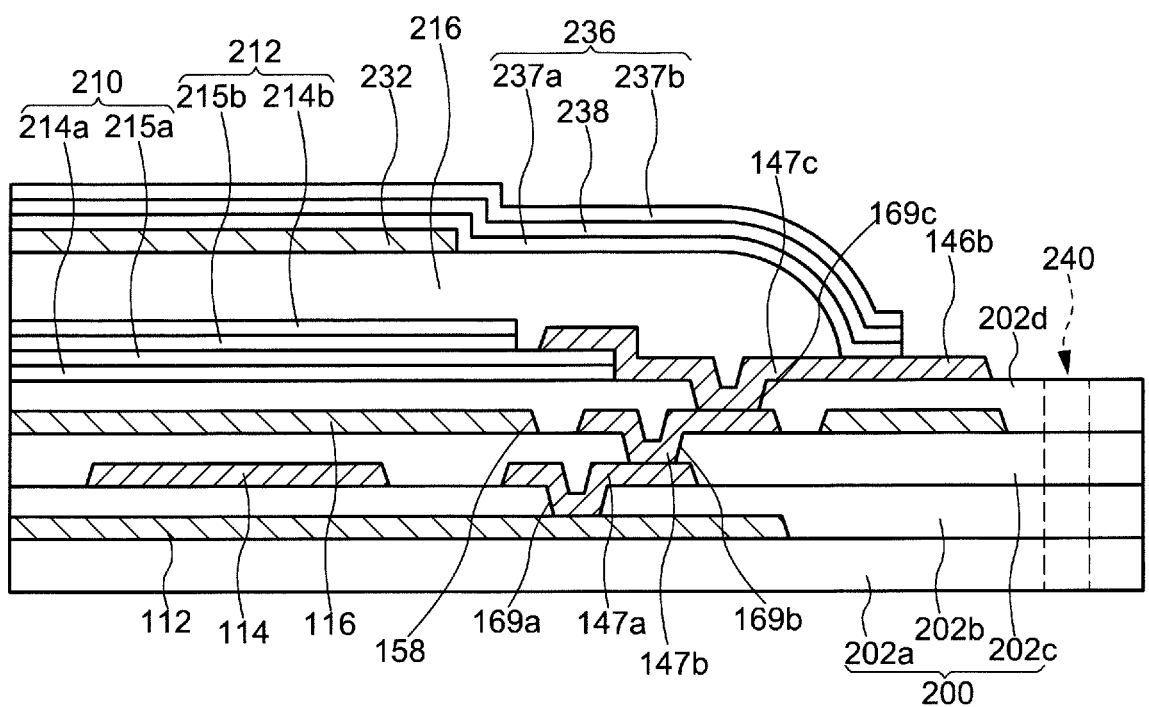
FIG. 25A is an example of a connection structure between a first sensor electrode and a drawer wiring of a display device with a touch and fingerprint sensor according to an embodiment of the present invention, in which a light shielding layer is disposed below a terminal part and a drawer wiring is connected to the first sensor electrode via a plurality of contact holes.
Figure 25B:
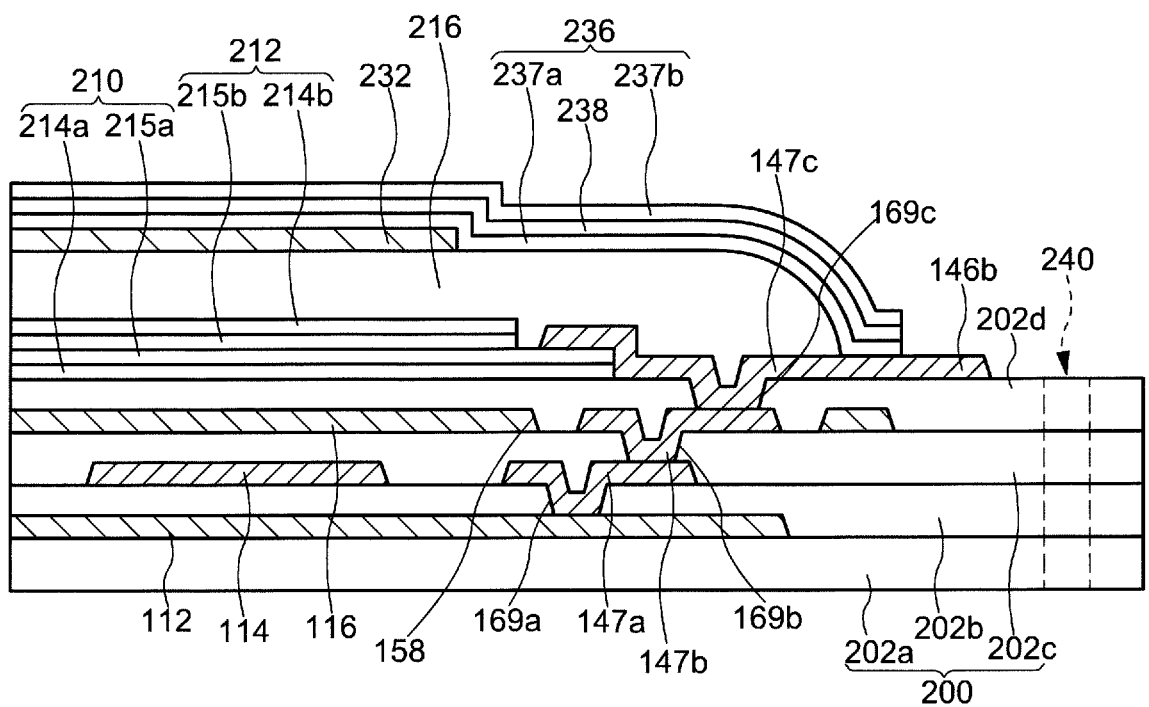
FIG. 25B is an example of a connection structure between a first sensor electrode and a drawer wiring of a display device with a touch and fingerprint sensor according to an embodiment of the present invention, in which the drawer wiring is connected to the first sensor electrode via a plurality of contact holes.

FIG. 25A and FIG. 25B show an aspect in which the configuration of the drawer wiring 147 is different from that of FIG. 22A and FIG. 22B. The difference between FIG. 25A and FIG. 25B is in the presence or absence of the shield electrode 116 beneath the second connecting terminal 146b. The description of FIG. 25A and FIG. 25B will be described with respect to portions that differ from FIG. 22A and FIG. 22B.

As shown in FIG. 25A and FIG. 25B, the connection structure of the first sensor electrode 112 and the second connecting terminal 146b has a structure connected by a plurality of contact holes and a plurality of drawer wirings. Specifically, a contact hole 169a is formed in the second transparent resin layer 202b, and a first drawer wiring 147a is connected to the first sensor electrode 112, a contact hole 169b is formed in the third transparent resin layer 202c, and a second drawer wiring 147b is connected to the first drawer wiring 147a, a contact hole 169c is formed in the fourth transparent resin layer 202d, and a third drawer wiring 147c is connected to the second drawer wiring 147b.

The contact hole 169a connecting the first drawer wiring 147a to the first sensor electrode 112 and the contact hole 169b connecting the second drawer wiring 147b to the first drawer wiring 147a are in different positions. The contact hole 169b connecting the second drawer wiring 147b to the first wiring 147a and the contact hole 169c connecting the third drawer wiring 147c to the second wiring 147b are in different positions. Thus, it is possible to make the depth of each contact hole shallower by shifting the positions of the plurality of contact holes, and the connection of the drawer wirings can be formed securely.

The configuration shown in FIG. 25A and FIG. 25B can be applied to the configuration shown in FIG. 23A and FIG. 23B, FIG. 24A and FIG. 24B.

1-7. Flexible Circuit Board and Integrated Circuit

Figure 26:
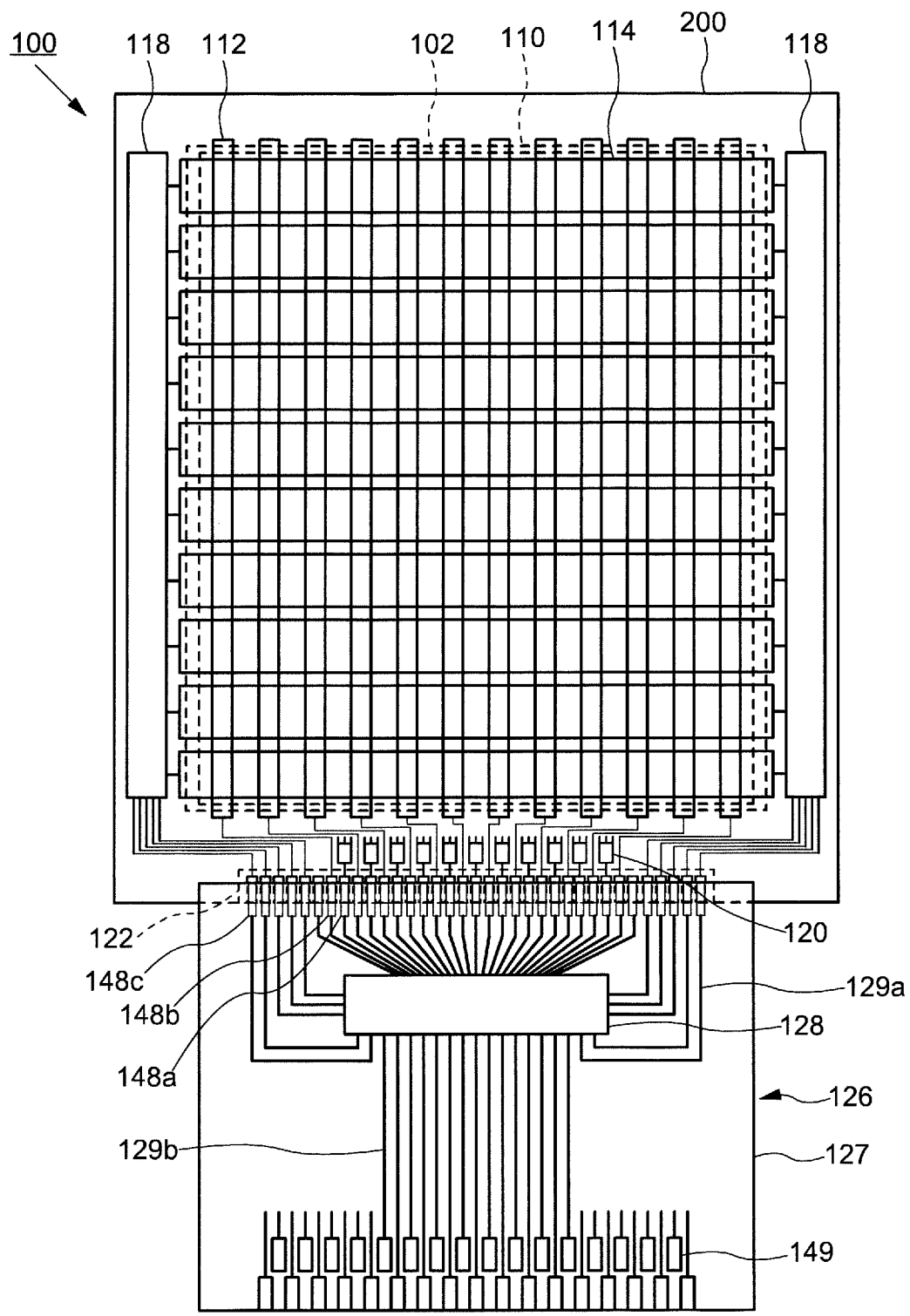
FIG. 26 is a configuration of the display part, a touch and fingerprint sensor part, switching circuits, and a flexible circuit board of a display device with a touch and fingerprint sensor according to an embodiment of the present invention.

FIG. 26 shows a configuration of the transparent resin substrate 200 on which the display part 102 and the touch and fingerprint sensor part 110 are disposed, and the flexible circuit board 126 on which the second drive circuit 128 is disposed.

The flexible circuit board 126 includes the third connecting terminal 148a, the fourth connecting terminal 148b, a fifth connecting terminal 148c, a sixth connecting terminal 149, and wiring groups 129a, 129b on a film substrate 127. The wiring group 129 connects between the third connecting terminals 148 to the fifth connecting terminals 148c and the second drive circuit 128, and between the second drive circuit 128 and the sixth connecting terminal 149. The third connecting terminal 148a is connected to the first connecting terminal 146a on the transparent resin board 200, the fourth connecting terminal 148b is connected to the second connecting terminal 146b on the transparent resin board 200, the fifth connecting terminal 148c is connected to the connecting terminal connected to the first drive circuit 118 on the transparent resin board 200. The sixth connecting terminal 149 is connected to an external circuit that drives the display device with the touch and fingerprint sensor 100.

The second drive circuit 128 is a composite integrated circuit that integrates the first scanning signal line drive circuit block, the data signal line drive circuit block, and the touch and fingerprint sensor detection circuit block, as shown in FIG. 5. The second drive circuit 128 is mounted on the surface of the film substrate 127 by COF (Chip on Film).

Figure 27:
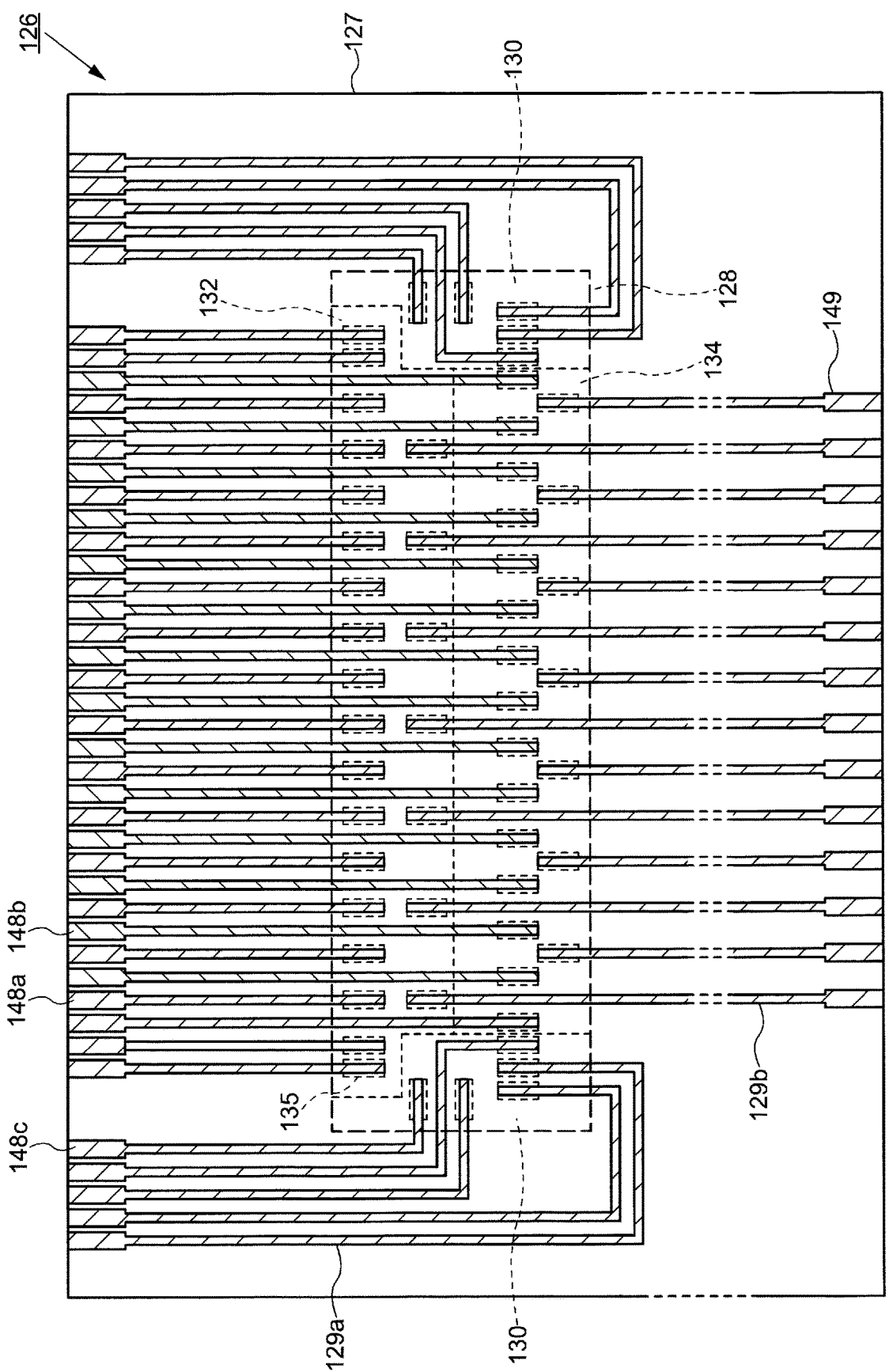
FIG. 27 is a wiring structure of a flexible circuit board of a display device with a touch and fingerprint sensor according to an embodiment of the present invention.

FIG. 27 shows a plan view of the flexible circuit board 126. The flexible circuit board 126 includes the third connecting terminal 148a, the fourth connecting terminal 148b, and the fifth connecting terminal 148c on the first side of the film substrate 127 formed of polyimide or the like, and the sixth connecting terminal 149 on the second side opposite the first side. The second drive circuit 128 is mounted in the central area of the film substrate 127. FIG. 27 shows the area in which the second drive circuit 128 is implemented in dotted lines.

The wiring group 129a is disposed in the areas between the third connecting terminal 148a, the fourth connecting terminal 148b, and the fifth connecting terminal 148c and the second drive circuit 128. The wiring group 129b is disposed in the area between the second drive circuit 128 and the sixth connecting terminal 149. Each of the wirings of the wiring group 129b is drawn from the sixth connecting terminal 149 to the area where pads 135 of the second drive circuit 128 is located. Each of the wirings of the wiring group 129a is drawn from the area where the pads 135 of the second drive circuit 128 is located to the third connecting terminal 148a, the fourth connecting terminal 148b, and the fifth connecting terminal 148c.

The pads 135 of the second drive circuit 128 are disposed corresponding to the functional blocks. That is, the pads 135 of the second drive circuit 128 are disposed in the areas of the respective circuit blocks corresponding to the scanning signal line drive circuit block 130, the data signal line drive circuit block 132, and the touch and fingerprint sensor detection circuit block 134. The connection between the respective wirings of the wiring groups 129a, 129b and the pads 135 is connected by a conductive material. The connections between the third connecting terminal 148a, the fourth connecting terminal 148b, and the fifth connecting terminal 148c and the connecting terminal on the transparent resin substrate 200 are also connected by a conductive material.

Figure 28:
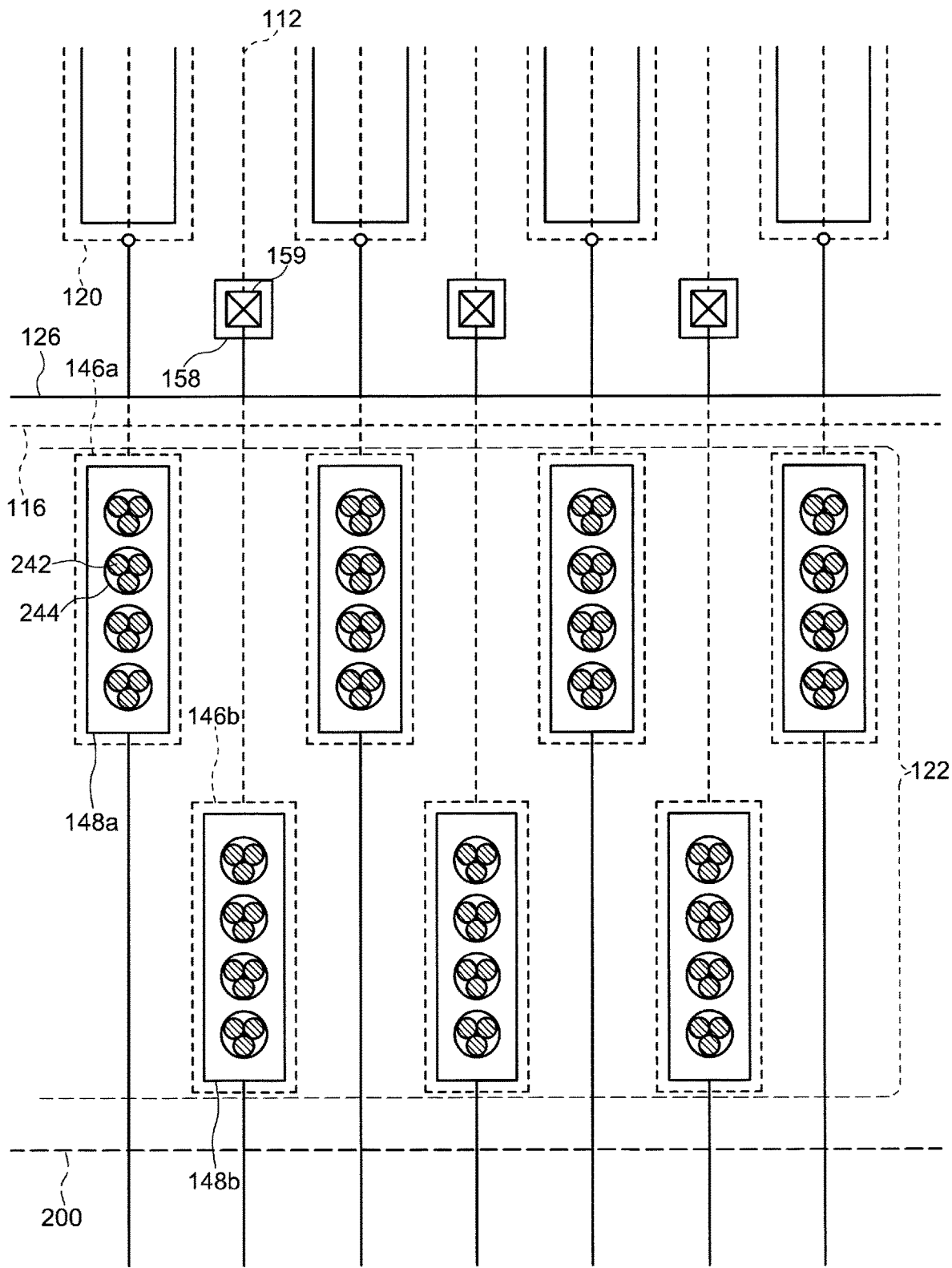
FIG. 28 is a connection structure of a terminal part and a flexible circuit board of a display device with a touch and fingerprint sensor according to an embodiment of the present invention.

FIG. 28 shows a configuration of the switching circuit 120 and the first sensor electrode 112 shown in FIG. 7 in which the flexible circuit board 126 is overlaid on the terminal part 122 and the connecting terminal is connected with conductive materials. The flexible circuit board 126 is disposed with the third connecting terminal 148a and the fourth connecting terminal 148b corresponding to the first connecting terminal 146a and the second connecting terminal 146b disposed in the terminal part 122 of the transparent resin substrate 200. As described with reference to FIG. 5, the first connecting terminal 146a is connected to the switching circuit 120 and the second connecting terminal 146b is connected to the first sensor electrode 112 via the first contact hole 159 disposed in the inner area of the first opening 158 of the shield electrode 116.

The first connecting terminal 146a and the third connecting terminal 148a and the second connecting terminal 146b are spaced apart from the fourth connecting terminal 148b. At least one conductive particle 242 is disposed between the first connecting terminal 146a and the third connecting terminal 148a. The at least one conductive particle 242 is held in a pressurized deformed condition between the first connecting terminal 146a and the third connecting terminal 148a. The at least one conductive particle 242 contacts the first connecting terminal 146a and the third connecting terminal 148a. The first connecting terminal 146a and the third connecting terminal 148a are electrically connected by the at least one conductive particle 242. Similarly, conductive particles are disposed between the second connecting terminal 146b and the fourth connecting terminal 148b. Preferably, the at least one conductive particle 242 includes a plurality of conductive particles.

The plurality of conductive particles 242 are disposed over the first connecting terminal 146a (or the third connecting terminal 148a) in a dispersed in a resin 244. When the first connecting terminal 146a and the third connecting terminal 148a are facing to each other in this state, and the distance between them is narrowed to the extent that the plurality of conductive particles 242 are pressurized and deformed, the plurality of conductive particles 242 can protrude from the resin 244 and make direct contact with the first connecting terminal 146a and the third connecting terminal 148a.

It is preferred that the plurality of conductive particles 242 be included in the resin 244. For example, it is preferred that 2 to 7 conductive particles 242 be included in a single region of resin 244. As a result, the plurality of conductive particles 242 will be interposed between the first connecting terminal 146a and the third connecting terminal 148a to ensure electrical connection.

As shown in FIG. 28, the resin 244 containing the plurality of conductive particles 242 is disposed between the first connecting terminal 146a and the third connecting terminal 148a in a plurality of positions. In other words, the conductive particles 242 are disposed between the first connecting terminal 146a and the third connecting terminal 148a in a controlled number and position. It is possible to reliably form an electrical connection and prevent a short circuit with the adjacent connecting terminal, by arranging the plurality of conductive particles 242 in a controlled number and position in the area between the first connecting terminal 146a and the third connecting terminal 148a. This configuration is effective when the pitch of the connecting terminals is narrower.

It is preferable that a diameter of the plurality of conductive particles 242 be in the range of 2 μm to 10 μm or less. Such a size can prevent short circuits between adjacent connecting terminals even when the pitch of the connecting terminals is 30 μm or less. As shown in FIG. 28, when the resin 244 containing a plurality of conductive particles 242 is disposed in several discrete locations between connecting terminals, the spacing between the discrete locations should be 5 μm or more. This arrangement can prevent the resin 244 containing the plurality of conductive particles 242 from protruding from the first connecting terminal 146a and the third connecting terminal 148a, and the spacing between the first connecting terminal 146a and the third connecting terminal 148a can be kept constant.

The structure, shape, and material of the conductive particle 242 are not limited, but may be, for example, a particle nucleus of a highly hard resin material coated with a rubber-like elastic resin, or a particle nucleus of a highly hard inorganic material coated with a rubber-like inorganic elastic material, which is coated with a metal such as nickel (Ni), copper (Cu), or gold (Au). The shape of the conductive particle 242 is not limited to a sphere, but may be oblong or a composite.

The resin 244 is a curable resin material. The curable resin material includes radical polymerization type resin materials. The radical polymerization type resin material is preferably a (meth)acrylic monomer or (meth)acrylate oligomer, and those bonded in the ester type are more preferred. The (Meth)acrylate oligomers can be those having at least one or more of a (meth)acryloyl group, such as epoxy acrylate, urethane acrylate, polyester acrylate, polybutadiene acrylate, polyol acrylate, polyether acrylate, silicone resin acrylate, and melamine acrylate can be used. It can be either monofunctional or multifunctional, but more preferably contains multifunctional monomers or oligomers. The curable resin material may be composed of two or more of (meth)acrylate monomers and (meth)acrylate oligomers.

Although not shown, a second resin may be disposed around the resin 244. The second resin is a curable resin material. Fluorene acrylate can be used as the curable resin material. As the curable resin material, an ene compound having two or more functional groups selected from the group consisting of allyl ether groups, vinyl ether groups, acrylate groups, and methacrylate groups in a molecule or an ene compound that is a mixture of two or more of the above ene compounds, or an ene/thiol curable resin containing a thiol compound having two or more thiol groups in one molecule which is obtained by an oxidative compound treatment may also be used.

The resin 244 and the second resin further contain a photo-curing initiator component. The photo-curing initiator component is a photo-radical initiator, which can be any compound that generates radicals when irradiated with ultraviolet or visible light. For example, acetophenone initiators, benzoin ether initiators, benzophenone initiators, alpha-diketone initiators, and thioxanthone initiators can be used as UV radical initiators.

The resin 244 containing the plurality of conductive particles 242 can be provided over the first connecting terminal 146a (or the third connecting terminal 148a) by a printing method. The offset printing method is used as the printing method. Since the resin 244 corresponding to the ink contains the plurality of conductive particles 242, it is preferable to use a pad printing method that uses an intaglio plate in the offset printing method.

Since the resin 244 containing the plurality of conductive particles 242 is placed on the first connecting terminal 146a (or the third connecting terminal 148a) using a printing method to connect the flexible circuit board 126 to the transparent resin substrate 200, the connection can be made accurately even if the connecting terminals are finer and narrower in pitch. The display device with the touch and fingerprint sensor 100 of the present embodiment increases the number of connecting terminals for taking out sensor signals due to the finer first sensor electrode 112 of the touch and fingerprint sensor part 110. As shown in FIG. 26, even when the terminal part 122 has a narrower pitch by including in the same array the connecting terminals for inputting signals for displaying images on the display part 102 and the connecting terminals for the touch and fingerprint sensor part 110, it is possible to form an electrical connection by attaching the flexible circuit board 126 to the terminal part 122 with the resin 244 containing the plurality of conductive particles 242.

Figure 29:
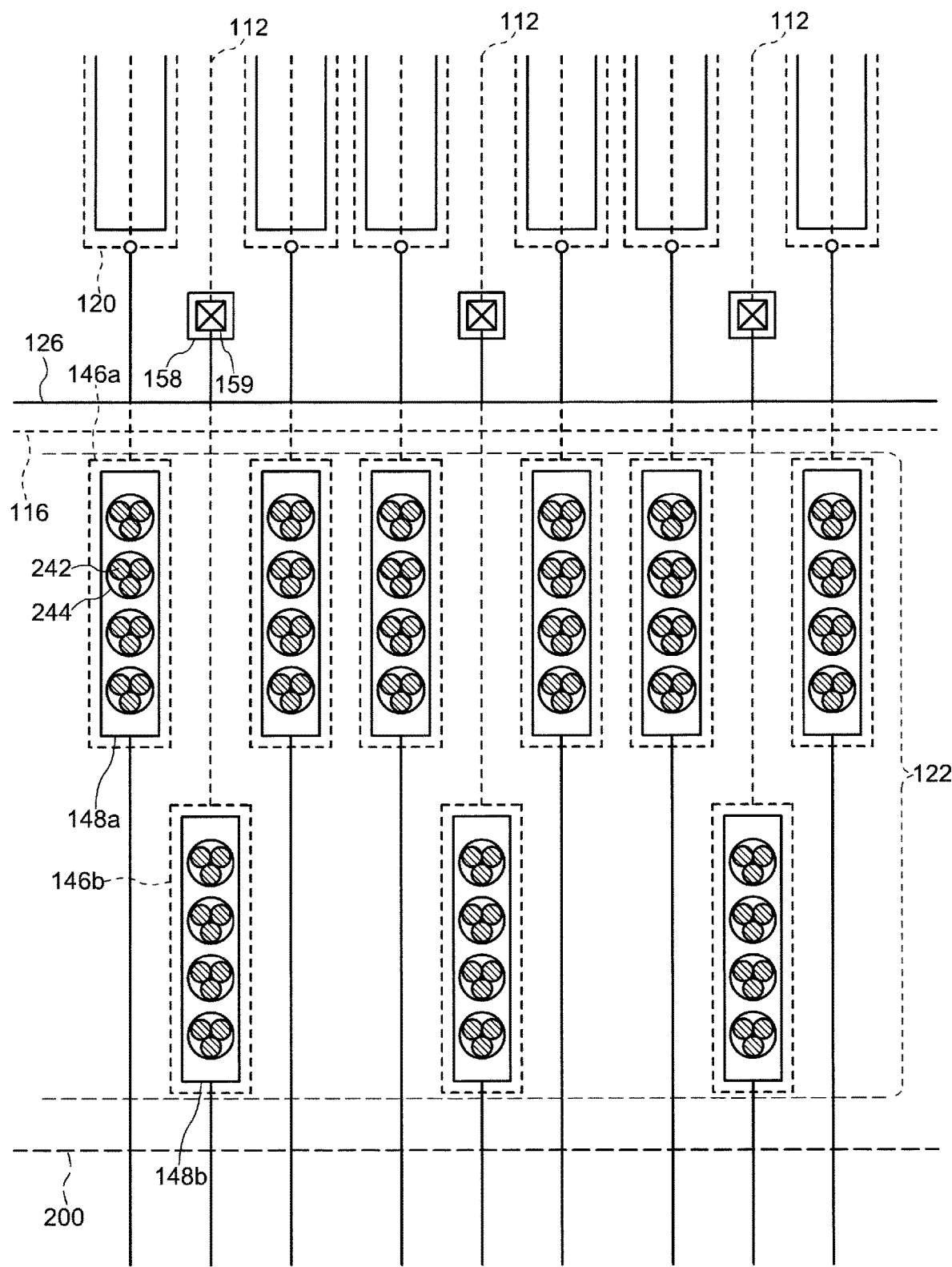
FIG. 29 is a configuration for connecting a terminal part and a flexible circuit board of a display device with a touch and fingerprint sensor according to an embodiment of the present invention.

FIG. 29 shows a configuration of the switching circuit 120 and the first sensor electrode 112 shown in FIG. 8, with the flexible circuit board 126 overlaid on the terminal part 122 and the connecting terminals connected with a conductive material. FIG. 29 shows a configuration in which one first sensor electrode 112 is disposed for an array of two columns of pixels 104. Therefore, the first connecting terminal 146*a*, which is disposed in the terminal part 122 and connected to the switching circuit 120, and the third connecting terminal 148*a*, which is disposed on the flexible circuit board 126, are disposed close together. It is possible to prevent short circuits between adjacent terminals even with this arrangement of connecting terminals by using the plurality of conductive particles 242 dispersed in a controlled number in the resin 244 when connecting the first connecting terminal 146*a* and the third connecting terminal 148*a*.

Figure 30:
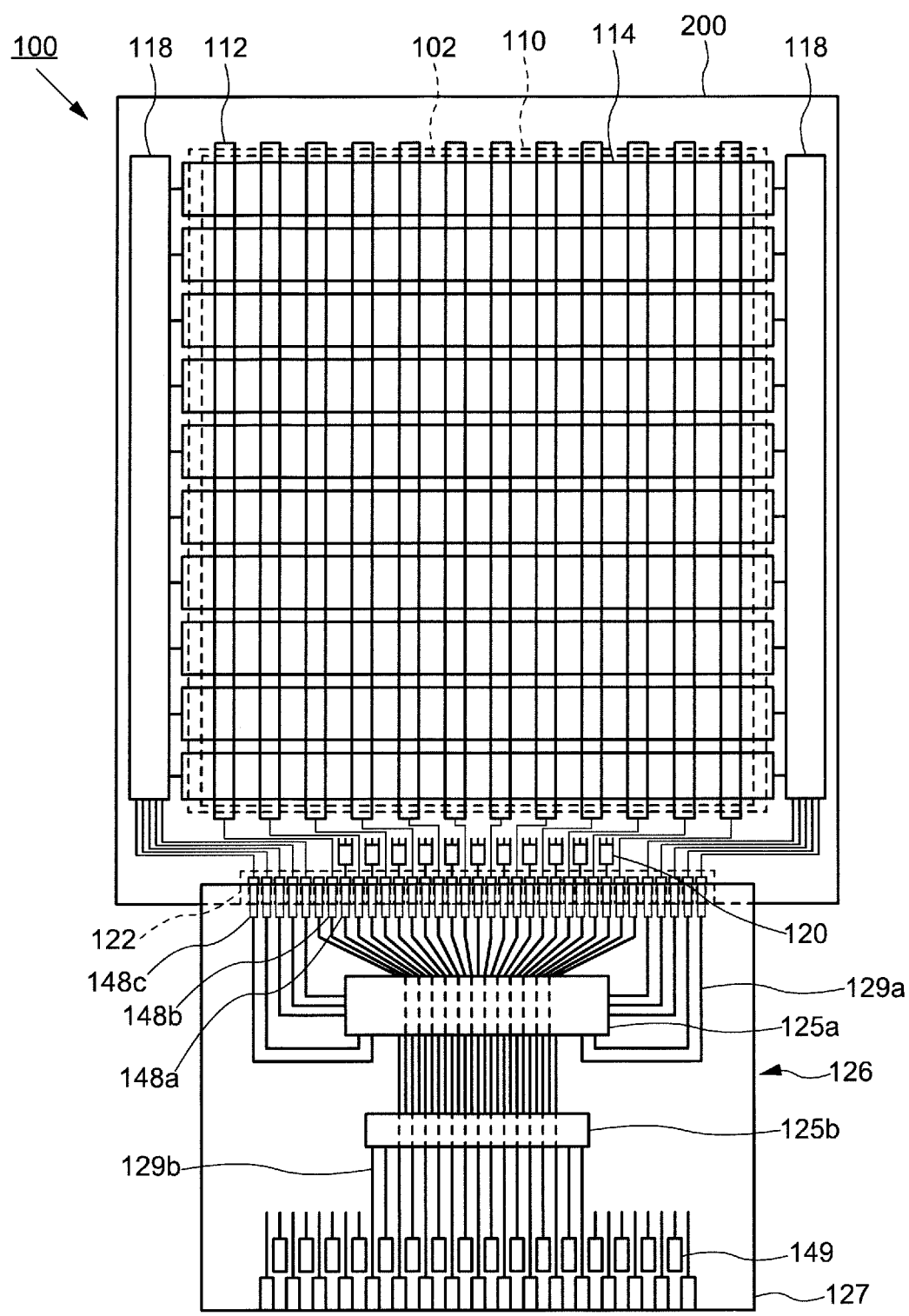
FIG. 30 is a configuration of a display part, a touch and fingerprint sensor, switching circuits, and a flexible circuit board of a touch and fingerprint sensor according to an embodiment of the present invention.

FIG. 30 shows an example in which the second drive circuit 128 is composed of the composite integrated circuit in which multiple functions are integrated. The display device with the touch and fingerprint sensor 100 is not limited to this example, and as shown in FIG. 30, a driver IC 125*a* that drives the display part 102 and a driver IC 125*b* that drives the touch and fingerprint sensor are formed in separate IC chips and mounted on the flexible circuit board 126, and they may be mounted on the flexible circuit board 126.

Figure 31:
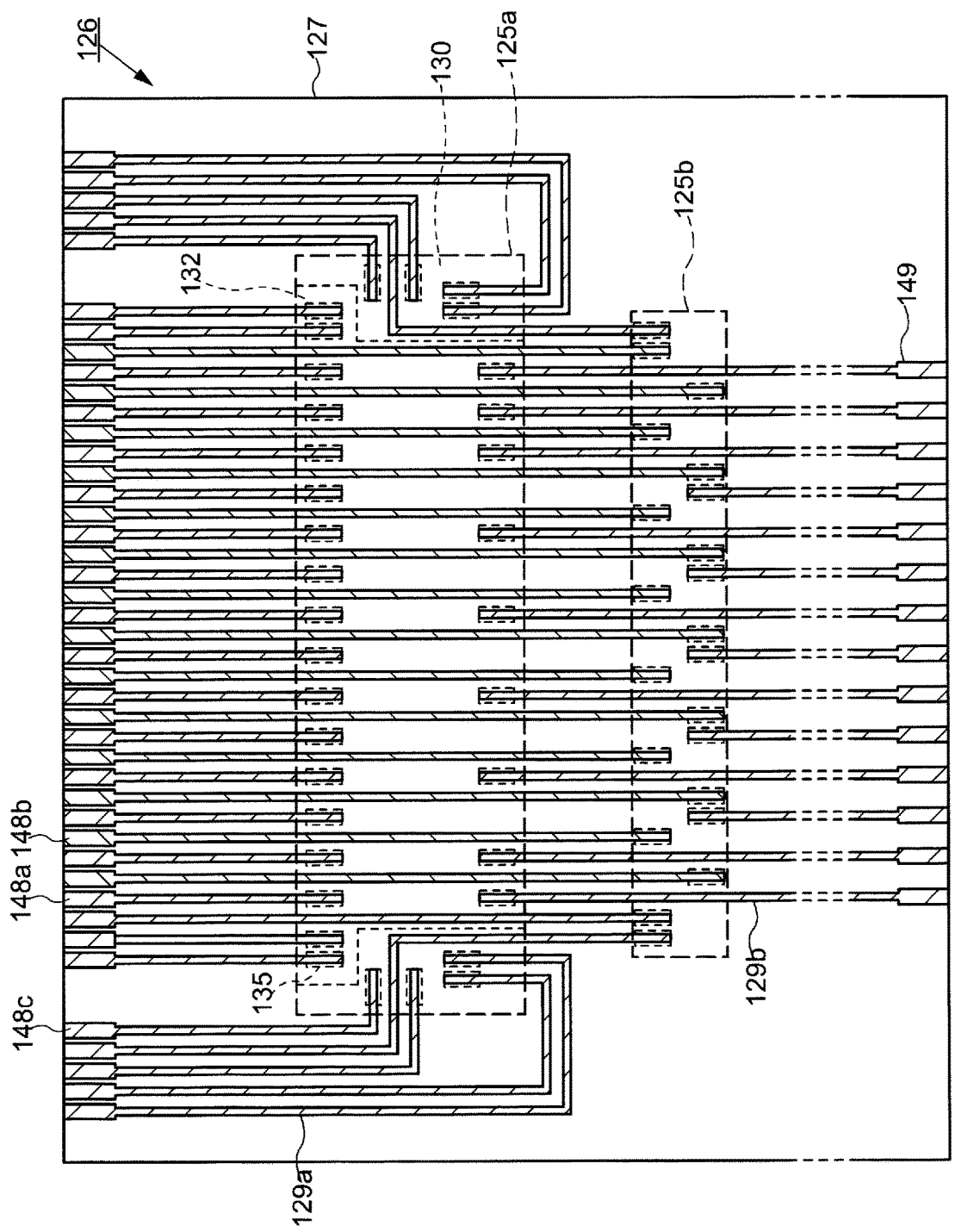
FIG. 31 is a wiring structure of a flexible circuit board of a display device with a touch and fingerprint sensor according to an embodiment of the present invention.

FIG. 31 shows a plan view of the flexible circuit board 126 on which the driver IC 125*a* that drives the display part 102 and the driver IC 125*b* that drives the touch and fingerprint sensors are mounted. The wiring from which the signal of the first sensor electrode 112 is output passes through the region of the driver IC 125*a* that drives the display part and is arranged to reach the driver IC 125*b* that drives the touch and fingerprint sensors. The wiring connecting the driver IC 125*a* that drives the display part to the sixth connecting terminal 149 is arranged to pass through the region of the driver IC 125*b* that drives the touch and fingerprint sensors and reach the sixth connecting terminal 149.

The driver IC 125*a* that drives the display part may be partitioned into the scanning signal line drive circuit block 130 and the data signal line drive circuit block 132. In this embodiment, the first drive circuit 118 serves as the scanning signal line drive circuit and the drive circuit for the second sensor electrode 114, as shown in FIG. 2. To the first drive circuit 118, signals to drive the scanning signal lines are output from the driver IC 125*a* that drives the display part, and signals to control the drive of the second sensor electrode are output from the driver IC 125*b* that drives the touch and fingerprint sensors.

As shown in FIG. 30 and FIG. 31, it is possible to mount two driver ICs on the flexible circuit board 126 by changing the wiring structure, even if the driver IC that drives the display part and the driver IC that drives the touch and fingerprint sensor part are provided separately.

The display device with a touch and fingerprint sensor according to present embodiment can suppress the increase of connecting terminals even when a touch and fingerprint sensor part is disposed by connecting the data signal line to the switching circuit. In other words, it is possible to connect the data signal line to the switching circuit to suppress the increase in the number of connecting terminals even when the first sensor electrode (receiver electrode) is densely arranged. As a result, connection failures with the flexible circuit board can be reduced at the terminal part.

According to the display device with a touch and fingerprint sensor according to the present embodiment, the scanning signal line of the display part 102 can be used together as an auxiliary electrode to reduce the resistance of the second sensor electrode, by connecting the second sensor electrode (transmitter electrode) of the touch and fingerprint sensor part 110 and the scanning signal line of the display part 102. In addition, a short circuit between the data signal line and the scanning signal line can be prevented even if the second gate insulating layer is thin, and the drive performance of the transistor (thin film transistor) can be increased, by making the scanning signal line contact the second sensor electrode and connecting the second gate electrode to the scanning signal line via a contact hole. Furthermore, the light shielding layer for the transistor can be formed with said metal layer, by forming the scanning signal lines with a metal layer in contact with the second sensor electrode.

Second Embodiment

Figure 32:
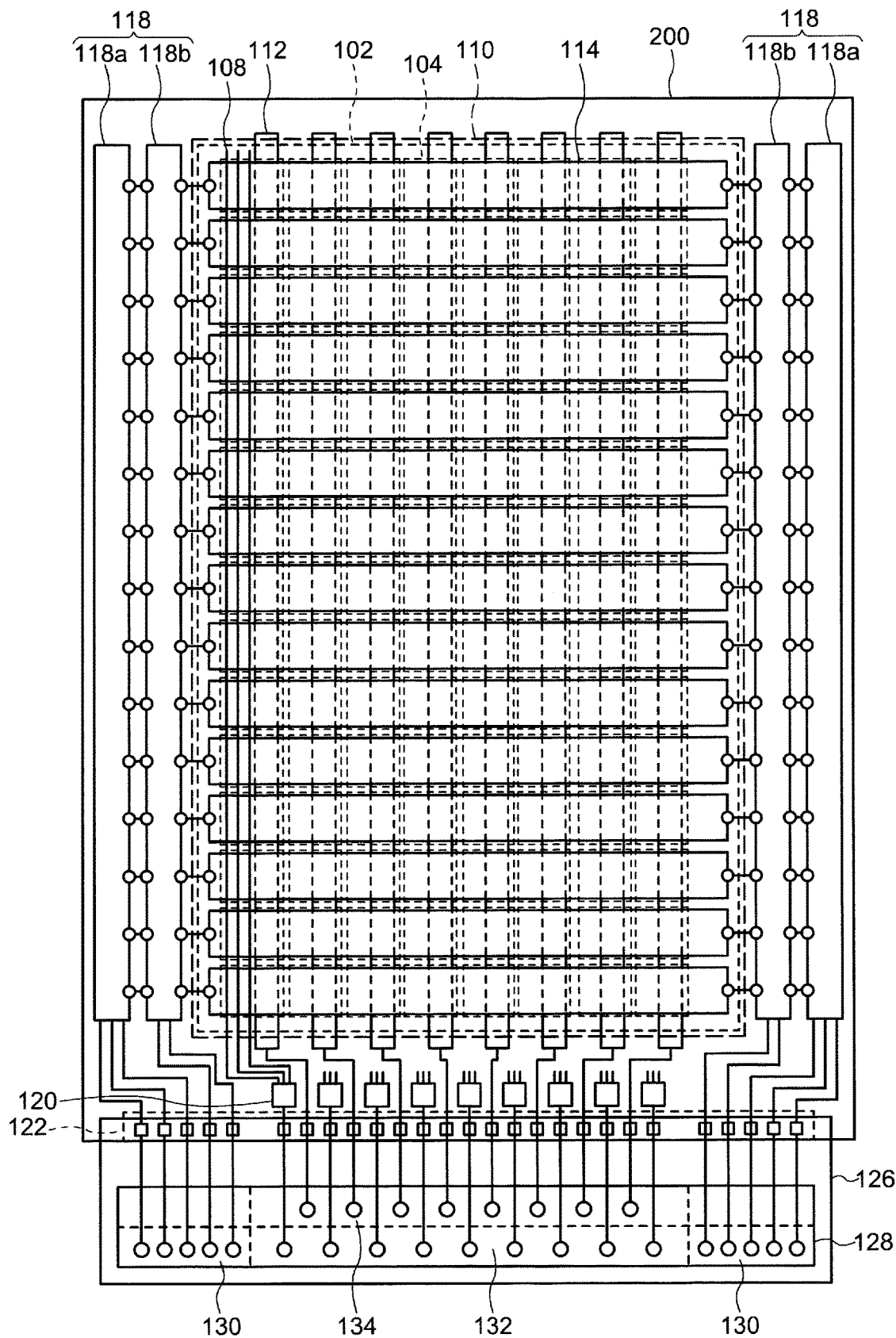
FIG. 32 is a configuration of a display part, a touch and fingerprint sensor, switching circuits, and a drive circuit of a touch and fingerprint sensor according to an embodiment of the present invention.

FIG. 32 shows the display device with the touch and fingerprint sensor 100, which includes the display unit 102 with the plurality of pixels 104, the touch and fingerprint sensor 110 with the first sensor electrode 112 and the second sensor electrode 114, the first drive circuit 118, the switching circuit 120, the terminal part 122, and the flexible circuit board 126. The first drive circuit 118 includes the scanning signal line drive circuit 118*a* that outputs scanning signals to the scanning signal lines and scan signals to the second sensor electrode 114, and an output switching circuit 118*b* that switches the connection between the scanning lines and the second sensor electrode 114.

The second drive circuit 128 may be formed by a composite integrated circuit in which circuit blocks having different functions are integrated as in the first embodiment. The control signals for the scanning signal line drive circuit 118*a* and the output switching circuit 118*b* are output from the scanning signal line drive circuit block 130.

Figure 33:
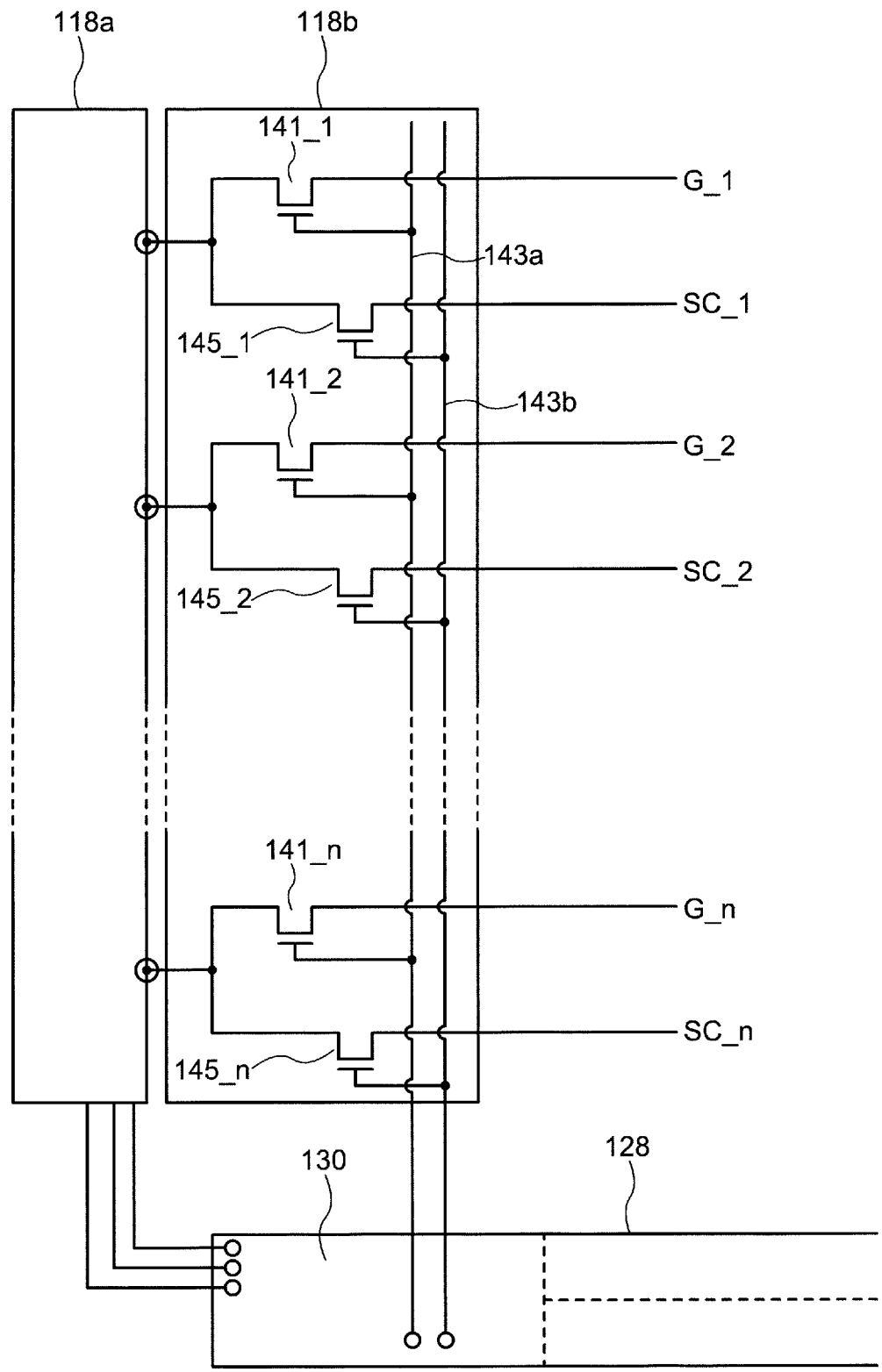
FIG. 33 is an example of an output switching circuit of a display device with a touch and fingerprint sensor according to an embodiment of the present invention.

FIG. 33 shows an example of the output switching circuit 118*b* corresponding to the arrangement of the second sensor electrode 114 shown in FIG. 9. The output switching circuit 118*b* includes a first switching element 141_1 connected to the scanning signal line (G_1) and a second switching element 145_1 connected to the second sensor electrode 114 (SC_1), for the output of the first drive circuit 118. The first switching element 141_1 and the second switching element 145_1 are connected in parallel. The first switching elements 141_1 to 141_*n* are disposed for the scanning signal lines (G_1 to G_n) and the second switching elements 145_1 to 145_*n* are disposed for the second sensor electrodes 114 (SC_1 to SC_n). The first switching element 141_1 and the second switching element 145_1 are formed by transistors, and the gates which control on/off are connected to a first output switching signal line 143*a* and a second output switching signal line 143*b*. The first output switching signal line 143*a* and the second output switching signal line 143*b* are connected to the second drive circuit 128, and their on-off is controlled by the control signal output from the scanning signal line drive circuit block 130.

The first switching elements 141_1 to 141_*n* are turned on by the control signal on the first output switching signal line 143*a* and the second switching elements 145_1 to 145_*n* are turned off by the control signal on the second output switching signal line 143*b*, and scanning signals are sequentially output to the scanning signal lines (G_1 to G_n), in a display period. The first switching elements 141_1 to 141_n are turned off by the control signal on the first output switching signal line 143a and the second switching elements 145_1 to 145_n are turned on by the control signal on the second output switching signal line 143b, and the scan signals are sequentially output to the second sensor electrodes 114 (SC_1 to SC_n), in the sensing period. Thus, the first drive circuit 118 switches the scanning signal lines (G_1 to G_n) and the second sensor electrodes 114 (SC_1 to SC_n) by means of the first switching elements 141_1 to 141_n and the second switching elements 145_1 to 145_n, thus the scanning signal line drive circuit that drives the display part 102 and the scanning circuit of the touch and fingerprint sensor part 110 can be shared.

Figure 34:
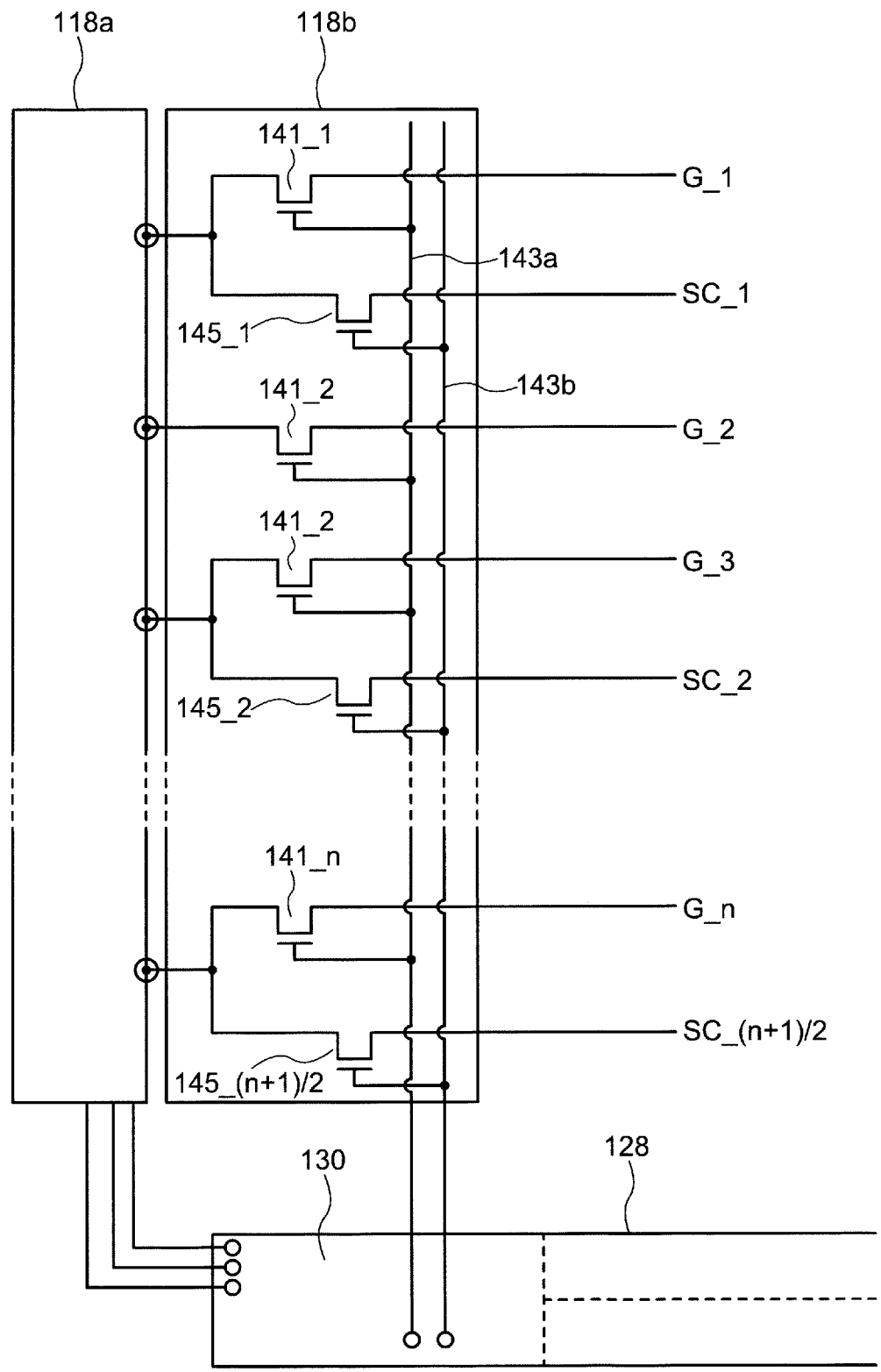
FIG. 34 is an example of an output switching circuit of a display device with a touch and fingerprint sensor according to an embodiment of the present invention.

FIG. 34 shows a configuration of the switching circuit 118b corresponding to the arrangement of the second sensor electrodes 114 shown in FIG. 10. The configuration shown in FIG. 10 has one second sensor electrode 114 for two rows of pixels 104, so the number of second sensor electrodes 114 is half the number of scanning signal lines. Therefore, the output switching circuit 118b has a circuit in which the first switching element 141_1 connected to the scanning signal line (G_1) and the second switching element 145_1 connected to the second sensor electrode 114 (SC_1) are arranged in parallel to the output of the first drive circuit 118, and a circuit in which only the first switching element 141_2 connected to the second scanning signal line (G_2). The configuration of the switching circuit 118b shown in FIG. 34 can similarly switch the scanning signal lines (G_1 to G_n) and the second sensor electrodes 114 (SC_1 to SC_(n+1)/2) to drive the display unit 100 with touch and fingerprint sensors.

The display device with a touch and fingerprint sensor shown in FIG. 32 is similar to the display device with a touch and fingerprint sensor described in the first embodiment, except for the different configuration of the first drive circuit 118, and the same advantageous effects can be obtained.

Third Embodiment

This embodiment shows an example of a display device with a touch and fingerprint sensor that differs from the first embodiment in the configuration of the drive circuit that outputs scanning and scan signals. In the following description, details will focus on the parts that differ from the first embodiment.

Figure 35:
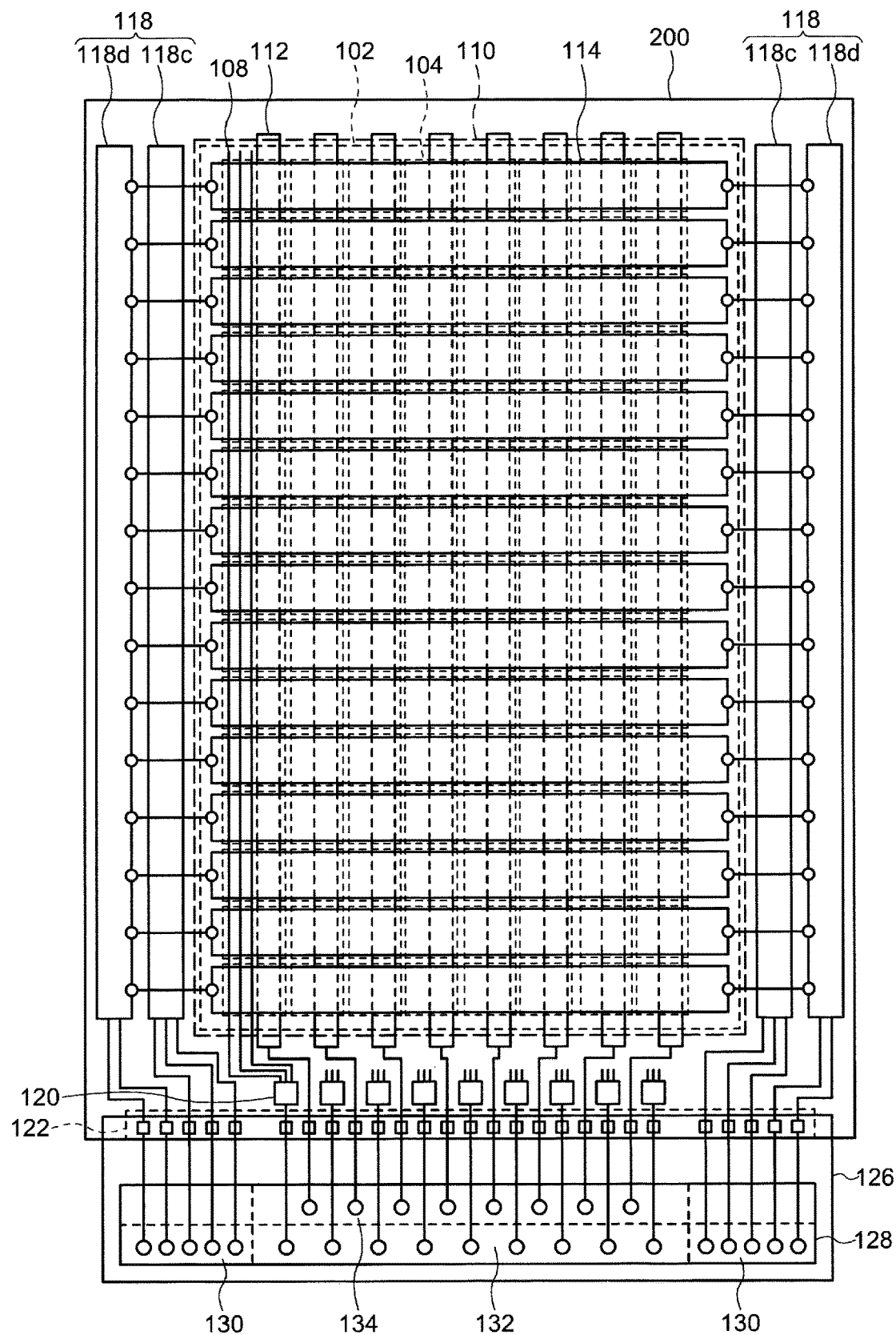
FIG. 35 is a configuration of a display part, a touch and fingerprint sensor, switching circuits, and a drive circuit of a touch and fingerprint sensor according to an embodiment of the present invention.

FIG. 35 shows the display device with the touch and fingerprint sensor 100, which has the display part 102 with the plurality of pixels 104 arranged, the touch and fingerprint sensor part 110 disposed with the first sensor electrode 112 and the second sensor electrode 114, the first drive circuit 118, the switching circuit 120, the terminal part 122, and the flexible circuit board 126. The first drive circuit 118 is divided into two circuit blocks including a scanning signal line drive circuit 118c, which outputs scanning signals to the scanning signal lines, and a scan circuit 118d, which outputs scan signals to the second sensor electrode 114.

The second drive circuit 128 may be formed by a composite integrated circuit in which circuit blocks with different functions are integrated as in the first embodiment. The control signals to the scanning signal line drive circuit 118c of the display part 102 and the scanning circuit 118d of the touch and fingerprint sensor 110 are output from the scanning signal line drive circuit block 130.

The display device with the touch and fingerprint sensor 100 shown in FIG. 35 can simultaneously display images and perform touch and fingerprint sensor sensing by having the scanning signal line drive circuit 118c and the scan circuit 118d formed by two independent circuit blocks.

Figure 36A:
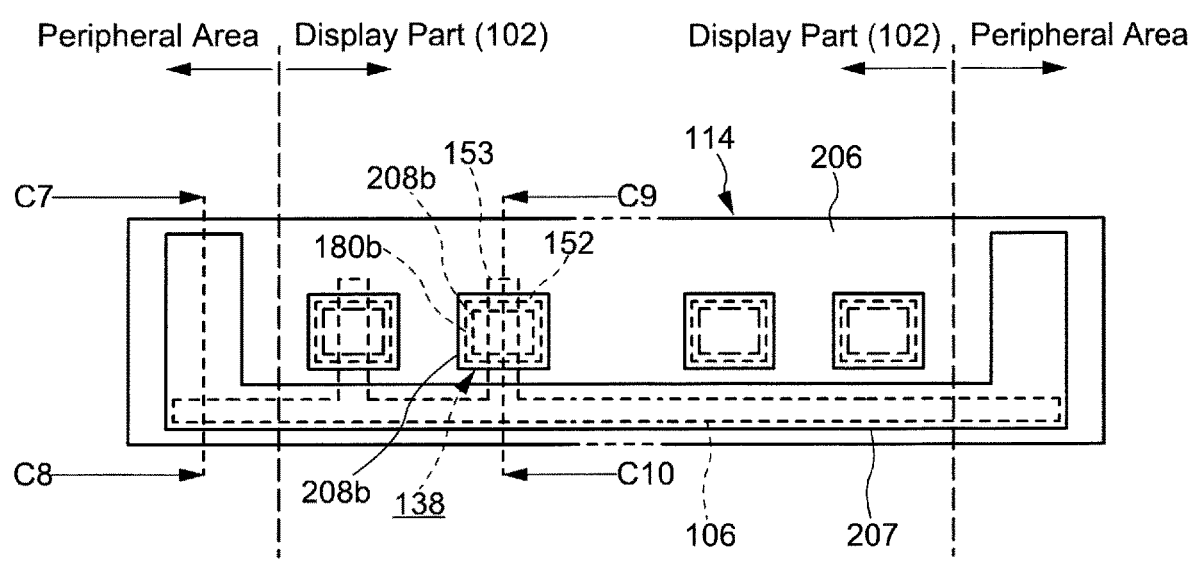
FIG. 36A is a top view of a second sensor electrode of a display device with a touch and fingerprint sensor according to an embodiment of the present invention.
Figure 36B:
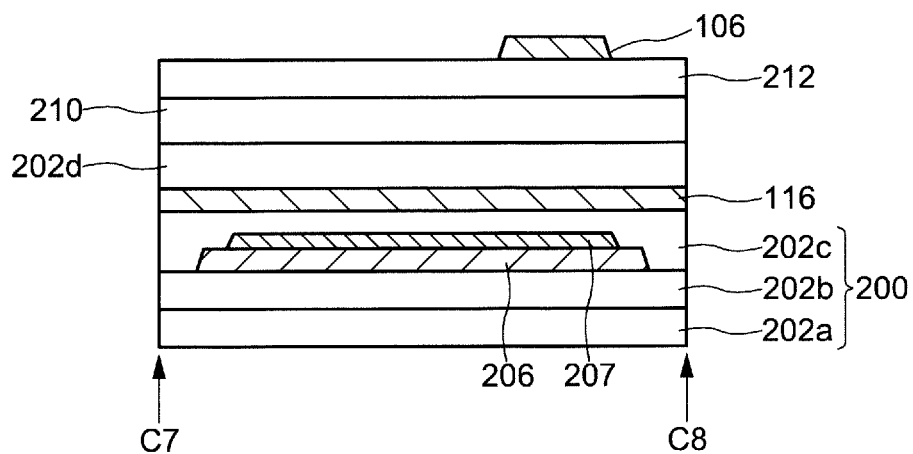
FIG. 36B is a cross-sectional view corresponding to the line C7-C8 shown in a top view of the second sensor electrode of a display device with a touch and fingerprint sensor according to an embodiment of present invention.
Figure 36C:
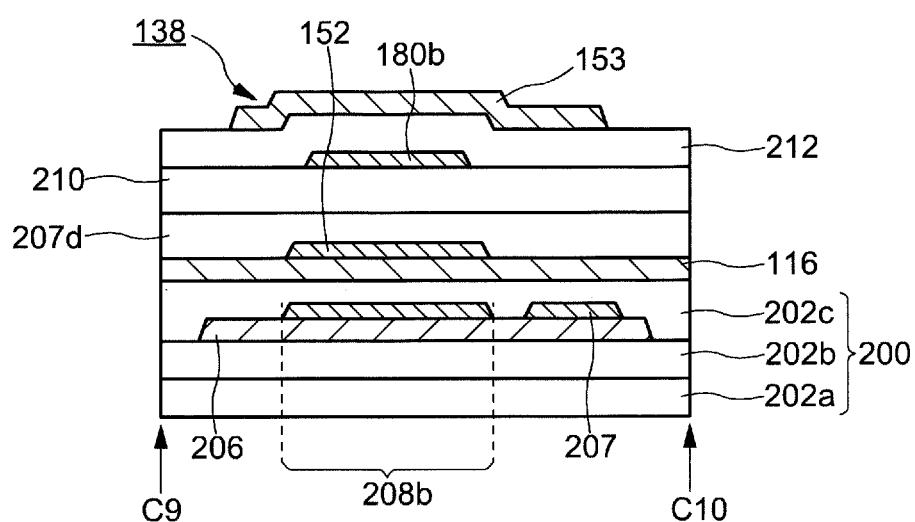
FIG. 36C is a cross-sectional view corresponding to the line C7-C8 shown in a top view of the second sensor electrode of a display device with a touch and fingerprint sensor according to an embodiment of present invention.

FIG. 36A shows a plan view of the second sensor electrode 114 corresponding to the configuration shown in FIG. 35. FIG. 36B also shows the scanning signal line 106 and the select transistor 138 above the second sensor electrode 114 as dotted lines. FIG. 36B shows a cross-sectional structure corresponding to the line C7-C8 shown in FIG. 36A, and FIG. 36C shows a cross-sectional structure corresponding to the line C9-C10.

As shown in FIG. 36A, the second sensor electrode 114 is configured with the second sensor electrode layer 206 and the second auxiliary electrode 207. As shown in FIG. 36B, the fourth transparent resin layer 202D, the first insulating layer 210, and the second insulating layer 212 are disposed between the second sensor electrode 114 and the scanning signal line 106, and both are insulated. According to this wiring structure, the scan signal to the second sensor electrode 114 and the scanning signal to the scanning signal line 106 can be input simultaneously. In other words, the display device with the touch and fingerprint sensor 100 can detect fingerprints while displaying an image.

Figure 37:
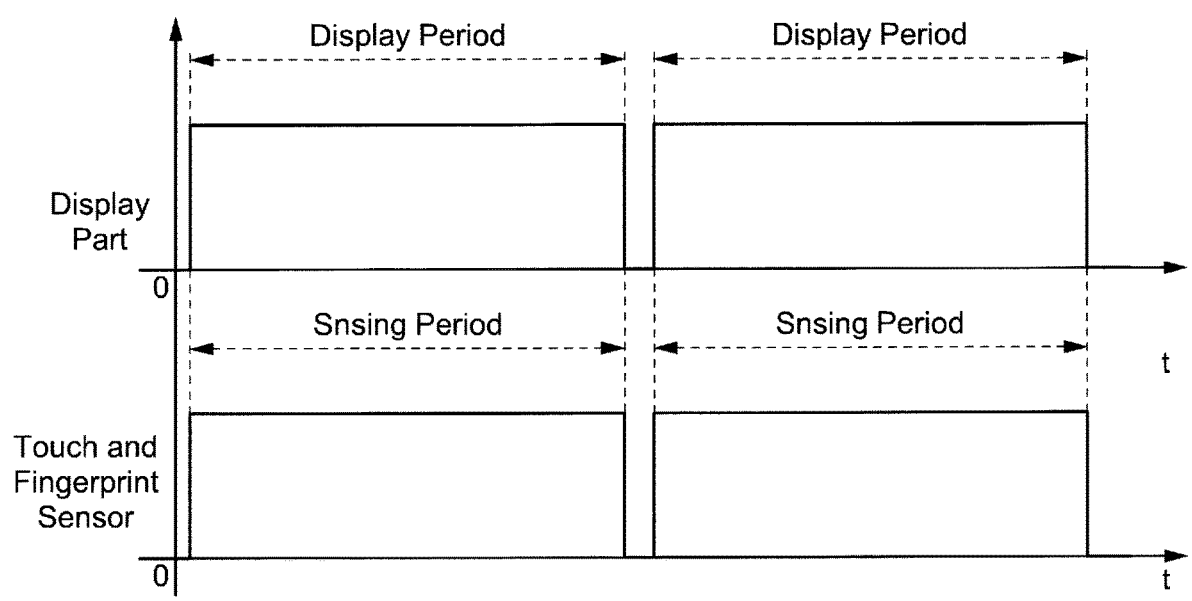
FIG. 37 is a timing chart explaining the operation of a display device with a touch and fingerprint sensor according to an embodiment of the present invention.

FIG. 37 shows a timing chart for the display device with the touch and fingerprint sensor 100 shown in FIG. 35. As shown in FIG. 37, the display device with the touch and fingerprint sensor 100 of the present embodiment has a display period and a sensing period that appear at the same time. The display device with the touch and fingerprint sensor 100 of the present embodiment has the scanning signal line drive circuit 118c of the display part 102 and the scanning circuit 118d of the touch and fingerprint sensor 110 in independent circuit blocks in the first drive circuit 118, and the data signal line drive circuit block 132 and the touch and fingerprint sensor detection circuit block 134 are disposed in independent circuit blocks in the second drive circuit 128, therefore, it is possible to perform image display and sensing at the same time.

According to the display device with the touch and fingerprint sensor 100 according to the present embodiment, for example, a touch or a fingerprint can be sensed while displaying a moving image. The other configuration is the same as the display device with a touch and fingerprint sensor in the first embodiment and can have the same advantageous effect.

Fourth Embodiment

This embodiment describes an example in which a portion of the transparent resin substrate 200 is replaced with ultra-thin tempered glass (UTG) for the display device with the touch and fingerprint sensor 100 shown in the first embodiment.

Figure 38:
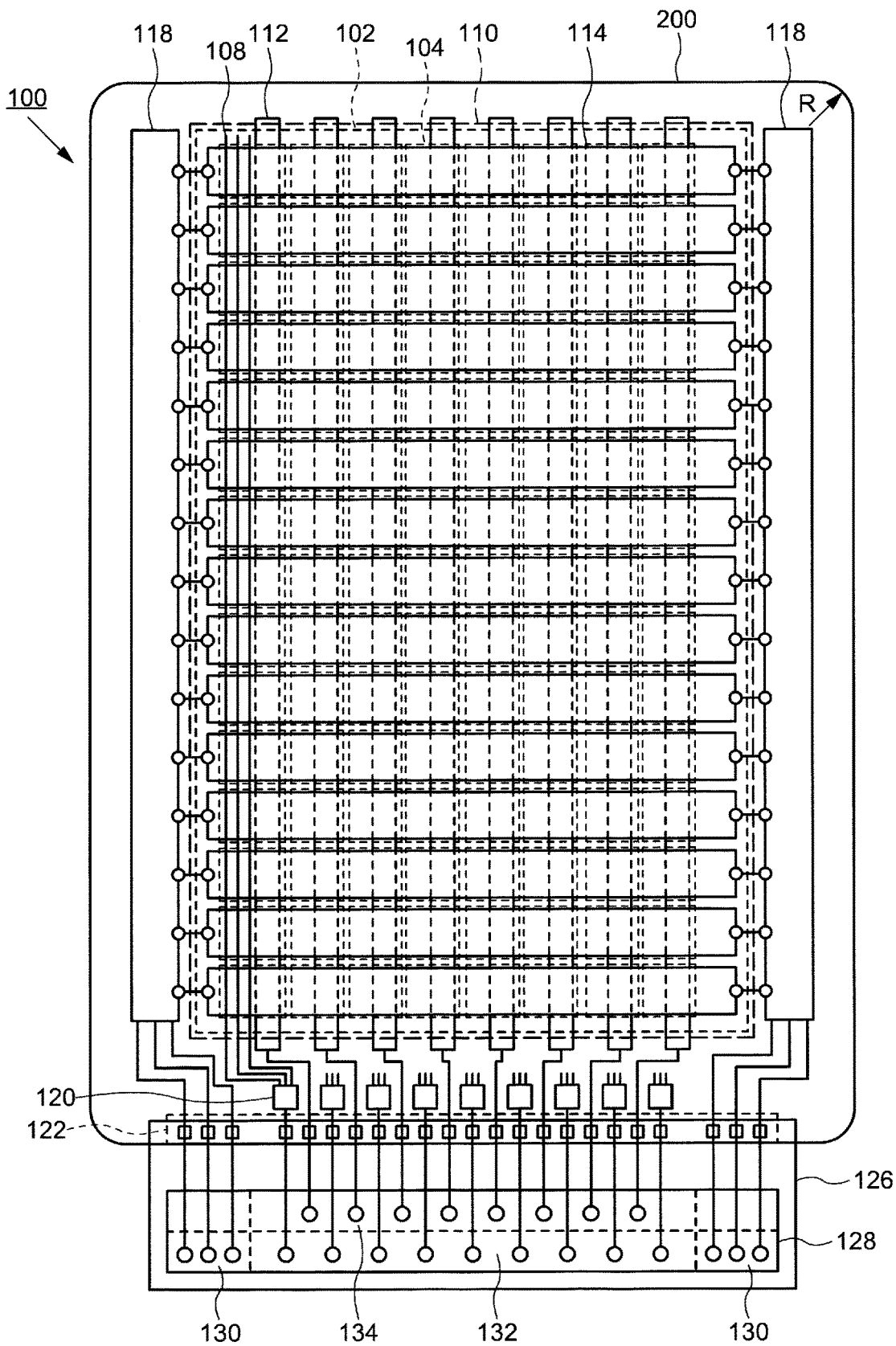
FIG. 38 is a configuration of a display part, a touch and fingerprint sensor, switching circuit, and drive circuit of a touch and fingerprint sensor according to an embodiment of the present invention.

FIG. 38 shows the display device with the touch and fingerprint sensor 100 in which ultra-thin tempered glass is used as a part of the transparent resin substrate 200. Specifically, the transparent resin substrate 200 of the present embodiment has ultra-thin tempered glass applied to the first transparent resin layer 202a in the structure of the transparent resin substrate 200 shown in FIG. 16A and FIG. 16B. The thickness of the ultra-thin tempered glass is 25 μm to 50 μm, for example, 30 μm. As shown in FIG. 38, the transparent resin substrate 200 is processed into a round shape with four corners having a radius (R) of 2 mm to 5 mm to prevent breakage. The ultra-thin tempered glass is bendable, and the display device with the touch and fingerprint sensor 100 using such a transparent resin substrate 200 can be applied to electronic devices (for example, smartphones, tablet terminals) in which the display screen can be folded. The configuration of the present embodiment can be applied to the display device with touch and fingerprint sensors shown in the second and third embodiments.

Fifth Embodiment

This embodiment shows an example of a display device with a touch and fingerprint sensor that has a mounting method using Chip On Plastic (COP) as the mounting method for the drive circuit.

Figure 39:
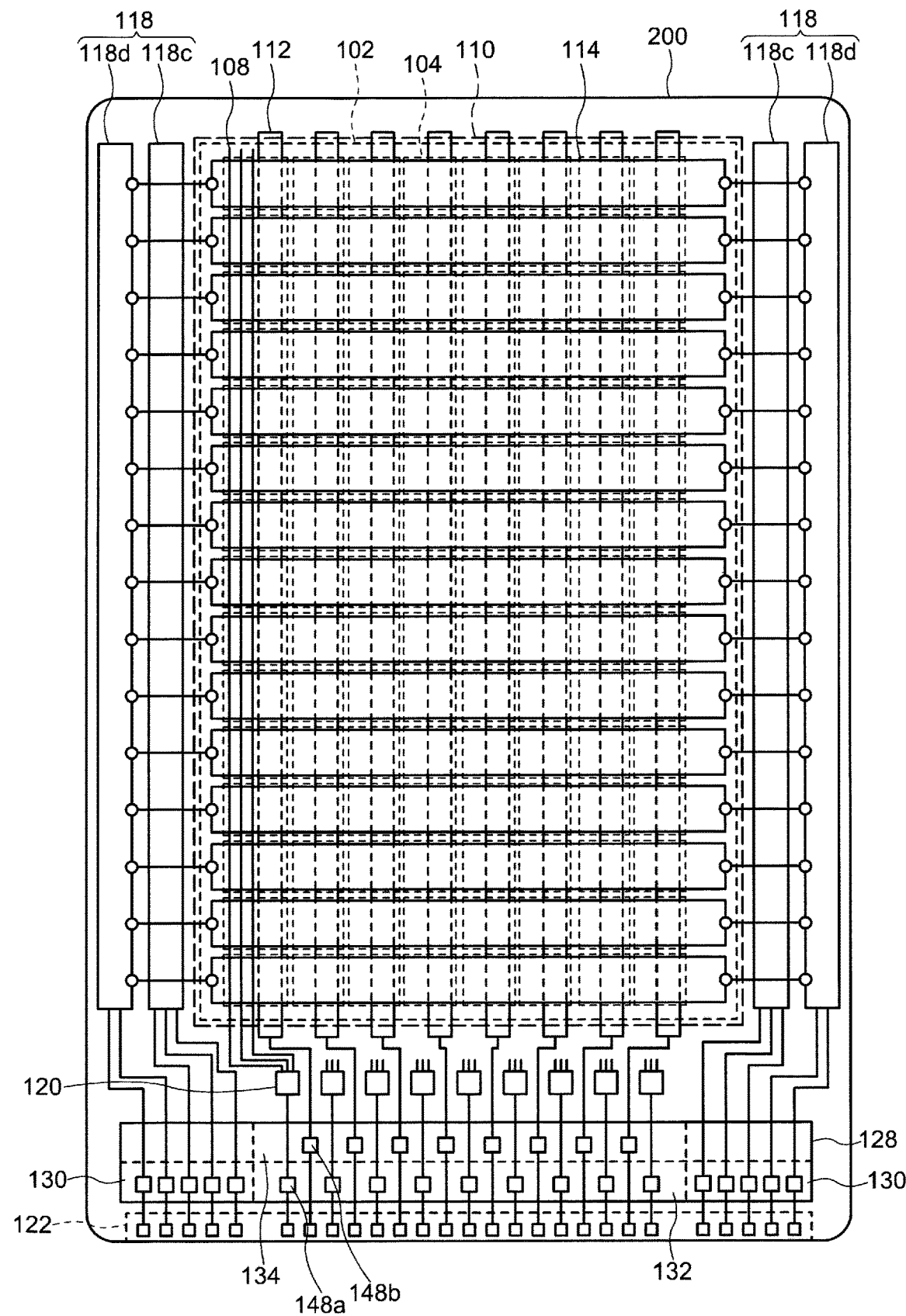
FIG. 39 is a configuration of a display part, a touch and fingerprint sensor, switching circuit, and drive circuit of a touch and fingerprint sensor according to an embodiment of the present invention.

FIG. 39 shows the display device with the touch and fingerprint sensor 100 in which ultra-thin tempered glass is used as part of the transparent resin substrate 200. The display part 102, the touch and fingerprint sensor 110, the first drive circuit 118, the switching circuit 120, the terminal part 122, and the transparent resin substrate 200 are similar to those shown in the fourth embodiment. On the other hand, this embodiment differs in that the second drive circuit 128 is mounted on the transparent resin substrate 200.

Similar to the transparent resin substrate shown in the fourth embodiment, the transparent resin substrate 200 in the present embodiment is processed into a round shape with a radius (R) of 2 mm to 5 mm for the four corners. When ultra-thin tempered glass is used for the transparent resin substrate 200, this corner shape prevents breakage of the four corners in the assembly process and improves the yield rate.

Figure 40:
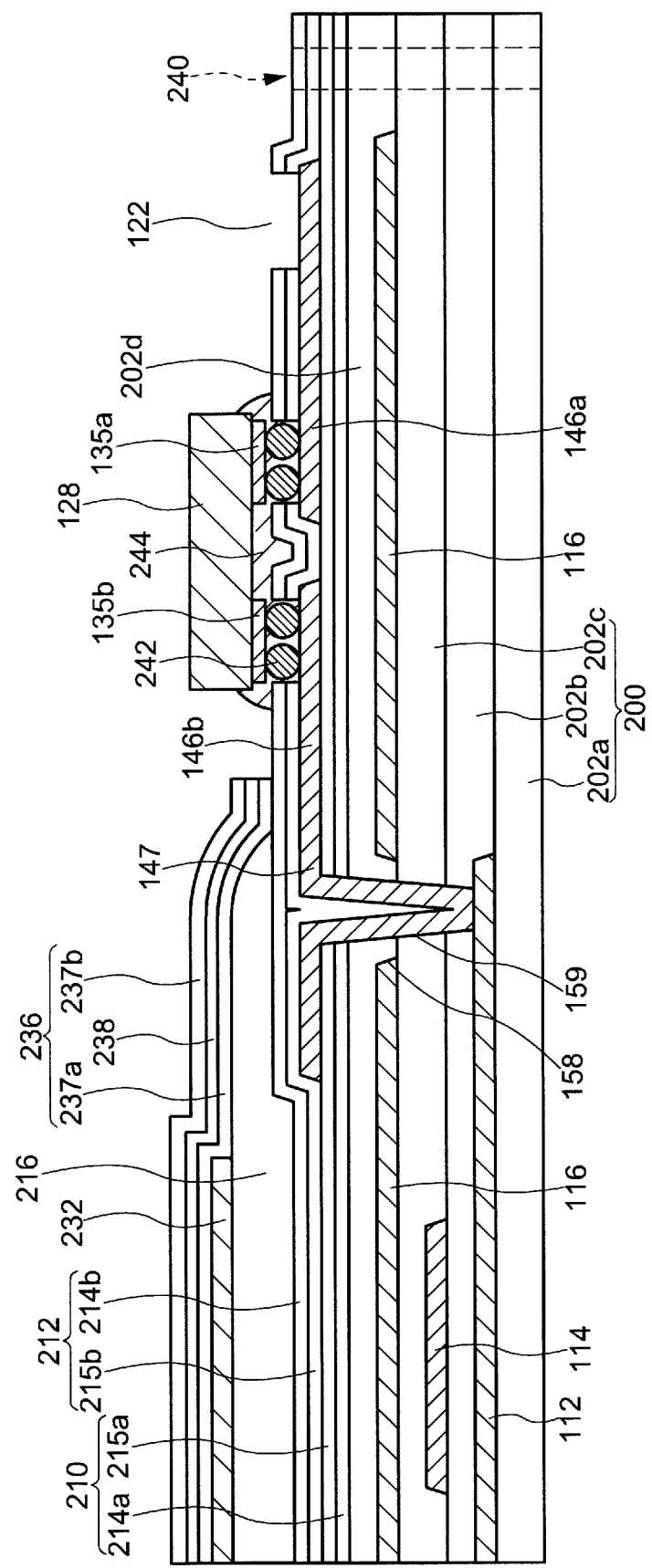
FIG. 40 is a connecting structure of the terminal part and drive circuit of a display device with a touch and fingerprint sensor according to an embodiment of the present invention.

FIG. 40 shows a cross-sectional structure of an area where the second drive circuit 128 is mounted and the terminal part 122. The second drive circuit 128 includes a first pad 135*a* and a second pad 135*b*. The first pad 135*a* is connected to the first connecting terminal 146*a* via the plurality of conductive particles 242, and the second pad 135*b* is connected to the second connecting terminal 146*b* via the plurality of conductive particles 242. The second drive circuit 128 can be mounted on the transparent resin substrate 200 by using a non-heated room temperature pressure mounting technique. The plurality of conductive particles 242 are dispersed in the resin 244, details of which are described in detail in the description of FIG. 28.

The terminal part 122 is disposed outside the region where the second drive circuit 128 is mounted. FIG. 40 shows a structure in which the shield electrode 116 and the first insulating layer 210 extend from the region in which the second drive circuit 128 is mounted to the region of the terminal part 122. With such a structure, it is possible to increase the rigidity of the area where the second drive circuit 128 is mounted, and to prevent the deformation and peeling of the connecting terminal. Thereby, the yield of the process of connecting the second drive circuit 128 can be improved. It is even more desirable to use a rigid parapolyamide resin for the fourth transparent resin layer 202*d*.

As shown in FIG. 39 and FIG. 40, the display device with touch and fingerprint sensor 100 can also be realized by mounting the second drive circuit 128 on the transparent resin substrate 200 by CPO. The display device with the touch and fingerprint sensor 100 according to the present embodiment eliminates the flexible circuit board by mounting the second drive circuit 128 on the transparent resin board 200, thereby reducing the number of parts and the manufacturing process.

Sixth Embodiment

This embodiment shows a configuration of the display device with the touch and fingerprint sensor 100 in which the circuit configuration of the pixel 104 is different from that of the first embodiment.

Figure 41:
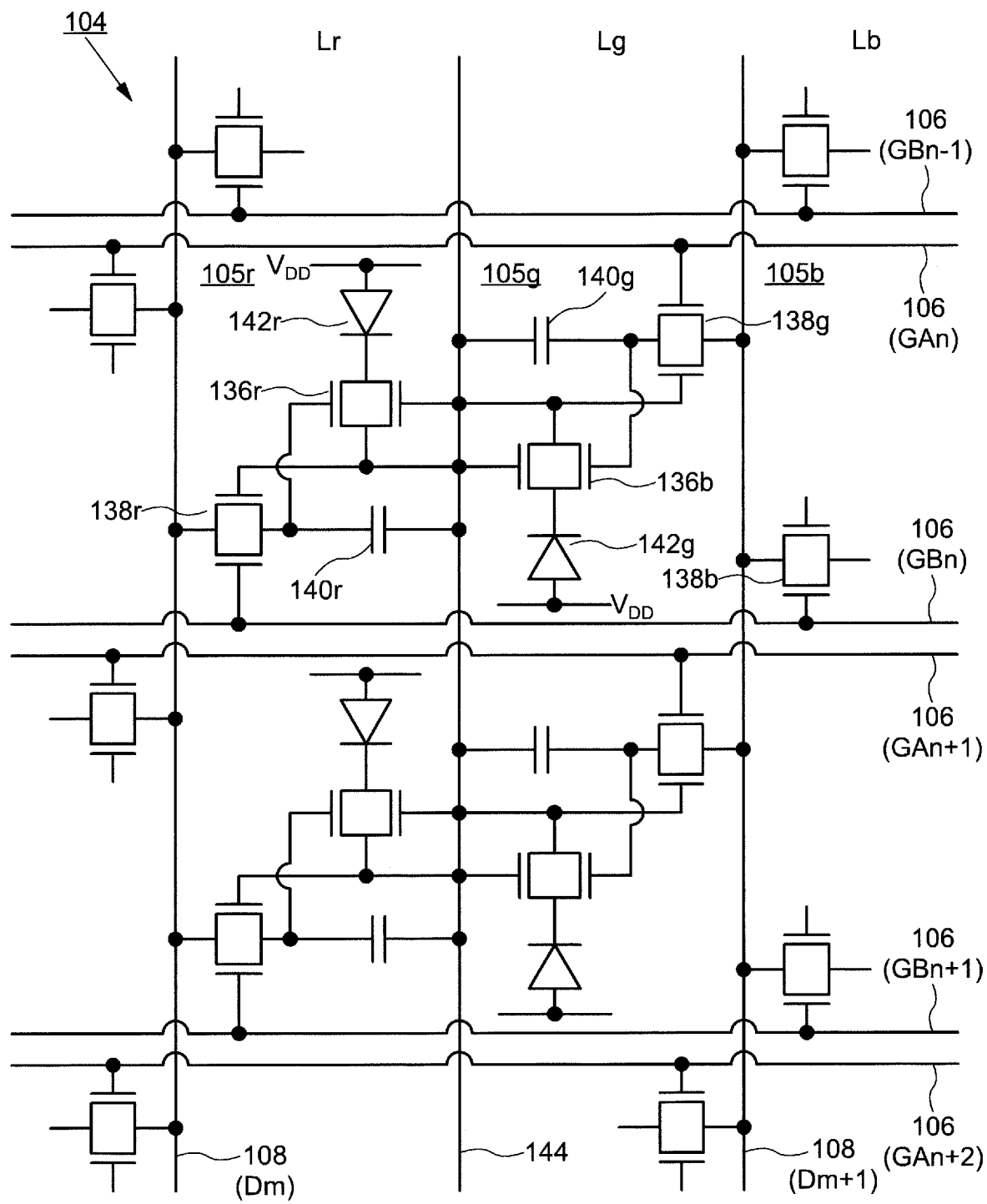
FIG. 41 is an example of an equivalent circuit of pixels disposed in a display device with a touch and fingerprint sensor according to an embodiment of the present invention.

FIG. 41 shows an example of the equivalent circuit of the pixel 104 and an example of the pixel circuit of the voltage writing method. As described in the first embodiment, the pixel 104 includes the first sub-pixel 105*r*, the second sub-pixel 105*g*, and the third sub-pixel 105*b*, FIG. 41 shows the configuration of the first sub-pixel 105*r* and the second sub-pixel 105*g* in detail. The pixel 104 has a stripe configuration of columns of first sub-pixel 105*r*, columns of second sub-pixel 105*g*, and columns of third sub-pixel 105*b*.

The first sub-pixel 105*r* includes a drive transistor 136*r*, a select transistor 138*r*, a capacitive element 140*r*, and an EL element 142*r*, and the second sub-pixel 105*g* includes a drive transistor 136*g*, a select transistor 138*g*, a capacitive element 140*g*, and an EL element 142*g*. A second gate electrode is connected to the scanning signal line 106 (GBn) and a source is connected to the data signal line 108 (Dm) for the select transistor 138*r* of the first sub-pixel 105*r*. A second gate electrode is connected to the scanning signal line 136 (GAn) and a source is connected to the data signal line 108 (Dm+1) for the select transistor 138*g* of the second sub-pixel 105*g*. A second gate electrode is connected to the scanning signal line 136 (GBn) and a source is connected to the data signal line 108 (Dm+1) of the select transistor 138*b* of the third sub-pixel 105*b*. Thus, the pixel circuit of the present embodiment has a configuration in which the second gate electrodes of the select transistors of adjacent sub-pixels are connected to different scanning signal lines and the source is connected to the same data signal line. The pixel 104 is arranged so that the common wiring 144 is shared by the column Lr of the first sub-pixel 105*r* and the column Lg of the second sub-pixel 105*g*.

Figure 42:
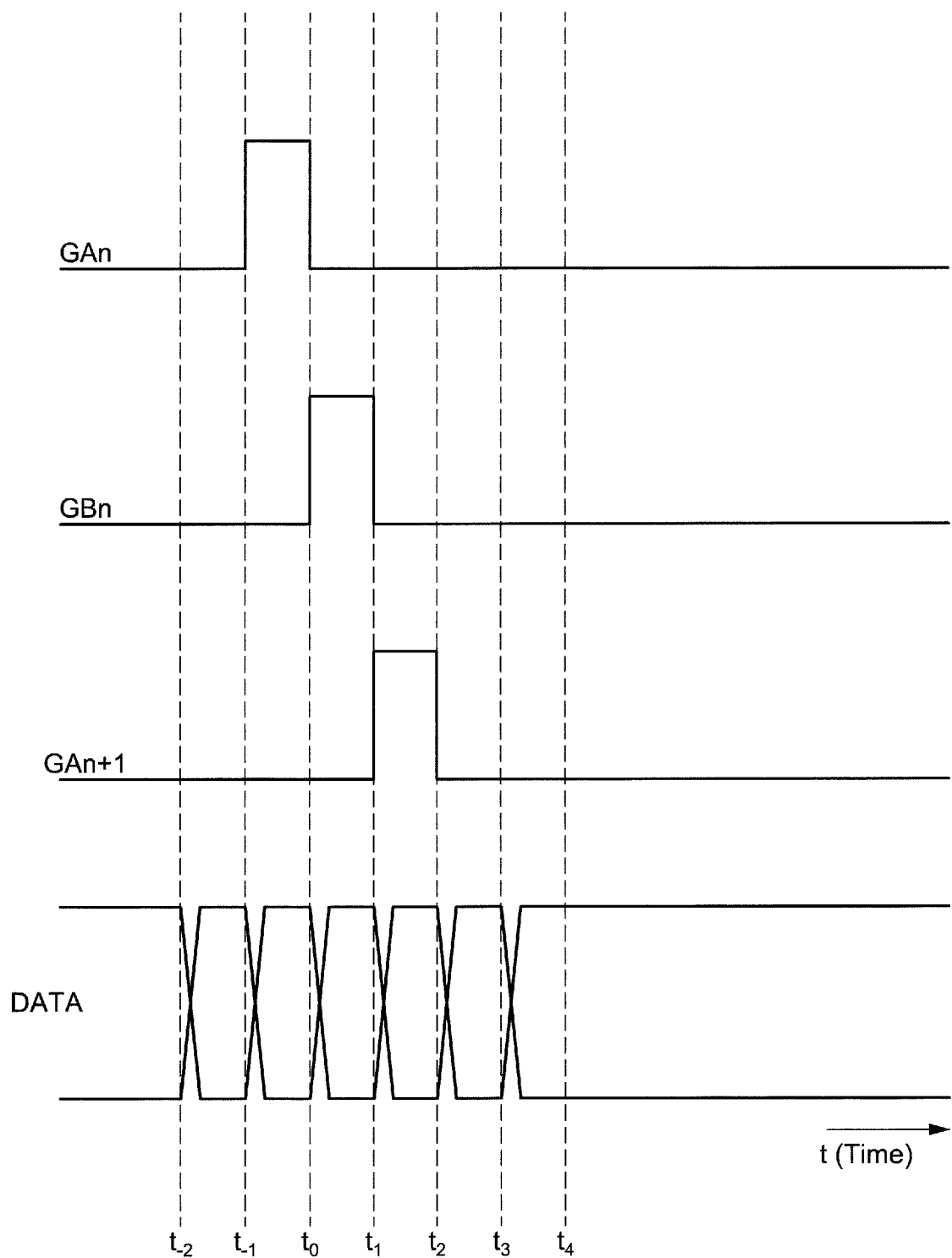
FIG. 42 is a timing chart explaining a method for driving a pixel of a display device with a touch and fingerprint sensor according to an embodiment of the present invention.

FIG. 42 shows a timing chart for driving the pixel 104 shown in FIG. 41. FIG. 42 shows that the scanning signal on scanning signal line 106 (GAn) transitions from a low level (L level) to a high level (H level) at time t−1, and select transistor 138*g* turns on, synchronized with this timing, a data signal is input to the data signal line 108 (Dm+1) and data is written to the second sub-pixel 105*g*, at time t0, the scanning signal transitions to L level and the select transistor 138*g* turns off, and at the same time, the scanning signal on the scanning signal line 106 (GBn) transitions from low (L level) to high (H level) at time t0 and the select transistors 138*r*, 138*b* turn on, synchronized with this timing, data signals are input to the data signal lines 108(Dm), 108(Dm+1), and data is written to the first sub-pixel 108*r* and the third sub-pixel 108*b*, and at time t1, the scanning signal transitions to the L level and the select transistor 138*r* and the select transistor 138*b* are turned off.

In this way, the select transistors of adjacent sub-pixels (the first sub-pixel 105*r* and the second sub-pixel 105*g*, the second sub-pixel 105*g* and the third sub-pixel 105*b*) are connected to different scanning signal lines, so that adjacent sub-pixels (for example, the second and the third sub-pixels 105*b*) can share data signal lines 108 (Dm+1) and data can be written at different timings respectively. This configuration of the pixel circuit allows the number of data signal lines to be reduced. In other words, the number of connecting terminals in the terminal part 122 can be reduced.

Figure 43:
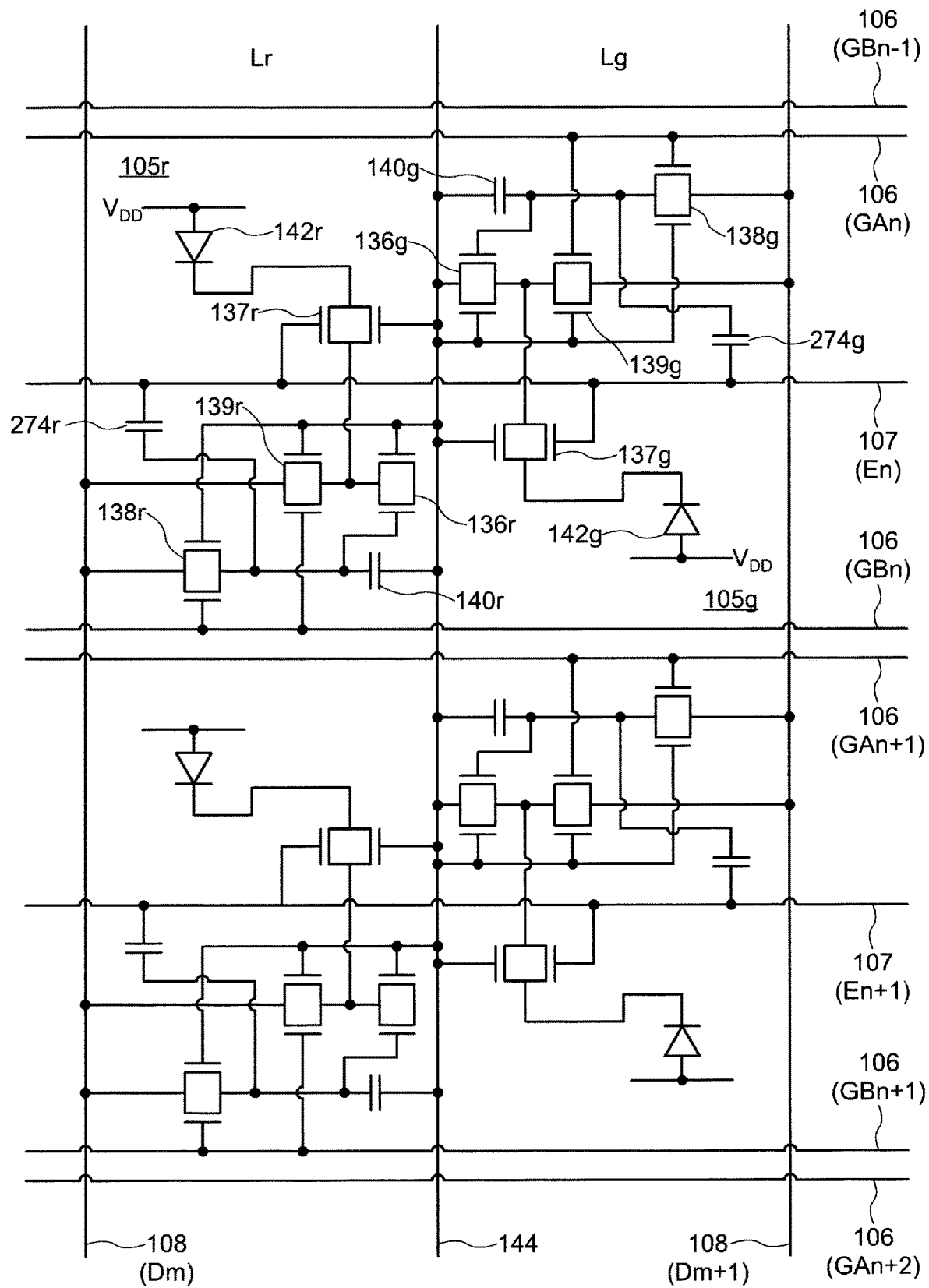
FIG. 43 is an example of an equivalent circuit of pixels disposed in a display device with a touch and fingerprint sensor according to an embodiment of the present invention.

FIG. 43 shows an example of an equivalent circuit of the pixel 104, which is an example of a pixel circuit with a current write method. The pixel 104 includes the first sub-pixel 105r, the second sub-pixel 105g, and the third sub-pixel 105b, FIG. 43 shows the configuration of the first sub-pixel 105r and the second sub-pixel 105g in detail.

The first sub-pixel 105r includes a first transistor 138r (select transistor), a second transistor 139r, a drive transistor 136r, a light emission control transistor 137r, a capacitive element 140r and the EL element 142r. Second gate electrodes of the first transistor 138r and the second transistor 139r are connected to the scanning signal line 106 (GBn), and sources are connected to the data signal line 108 (Dm), respectively. The drain of the first transistor 138r is connected to a second gate electrode of the drive transistor 136 and the capacitive element 140, and is used to control the timing for writing data signals. The second transistor 139r is connected to the drain of the drive transistor 136 and its on/off operation is controlled at the same timing as the first transistor 138r to compensate for the threshold voltage of the drive transistor 136r. The light emission control transistor 137r is connected in series between the EL element 142r and the drive transistor 136r, and its second gate is connected to a second scanning signal line 107 (En) to control the timing of light emission of the EL element 142r. The second sub-pixel 105g has a similar configuration.

A second capacitive element 274r may be disposed between the second scanning signal line 107 and the drain of the first transistor 138r. It is possible to suppress the voltage of capacitive element 140r from fluctuating by ΔVgd due to the change in the gate-to-drain capacitance Cgd when the first transistor 138r falls down by providing the second capacitive element 274r.

In addition, there is a column of the third sub-pixel 105b, which is not shown in the figure, the row of the third sub-pixel 105b has the same configuration as the row Lr of the first sub-pixel 105r, a source of each of the first transistor and the second transistor is connected to the data signal line 108 (Dm+1), the second gate electrode of each of the first transistor and the second transistor is connected to the scanning signal line 106 (GBn), a second gate electrode of the light emission control transistor is connected to the second scanning signal line 107 (En).

Figure 44:
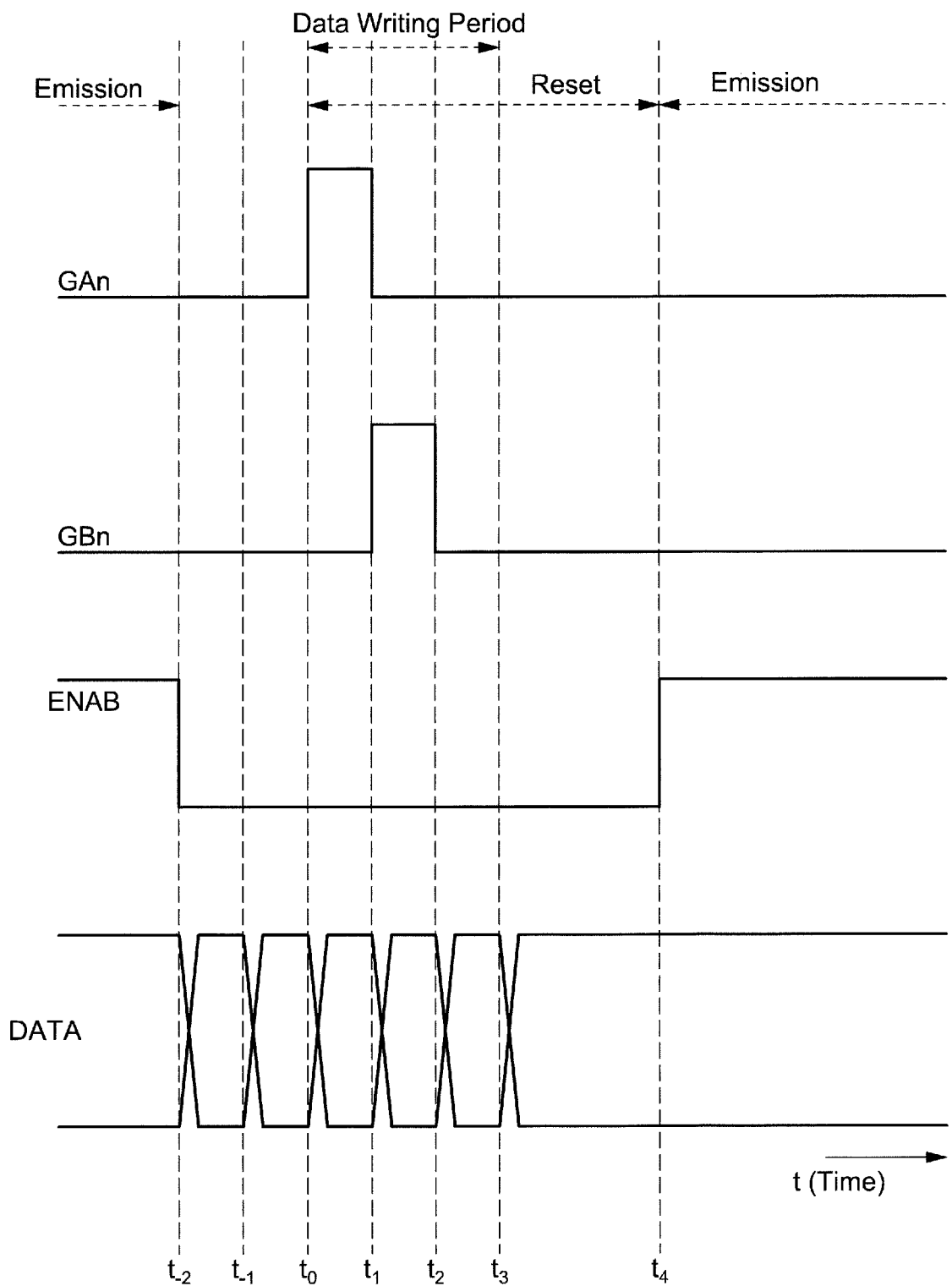
FIG. 44 is a timing chart explaining a method for driving a pixel of a display device with a touch and fingerprint sensor according to an embodiment of the present invention.

FIG. 44 shows a timing chart for driving the pixel 104 shown in FIG. 43. FIG. 44 shows the operation that the scanning signal of the scanning signal line 106 (GAn) transitions from low level (L level) to high level (H level) at time t0, and the first transistor 138g and a second transistor 139g are turned on, synchronized with this timing, a data signal is input to the data signal line 108 (Dm+1) and data is written to the second sub-pixel 105g, and the operation to compensate the threshold voltage of the drive transistor 136g is also performed. FIG. 44 also shows the operation that at time t1, the scanning signal of scanning signal line 106 (GAn) transitions to L level and the first transistor 138g and the second transistor 139g turn off, at the same time, the scanning signal of scanning signal line 106 (GBn) transitions from low level (L level) to high level (H level) at time t1, and the first transistor 138r and the second transistor 139r turn on, and synchronized with this timing, a data signal is input to the data signal line 108 (Dm) to write data in the first sub-pixel 108r and compensate for the threshold voltage of the drive transistor 136r. During such a data writing period, the second scan signal line 107 (En) is at L level and the light emission control transistors 137r, 137g are off.

When the data writing period ends, it transitions to the emission period. That is, the second scan signal line 107 transitions from the L level to the H level, the emission signal is input, and the emission control transistors 137r, 137g are turned on. As a result, in the first sub-pixel 105r and the second sub-pixel 108g, a current corresponding to the drain current of the drive transistors 136r, 136g flows to the EL elements 142r, 142g to emit light.

The number of data signal lines 108 can be reduced by having the select transistors of adjacent sub-pixels (first sub-pixel 105r and second sub-pixel 105g) connected to different scanning signal lines, thus reducing the number of connecting terminals in terminal part 122.

Figure 47:
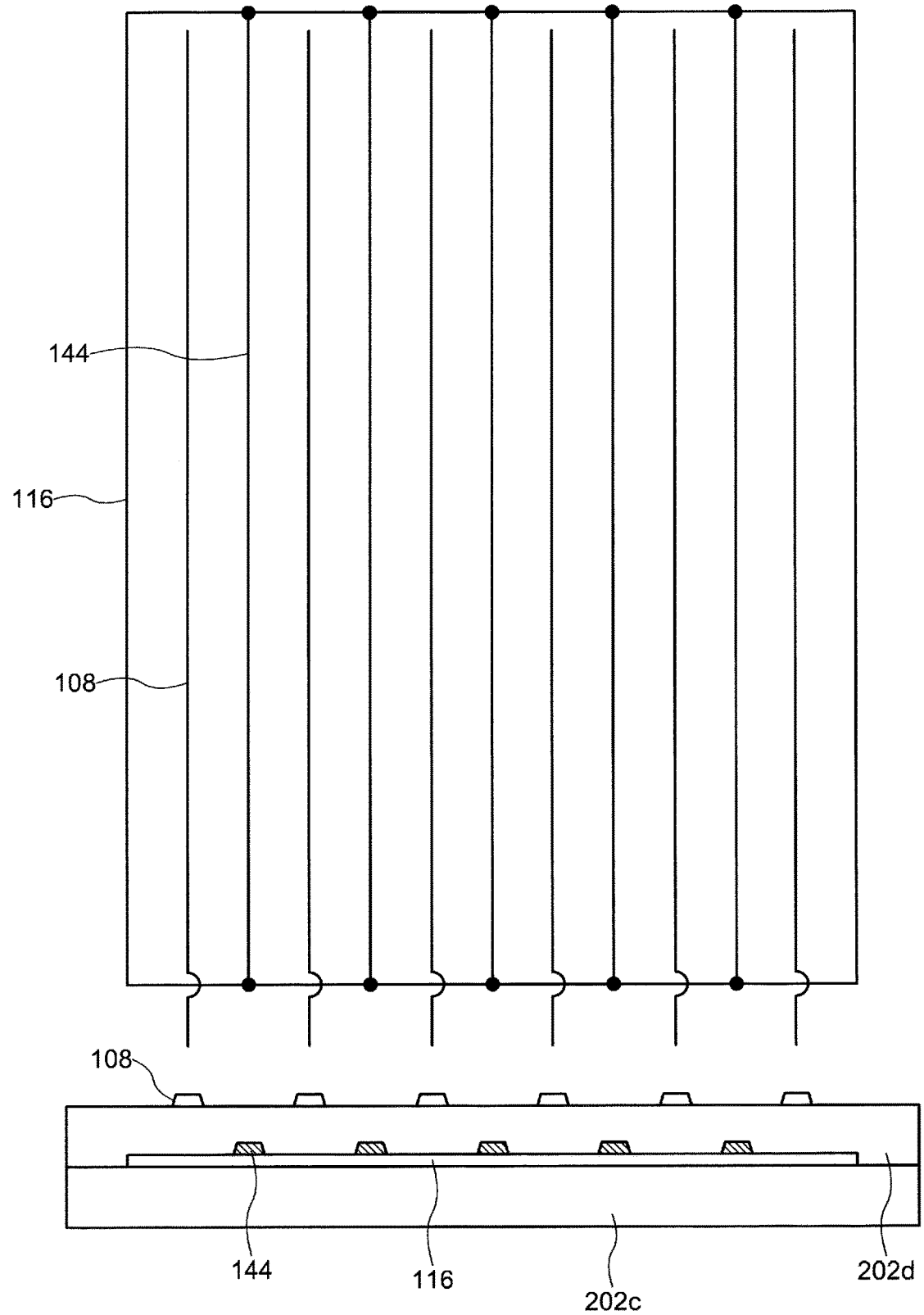
FIG. 47 is an arrangement of a data signal line and a common wiring disposed on a display part of a display device with a touch and fingerprint sensor according to an embodiment of the present invention.

FIG. 47 shows the arrangement of the data signal lines 108 and the common wiring 144 shown in FIG. 41 and FIG. 43. The data signal lines 108 are disposed on an upper layer than the fourth transparent resin layer 202d, whereas the common wiring 144 is disposed between the third transparent resin layer 202c and the fourth transparent resin layer 202d, and in contact with the shield electrode 116. While the shield electrode 116 is formed of a transparent conductive film, the common wiring 144 is formed of a metal film. The common wiring 144 is disposed in a stripe pattern extending from one end of the shield electrode 116 to the other end, thereby reducing the resistance of the shield electrode 116.

Figure 46:
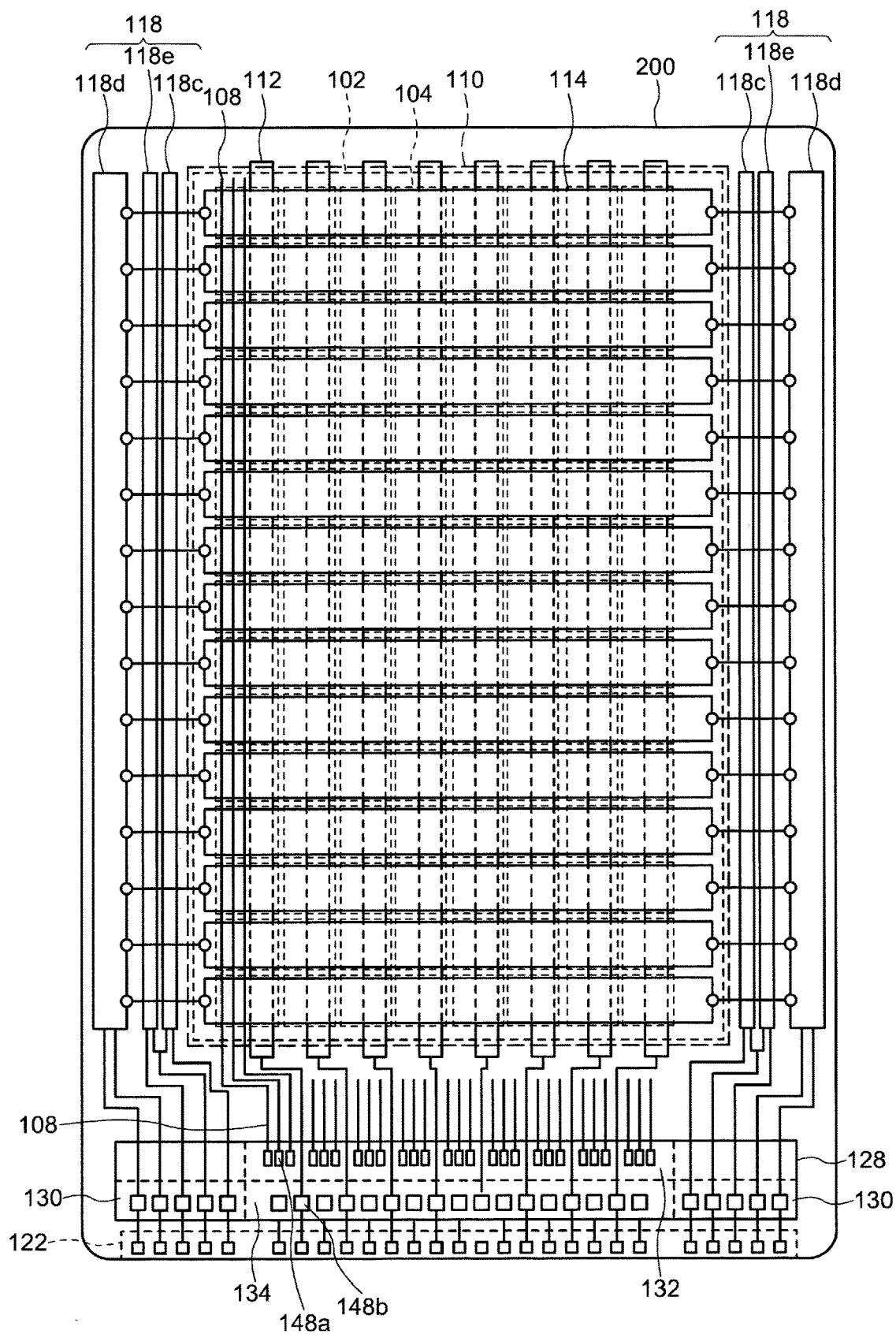
FIG. 46 is a configuration of a display part, a touch and fingerprint sensor, switching circuit, and drive circuit of a touch and fingerprint sensor according to an embodiment of the present invention.

FIG. 46 shows the display device with the touch and fingerprint sensor 100 in which ultra-thin tempered glass is used as part of the transparent resin substrate 200. The display device with the touch and fingerprint sensor 100 shown in FIG. 46 has the same configuration as that shown in FIG. 39, except that the switching circuit 120 is not provided and the configuration of the third connecting terminal 148a and the second scanning signal line drive circuit 118e is different.

The third connecting terminal 148a in the second drive circuit 128, which is provided in the data signal line drive circuit block 132, is connected to the data signal line 108, and data signals are output to each pixel 104 in the display part 102 without any switching circuit. As shown in FIG. 41 and FIG. 43, the number of data signal lines 108 is arranged to be shared by adjacent pixel rows, so the number of third connecting terminals 148a is reduced compared to the conventional method.

Figure 45:
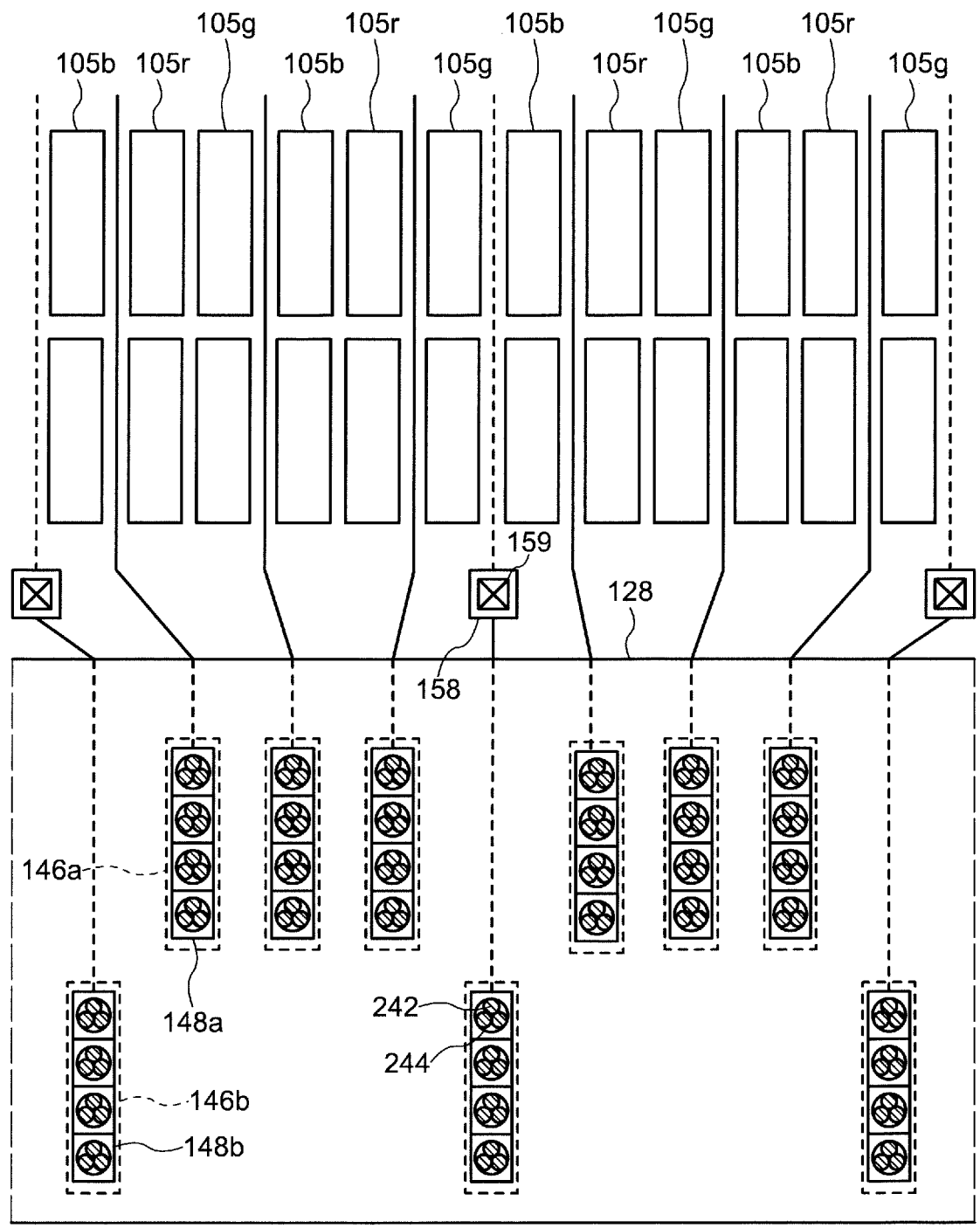
FIG. 45 is a connection structure of the terminal part and a flexible circuit board of a display device with a touch and fingerprint sensor according to an embodiment of the present invention.

FIG. 45 shows details of the connection between the transparent resin substrate 200 and the second drive circuit 128. The transparent resin substrate 200 is disposed with the first connecting terminal 146a and the second connecting terminal 146b. The first connecting terminal 146a is connected to the data signal line 108, and the second connecting terminal 146b is connected to the first sensor electrode 112. A third connecting terminal 148a of the second drive circuit 128 is connected to the first connecting terminal 146a, and a fourth terminal 148b is connected to the second connecting terminal 146b. The plurality of conductive particles 242 dispersed in the resin 244 are used for the connections. The details of the connection structure are the same as those shown in FIG. 28.

According to the present embodiment, when the display part 102 has a configuration in which pixels corresponding to each color are arranged in stripes, the number of data signal lines 108 can be reduced by having a pixel circuit in which adjacent pixel columns share data signal lines 108, thereby, the number of connecting terminals can be reduced without using the switching circuit 120.

Seventh Embodiment

This embodiment shows an example of the layout of each element constituting the pixel 104 of the voltage writing method shown in FIG. 43.

Figure 48:
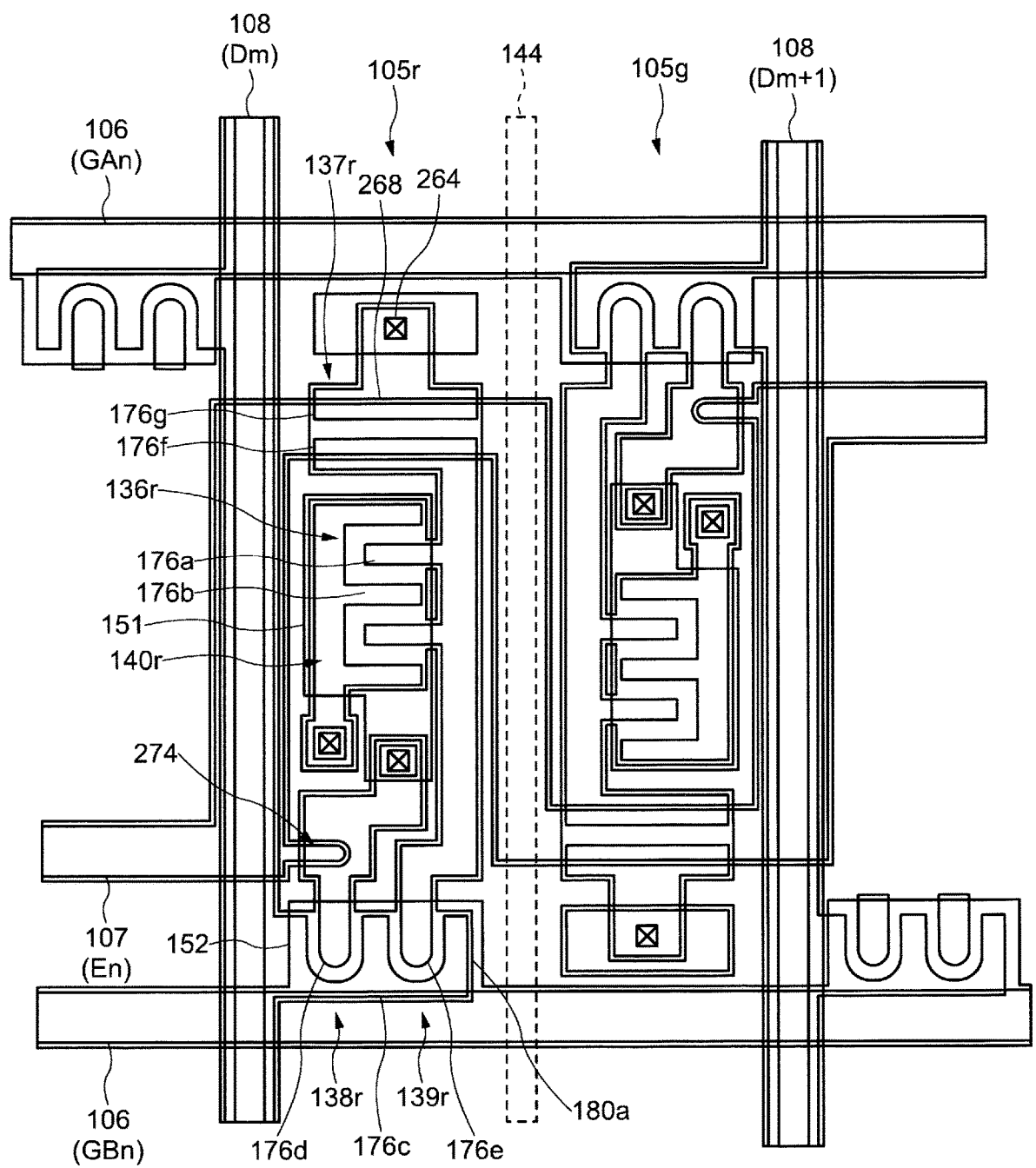
FIG. 48 is an example of a planar layout of a drive transistor, a select transistor, a capacitive element, and an EL element that constitutes a sub-pixel of a display device with a touch and fingerprint sensor according to an embodiment of the present invention.

FIG. 48 shows an example of the layout of the first sub-pixel 105r and the second sub-pixel 105g. The first sub-pixel 105r has the first transistor 138r, the second transistor 139r, the drive transistor 136r, the light emission control transistor 137r, and the capacitive element 140r, and the second sub-pixel 105g has the first transistor 138g, the second transistor 139g, the drive transistor 136g, the light emission control transistor 137g, and the capacitive element 140g. Each layer consisting of the EL elements 142r, 142g is omitted. The first sensor electrode 112 and the second sensor electrode 114 are also omitted.

Focusing on the first sub-pixel 105r, the first transistor 138r is stacked with the first oxide semiconductor layer 180a, a third metal oxide conductive layer 176c forming the source, a fourth metal oxide conductive layer 176d forming the drain, and the first scanning signal line 106 (GBn), the second gate electrode 153 formed of a transparent conductive layer extending to the region of the first transistor 138r is stacked through the second insulating layer 212, which is not shown in the figure, the first gate electrode 152 formed by the shield electrode 116 is also stacked through the first insulating layer 210, which is not shown in the figure. The first gate electrode 152 is disposed on the lower layer and the second gate electrode 153 is disposed on the upper layer with respect to the first oxide semiconductor layer 180a.

The second transistor 139r has the same configuration as the first transistor 138r, with the fifth metal oxide conductive layer 176e forming the drain connected to the second metal oxide conductive layer 176a forming the drive transistor 136r.

The drive transistor 136r has a structure in which the second gate electrode 151 on the same layer as the second gate electrode 153 is disposed to cover the first oxide semiconductor layer 180a, the first metal oxide conductive layer 176a, and the second metal oxide conductive layer 176b. The capacitive element 140r is formed in the region where the second gate electrode 151 and the second metal oxide conductive layer 176b overlap.

The light emission control transistor 137r has a stacked structure of the first oxide semiconductor layer 180a, the sixth metal oxide conductive layer 176f, which is connected to the first metal oxide conductive layer 176a, the seventh metal oxide conductive layer 176g disposed with a gap in this conductive layer, a second gate electrode 268 formed in a region overlapping these two metal oxide conductive layers and forming the second scanning signal line 107 (En) and overlapping the region of the light emission control transistor 137r, and a first gate electrode (266) formed by the shield electrode 116, which is not shown in the figure. The EL element 142r, not shown in the figure, is connected to the light emission control transistor 137r through an eighth contact hole 264.

The second sub-pixel 105g has a similar configuration, with the layout of the first sub-pixel 105r inverted around the common wiring 144 and further inverted in the vertical direction.

Figure 49:
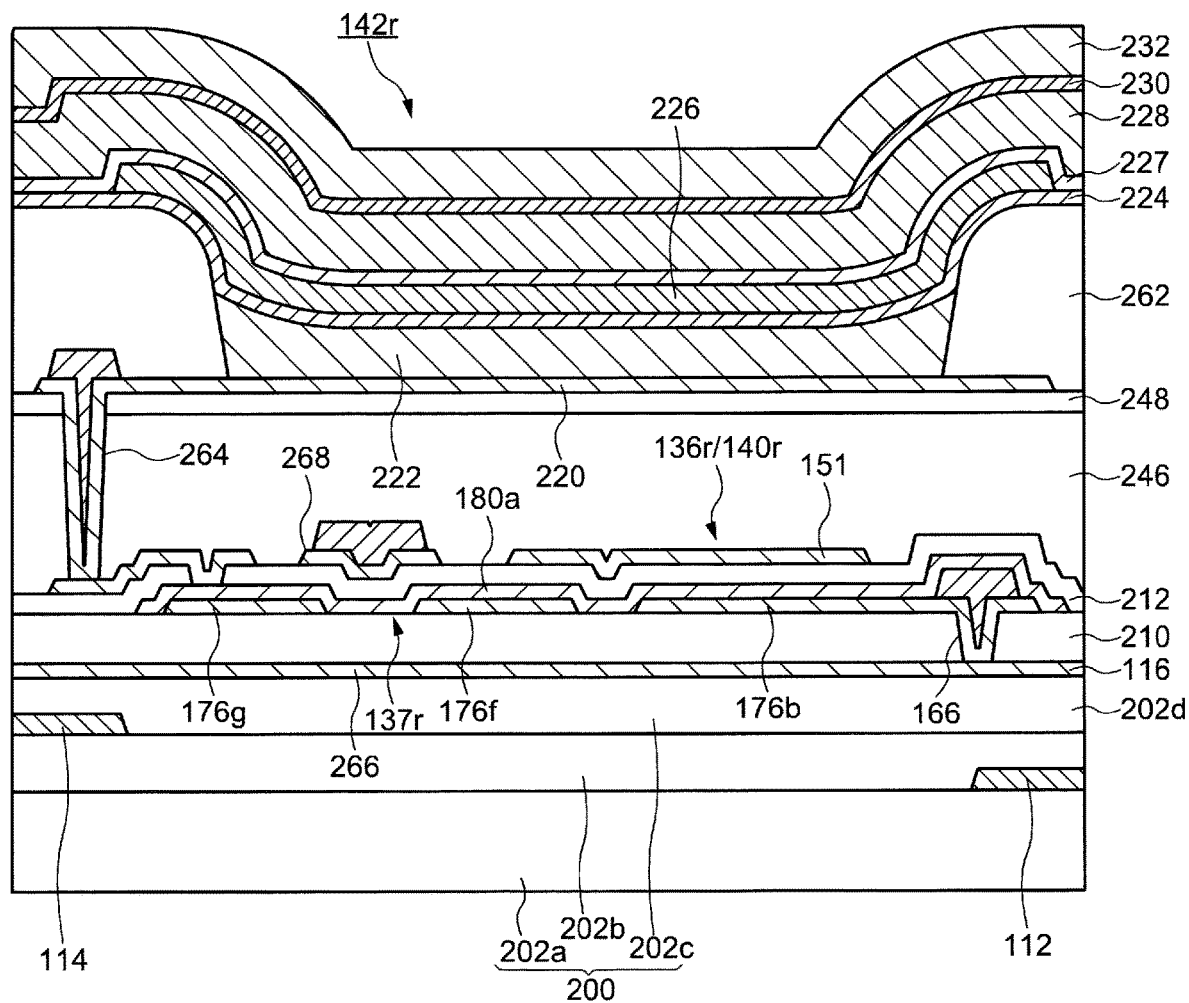
FIG. 49 is a cross-sectional view of a sub-pixel of a display device with a touch and fingerprint sensor according to an embodiment of the present invention.

FIG. 49 shows a partial cross-sectional structure of the first sub-pixel 105r, mainly showing the cross-sectional structure of the light emission control transistor 137r, the capacitive element 140r, and the EL element 142r described in FIG. 48. As shown in FIG. 49, the light emission control transistor 137r has the sixth metal oxide conductive layer 176f and the second metal oxide conductive layer 176g between the first insulating layer 210 and the first oxide semiconductor layer 180a, the first gate electrode 248 is formed in the same layer as the shield electrode 116, the second gate electrode 250 (second scanning signal line 107) overlaps the first oxide semiconductor layer 180a through the second insulating layer 212. The capacitive element 140r is formed by a transparent conductive film and the second metal oxide conductive layer 176b forming the second gate electrode 151 that overlaps across the second insulating layer 212. The second metal oxide conductive layer 176b has a structure connected to the shield electrode 116 by the fifth contact hole 166. The EL element 142r has a structure in which the electron transport layer 222, the electron injection layer 224, the light emitting layer 226, an electron blocking layer 227, the hole transport layer 228, the hole injection layer 230, and the second electrode 232 are stacked from the first electrode 220 (cathode) side. The planarization layer 246 and the passivation layer 248 are disposed on top of the light emission control transistor 137r and other elements. The EL element 142r is disposed above the planarization layer 246.

Figure 50:
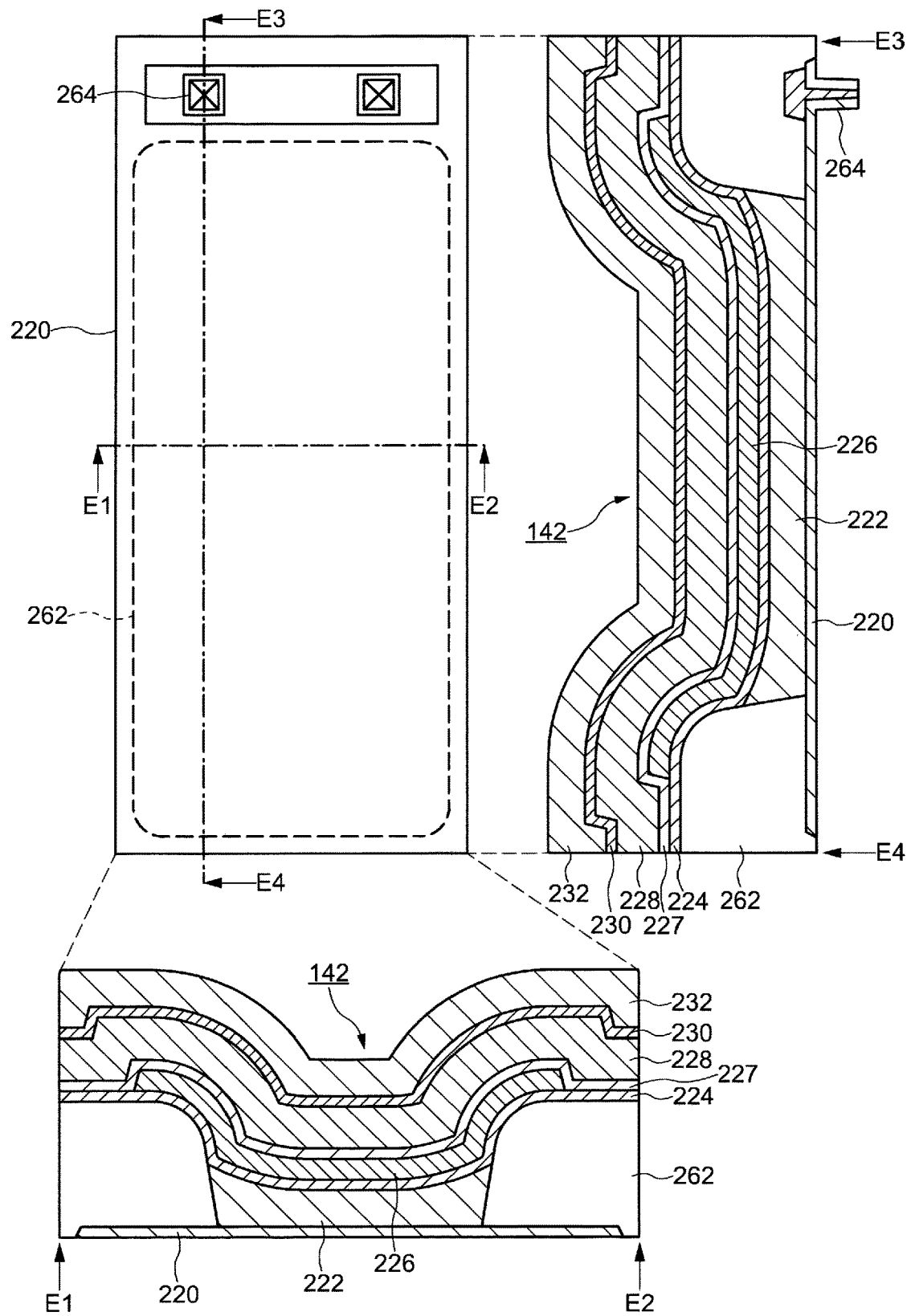
FIG. 50 is a planar layout of an organic EL elements disposed on a sub-pixel of a display device with a touch and fingerprint sensor according to an embodiment of the present invention and a cross-sectional structure of the lines E1-E2 and E3-E4 shown in the figure.

FIG. 50 shows the planar layout of the EL element 142 and the cross-sectional structures of the lines E1-E2 and E3-E4. A peripheral edge of the first electrode 220 is covered by a separation wall 262. The eighth contact hole 264 where the first electrode 220 is connected to the light emission control transistor 137 is also disposed at a position covered by the separation wall 262. When the electron transport layer 222 is formed of a coated material, the electron transport layer 222 is disposed on the top surface of the first electrode 220 in the region surrounded by the separation wall 262. When the electron injection layer 224, the electron blocking layer 227, the hole transport layer 228, and the hole injection layer 230 are formed by vapor deposition, they are disposed to cover the separation wall 262 and extend over the entire display part 102. The light emitting layer 226 is disposed so that it overlaps the opening of the separation wall 262, using a shadow mask during evaporation. The light emitting layer 226 can also be formed using an inkjet printing method, gravure offset printing method, or other methods.

As is apparent from FIG. 48 and FIG. 50, the EL element 142, the first transistor 138, the second transistor 139, the drive transistor 136, and the emission control transistor 137 are disposed in an overlaid arrangement. The gate electrodes, source and drain electrodes, and oxide semiconductor layers of these transistors forming the pixel circuit are formed of transparent materials that transmit visible light, so that light can be emitted outside through the transparent resin substrate 200 even if the EL element 142 is a bottom emission type.

Eighth Embodiment

The drive transistor 136 that drives the EL element 142 has the capacitive element 140 to hold the voltage based on the data signal. The voltage held in the capacitive element 140 fluctuates by ΔVgd when the selective transistor 138 is turned off due to the parasitic capacitance Cgd between the gate and drain of the selective transistor 138. This is not a problem when the capacitance of the capacitance element 140 is large, but when the pixel size is smaller due to higher resolution in small and medium-sized displays and the capacitance element 140 cannot be made larger, this effect cannot be neglected. Also, in the current write method, it is necessary to increase the write time when the capacitance of the capacitive element 140 is increased, but the number of pixels and drive frequency do not allow for sufficient write time, which causes a problem with gradation expression.

Figure 51:
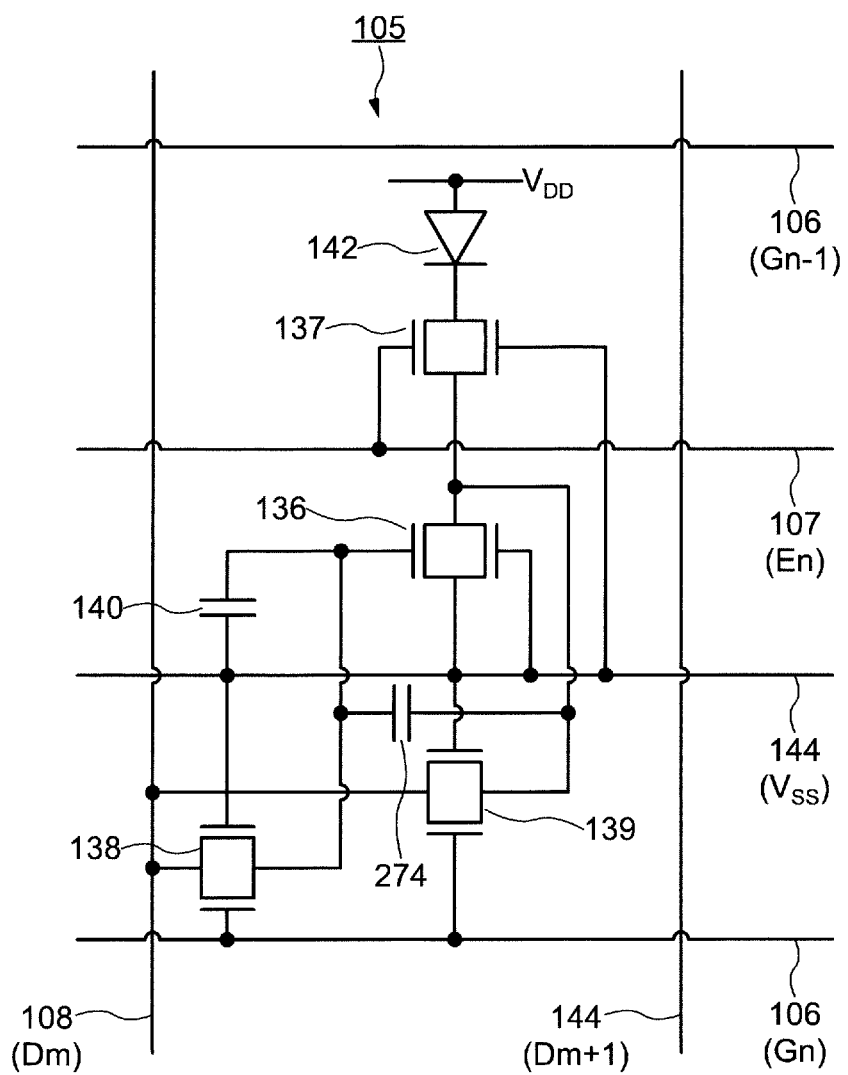
FIG. 51 is an example of an equivalent circuit of pixels disposed in a display device with a touch and fingerprint sensor according to an embodiment of the present invention.

FIG. 51 shows an example of a pixel circuit that can suppress the above-mentioned ΔVgd fluctuation. Specifically, the sub-pixel 105 has a configuration in which the first transistor 138 (select transistor) is connected to the gate of the drive transistor 136 to apply the data signal, and the light emission control transistor 137 is connected between the EL element 142 and the drive transistor 136, the second transistor 139 is connected between the data line signal 108 and the drain of the light emission control transistor 137, and the second capacitive element 274 is connected between the second transistor 139 and the second gate electrode of the drive transistor 136, thereby, to ensure that the voltage of the capacitive element 140 does not fluctuate by ΔVgd when the gate voltage of the first transistor 138 turns down.

Figure 52:
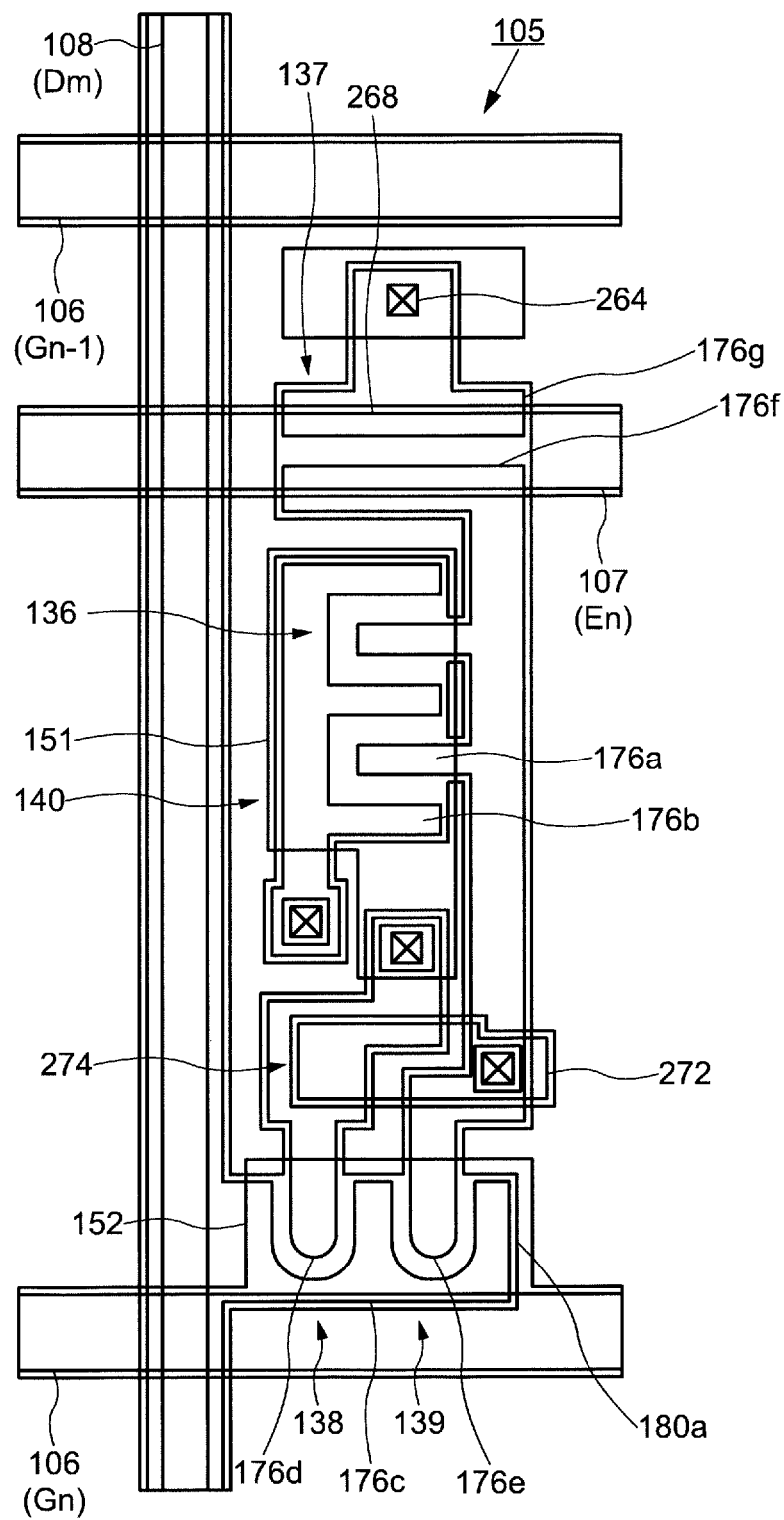
FIG. 52 is an example of a planar layout of a drive transistor, a select transistor, a capacitive element, and an EL element that constitutes a sub-pixel of a display device with a touch and fingerprint sensor according to an embodiment of the present invention.
Figure 53:
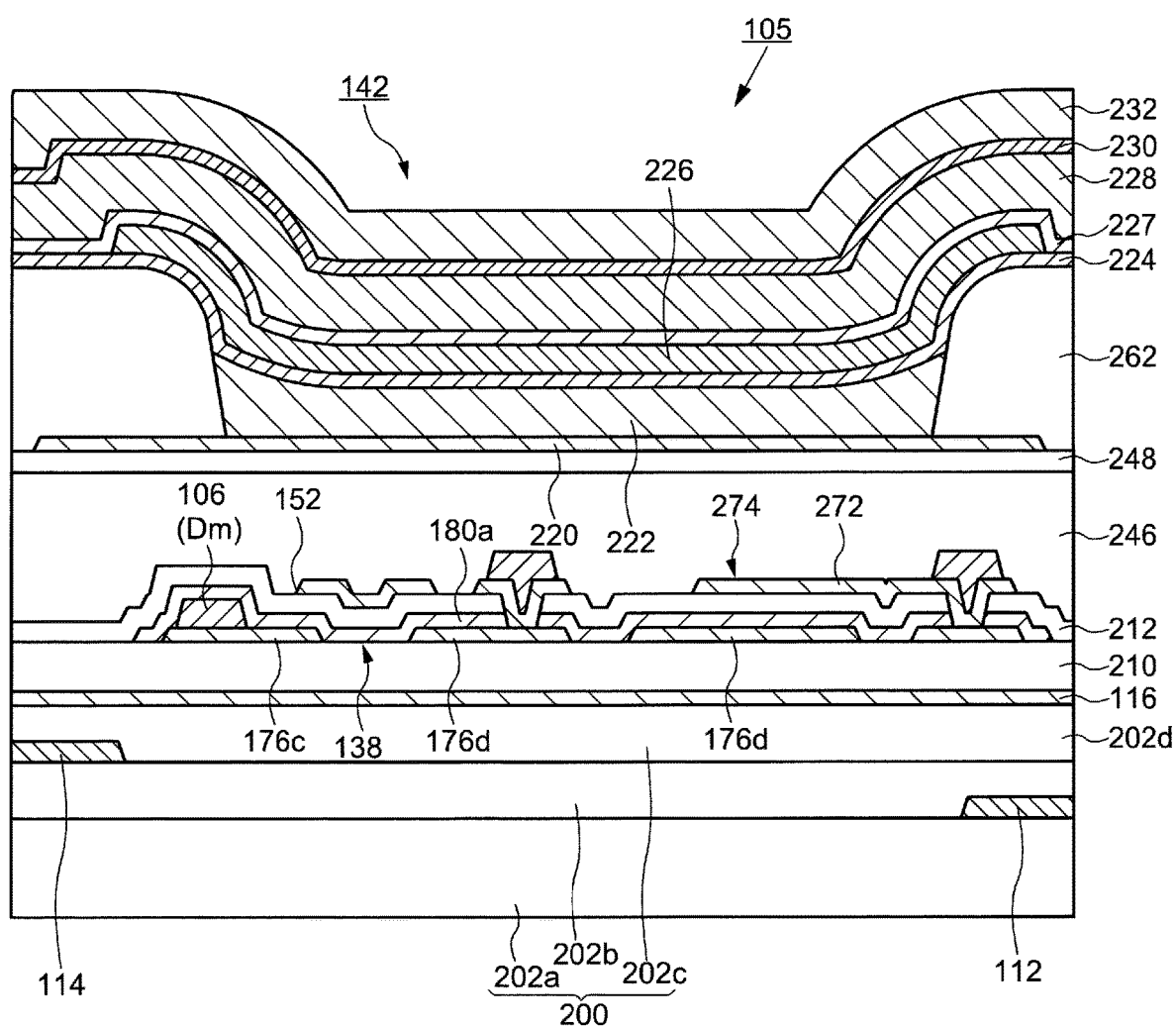
FIG. 53 is a cross-sectional view of a sub-pixel of a display device with a touch and fingerprint sensor according to an embodiment of the present invention.

FIG. 52 shows a planar layout of the sub-pixel 105 shown in FIG. 51, and FIG. 53 shows a partial cross-sectional structure of the sub-pixel 105, showing the first transistor 138, the second capacitance element 274, and the EL element 142. The second capacitive element 274 has a structure in which a second capacitance electrode 272 and the fourth metal oxide conductive layer 176*d* extending from the first transistor 138 overlap across the second insulating layer 212. The second capacitance electrode 272 can be formed with the same layer as the second gate electrode 151 of the drive transistor 136, so that it is not necessary to add a new layer and can be formed without increasing the number of photomasks.

Figure 54:
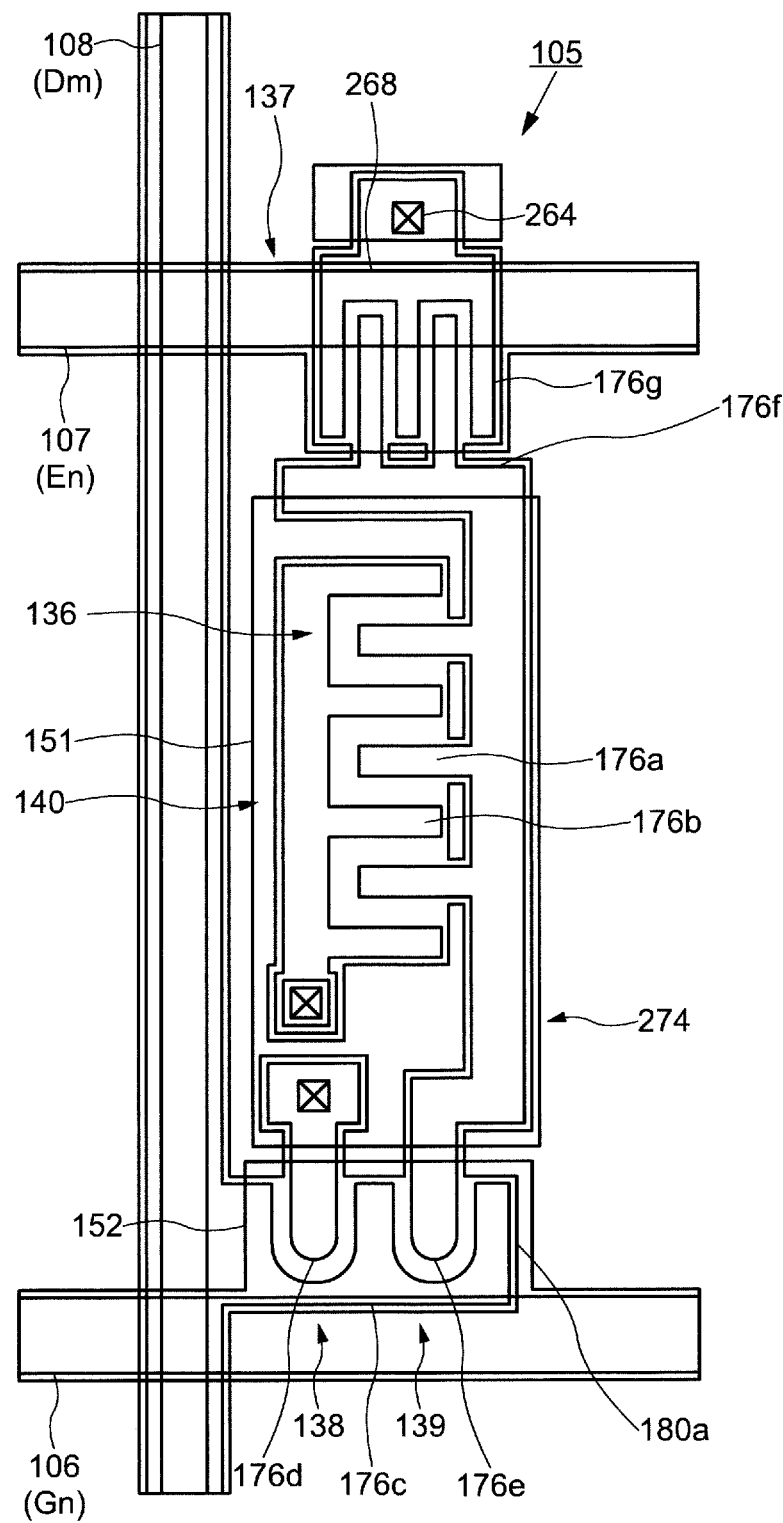
FIG. 54 is an example of a planar layout of a drive transistor, a select transistor, a capacitive element, and an EL element that constitutes a sub-pixel of a display device with a touch and fingerprint sensor according to an embodiment of the present invention.
Figure 55:
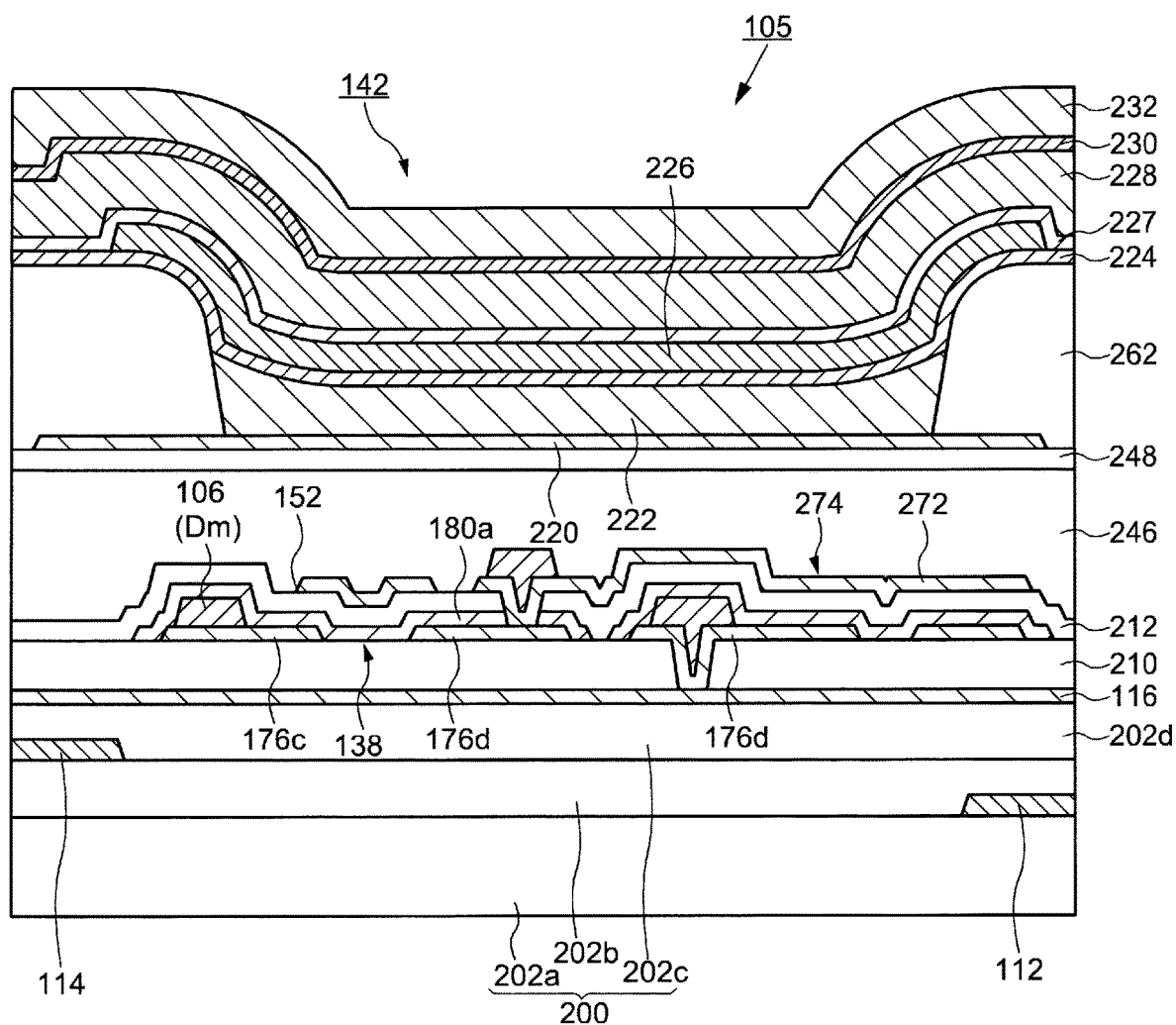
FIG. 55 is a cross-sectional view of a sub-pixel of a display device with a touch and fingerprint sensor according to an embodiment of the present invention.

As shown in the layout diagram of sub-pixel 105 in FIG. 54 and the partial cross-sectional view of sub-pixel 105 in FIG. 55, the second capacitive element 274 may be formed by disposing the second gate electrode 151 of the drive transistor 136 connected to the drain of the light emission control transistor 137 and the fourth metal oxide conductive layer 176*d* extending from the first transistor 138, with the second insulating layer 212 in between.

As described above, by providing the second capacitive element 274, it is possible to suppress the voltage fluctuation of the capacitive element 140 due to the gate voltage fluctuating by ΔVgd when the selective transistor 138 is turned off due to the gate-drain capacitance Cgd. This embodiment can be implemented in combination with the display device with touch and fingerprint sensors shown in the first embodiment as appropriate.

Ninth Embodiment

This embodiment shows an example of a light-extraction structure of the EL element 142 disposed in the display device with the touch and fingerprint sensor 100.

Figure 56:
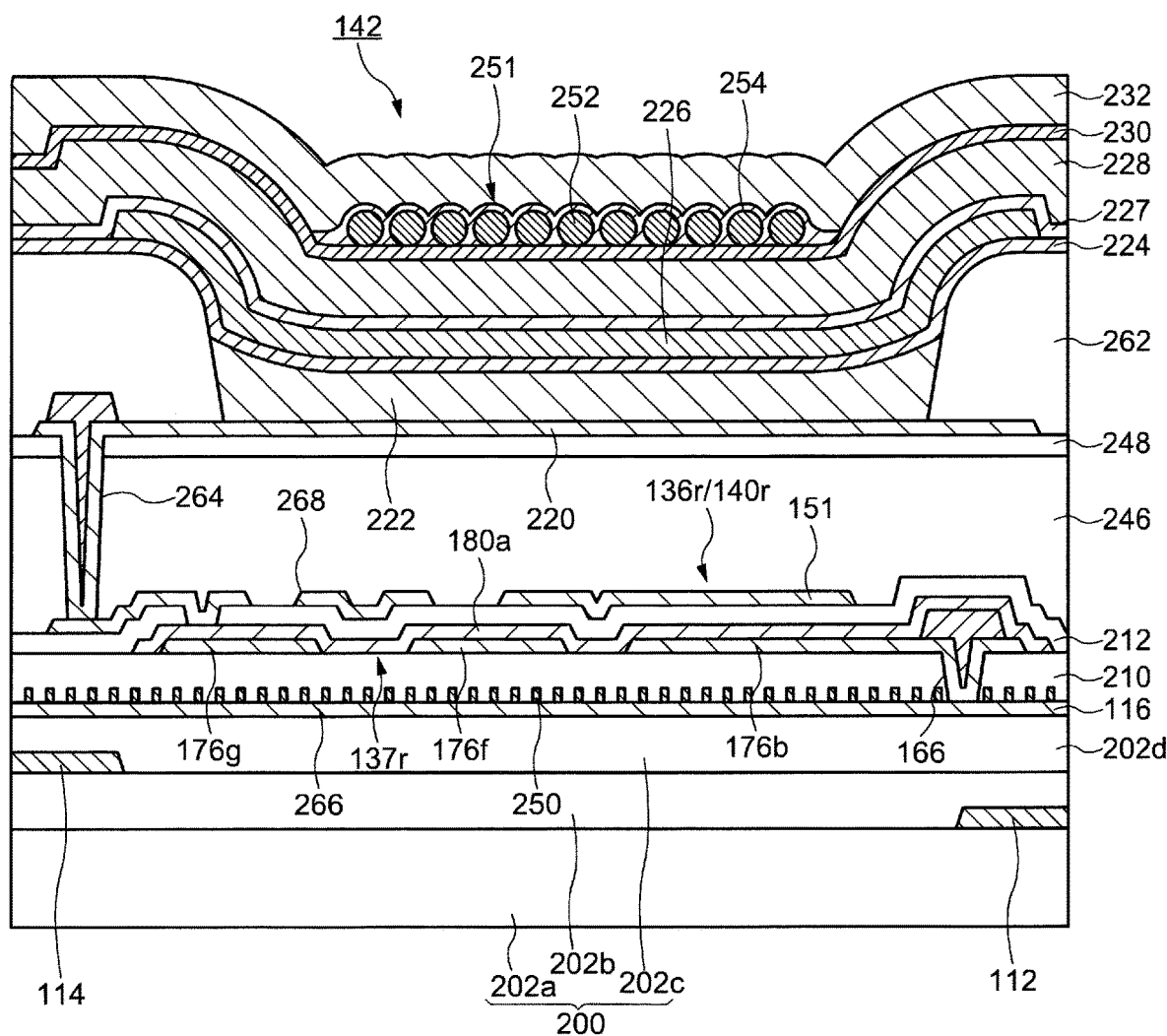
FIG. 56 is a cross-sectional view of a sub-pixel of a display device with a touch and fingerprint sensor according to an embodiment of the present invention, and shows a structure with a wire-grid polarizer and a light scattering layer.

FIG. 56 shows a cross-sectional structure of the sub-pixel 105 in the present embodiment. The sub-pixel 105 according to the present embodiment has a structure in which a wire-grid polarizer 250 is disposed on the side where the EL element 142 emits light. For example, the wire-grid polarizer 250 is disposed between the transparent resin substrate 200 with first sensor electrode 112 and second sensor electrode 114 and the EL element 142. FIG. 56 shows a cross-sectional structure of the sub-pixel 105 in the present embodiment. The sub-pixel 105 according to the present embodiment has a structure in which a wire-grid polarizer 250 is disposed on the side where the EL element 142 emits light. For example, the wire-grid polarizer 250 is disposed between the transparent resin substrate 200 with first sensor electrode 112 and second sensor electrode 114 and the EL element 142.

Since the EL element 142 emits light to the side of the transparent resin substrate 200, the first electrode 220 is formed by a transparent conductive film and the second electrode 232 is formed by a metal film. The EL element 142 shown in the present embodiment further has a structure in which a light scattering layer 251 is disposed between the electron injection layer 230 and the second electrode 232.

The light scattering layer 251 is formed by applying a transparent adhesive ink 254 containing transparent light scattering beads 252 onto the electron injection layer 230. For example, the transparent adhesive ink 254 including transparent light scattering beads 252 can be applied to the area of the sub-pixel 105 by a printing method such as ink jet printing to form the light scattering layer 251.

Figure 58:
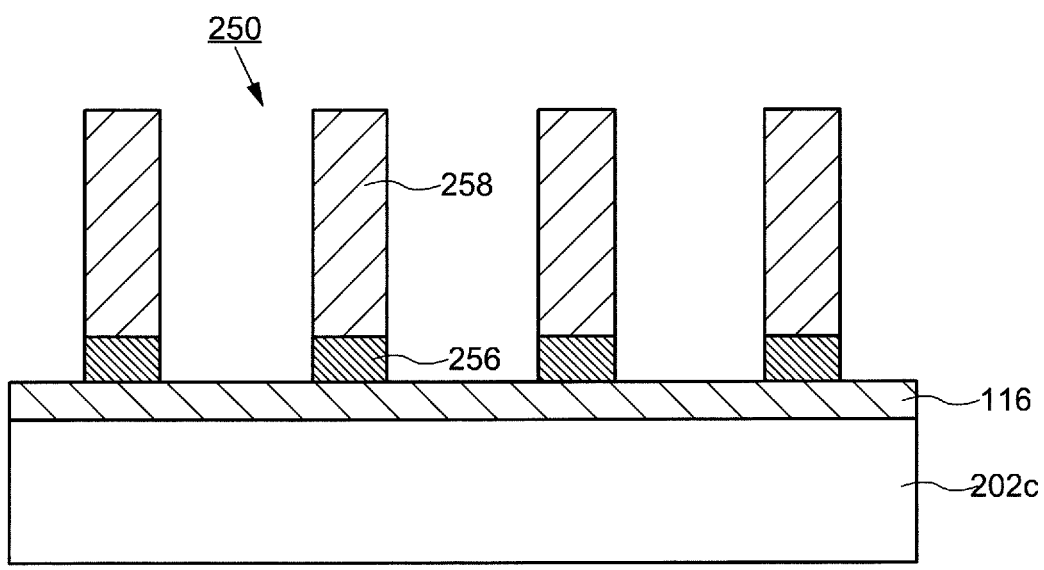
FIG. 58 is a cross-sectional configuration of a wire-grid polarizer disposed on a display part of a display device with a touch and fingerprint sensor according to an embodiment of the present invention.

FIG. 58 shows the detailed construction of the wire-grid polarizer 250. The wire-grid polarizer 250 has a structure in which the fine wire patterns are periodically arranged. The fine wire pattern is formed of fine metal wires 258 formed of aluminum (Al), aluminum-silver alloy (AlAg), silicon or a neodymium added aluminum alloy (Al—Si, Al—Nd), and the like. A light-absorbing layer 256 that absorbs visible light may be disposed on the shield electrode 116 side of the fine metal wires 258. The light absorbing layer 256 is preferably formed of a semiconductor material having a visible light absorbing band such as silicon (Si), germanium (Ge), silicon germanium (SiGe), or a high melting point metal such as chromium (Cr), cobalt (Co), nickel (Ni), tantalum (Ta), molybdenum (Mo), titanium (Ti), and niobium (Nb) and silicon. The fine metal wires 258 have a width of 100 nm or less, preferably 70 nm or less, a thickness of 100 nm or more, preferably 200 nm or more, and are arranged at a pitch of less than half the wavelength of visible light, (for example, 200 nm or less). Accordingly, although the glossy surface of the metal is visually visible, the light absorbing layer 256 is disposed over the metal thin line 258 on the viewing surface of the wire-grid polarizer 250, thereby preventing the display screen from being mirrored.

Figure 59:
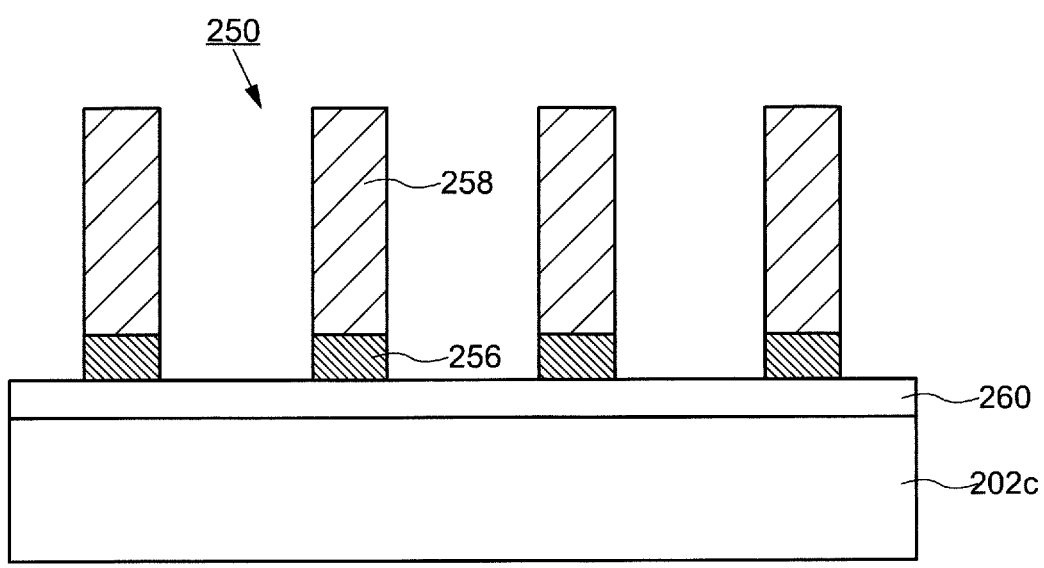
FIG. 59 is a cross-sectional configuration of a wire-grid polarizer disposed on a display part of a display device with a touch and fingerprint sensor according to an embodiment of the present invention.

FIG. 59 shows an example of a wire-grid polarizer 250 on an insulating layer 260. The fine metal wires 258 constituting the wire-grid polarizer 250 can also serve as the shield electrode 116 because it is disposed at a pitch of less than half the wavelength of visible light (for example, 200 nm or less). At this case, it is preferred that the fine metal wires 258 be controlled at a constant potential (for example, a grounding potential) as well as the shield electrode 116.

Figure 68:
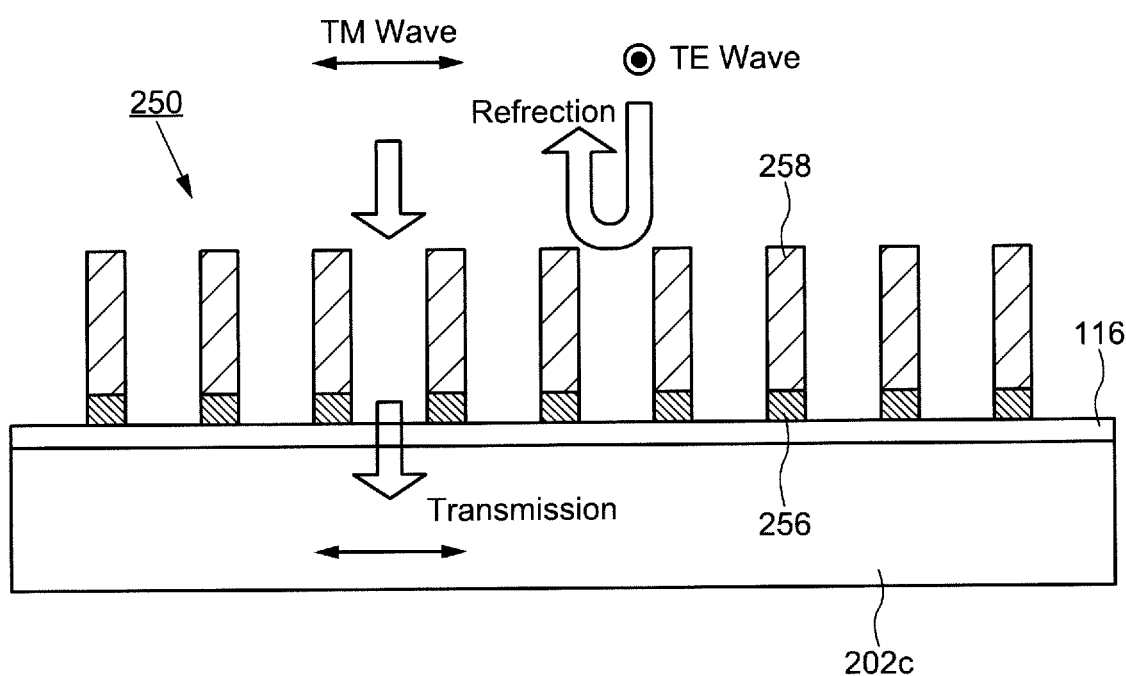
FIG. 68 is a cross-sectional structure and operating principles of a wire-grid polarizer disposed on the display part of a display device with a touch and fingerprint sensor according to an embodiment of the present invention.

The wire-grid polarizer 250 is a linear polarizer and has a transmission polarization axis and a reflection polarization axis. As shown in FIG. 68, it is possible to transmit the polarization component (TM wave) parallel to the transmission polarization axis of the light emitted from the EL element 142 to be emitted from the transparent resin substrate 200 and to reflect the polarization component (TE wave) parallel to the reflection polarization axis by providing the wire-grid polarizer 250. That is, half of the light emitted from the EL element 142 is reflected at the wire-grid polarizer 250 and again incident on the EL element 142. The light re-incident on the EL element 142 is scattered by the light scattering layer 251 so that the polarization axis is random. It is then emitted again from the EL element 142, some of which is transmitted through the wire-grid polarizer 250 and exits outward, and the rest of which is reflected. It is possible to provide the wire-grid polarizer 250 and the light scattering layer 251 so that the light emitted from the EL element 142 is reflected multiple times and the polarization axis of the emitted light converges in a single direction.

Figure 60:
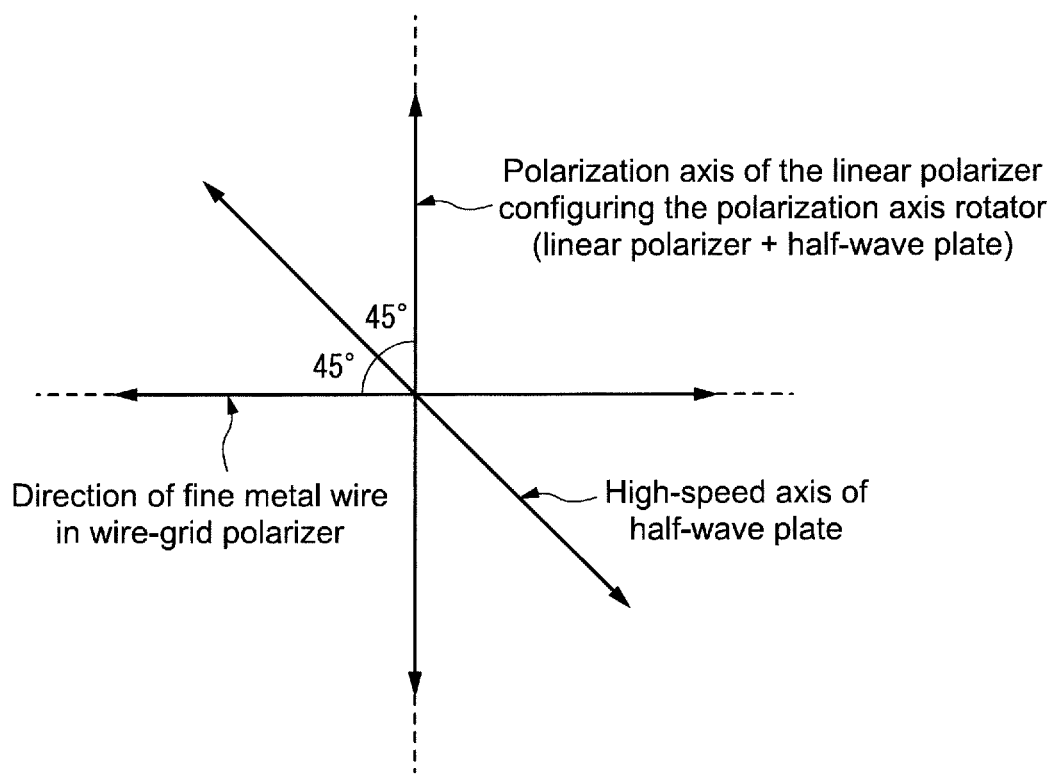
FIG. 60 is a diagram of a relationship between a wire-grid polarizer and a polarization axis of a polarization axis rotator

Although not shown in FIG. 56, the display device with the touch and fingerprint sensor 100 is disposed with a polarizing axis rotator on the display screen side for enhanced contrast. The polarization rotator combines a ½ phase difference plate with a straight polarization plate and a ½ phase difference delay axis is inclined by 45 degrees. In this case, the linear polarization axis of the polarization rotator of the polarization axis is inclined at 45 degrees relative to the transmission polarization axis of the wire-grid polarizer 250, as shown in FIG. 60, thereby greatly improving the extraction efficiency of the light emitted from the EL element 142.

Figure 61:
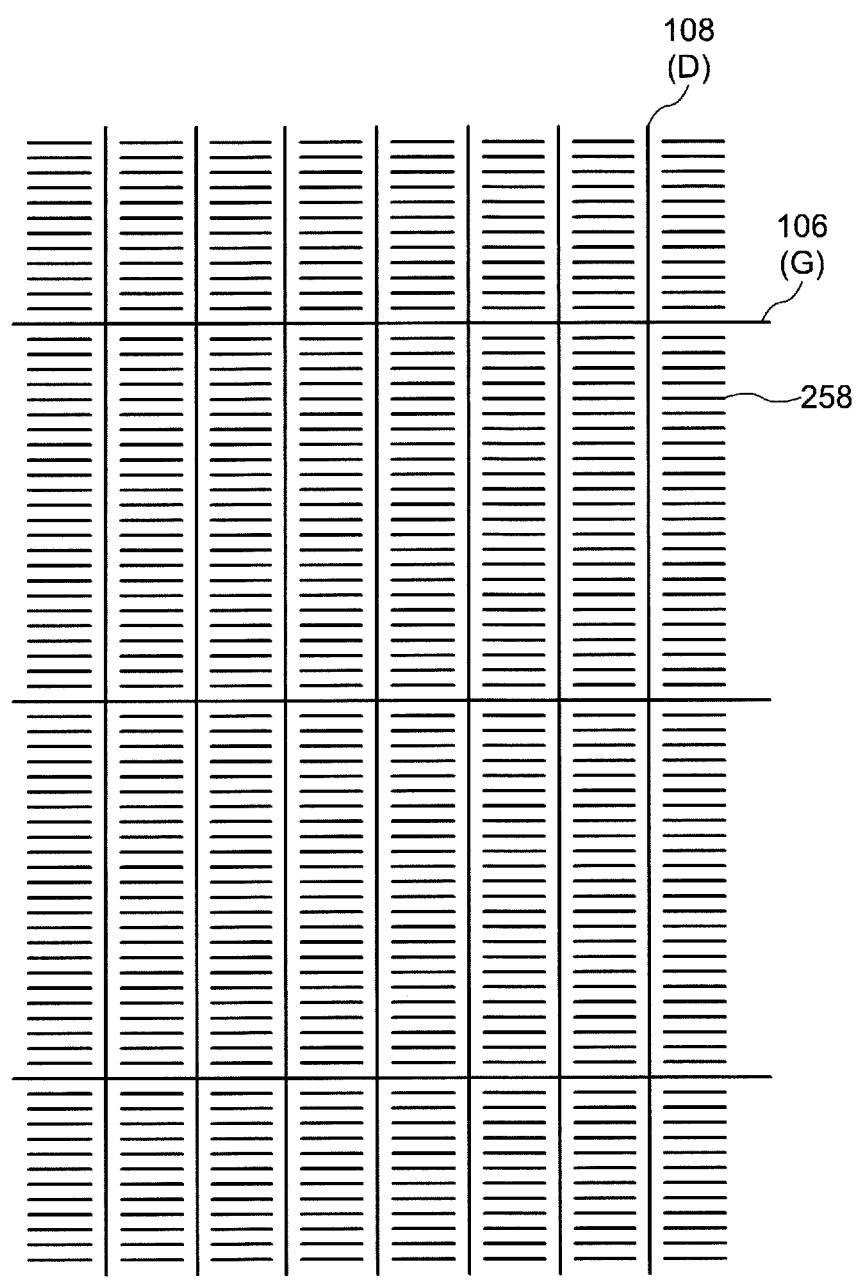
FIG. 61 is an arrangement of a wire-grid polarizer on a display part of a display device with a touch and fingerprint sensor according to an embodiment of the present invention.
Figure 62:
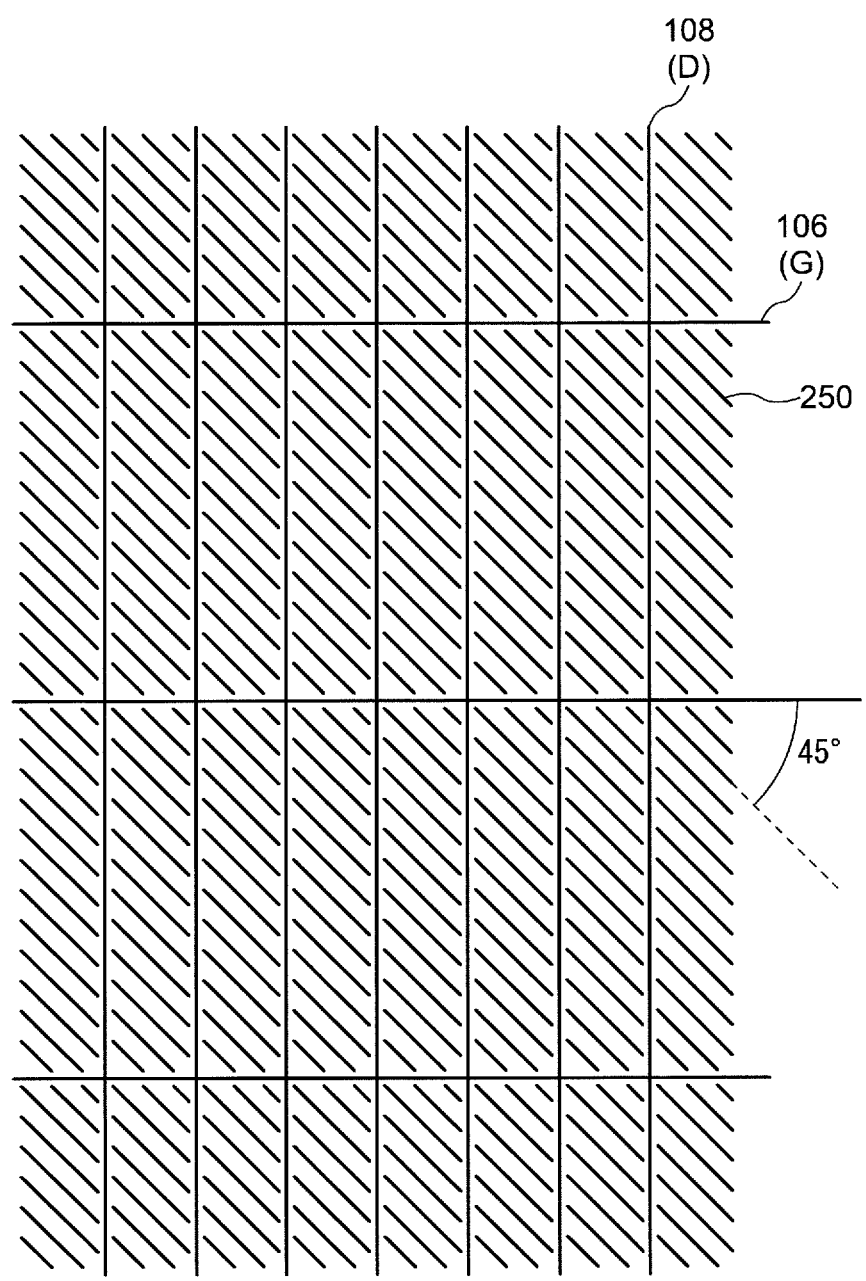
FIG. 62 is an arrangement of a wire-grid polarizer on a display part of a display device with a touch and fingerprint sensor according to an embodiment of the present invention.

The direction of the transmission polarization axis of the wire-grid polarizer 250 can be freely set by changing the direction in which the metal wires 258 extend. FIG. 61 shows an example in which patterns of the fine metal wires 258 are disposed in areas surrounded by the scanning signal line 106 and the data signal line 108 (areas of sub-pixel 105). As shown in FIG. 61, the fine metal wires 258 have a pattern that extends in a direction parallel to the direction in which the scanning signal line 106 extends, so that the transmission polarization axis is arranged in a direction parallel to the direction in which the data signal line 108 extends. Note that although not shown in the figure, the fine metal wires 258 may have patterns extending in a direction parallel to the direction in which the data signal line 108 extends. FIG. 62 shows an example where the pattern of the fine metal wires 258 is disposed at a predetermined angle to the scanning signal lines 106 and the data signal lines 108, so that the transmitted polarization axis is disposed in a direction perpendicular to the longitudinal direction of the fine metal wires 258.

Figure 57:
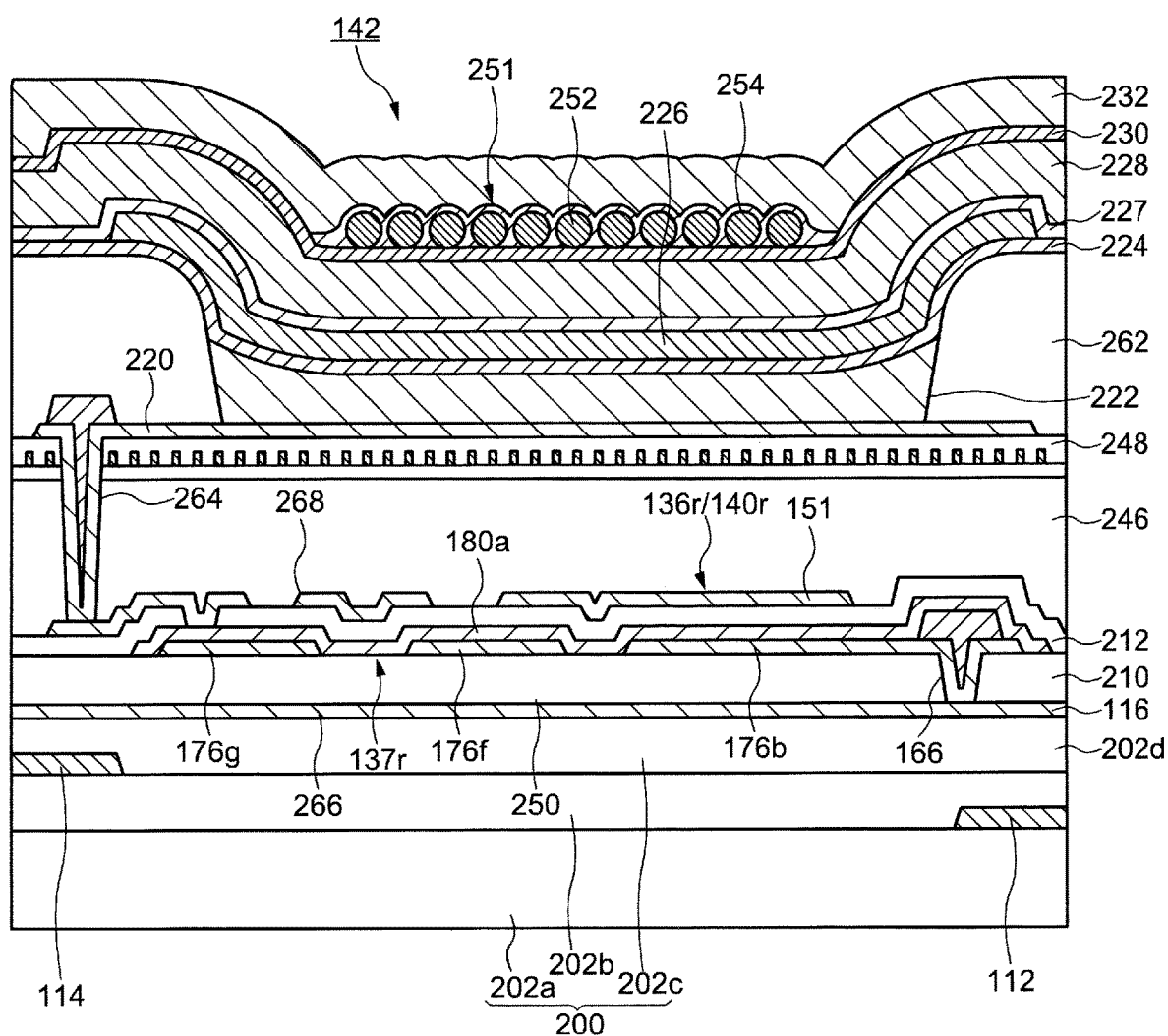
FIG. 57 is a cross-sectional view of a sub-pixel of a display device with a touch and fingerprint sensor according to an embodiment of the present invention, and shows a structure with a wire-grid polarizer and a light scattering layer.

FIG. 57 shows an example of a wire-grid polarizer 250 embedded in a planarization layer 246. The fine metal wires 258 are formed with a thickness of about 100 nm to 200 nm. It is possible to arrange the wire-grid polarizer 250 in the form of a so-called in-cell structure and still provide the EL element 142 without interfering with the planarity, by arranging the metallic wires 258 so that they are embedded in the planarization layer 246.

Figure 66:
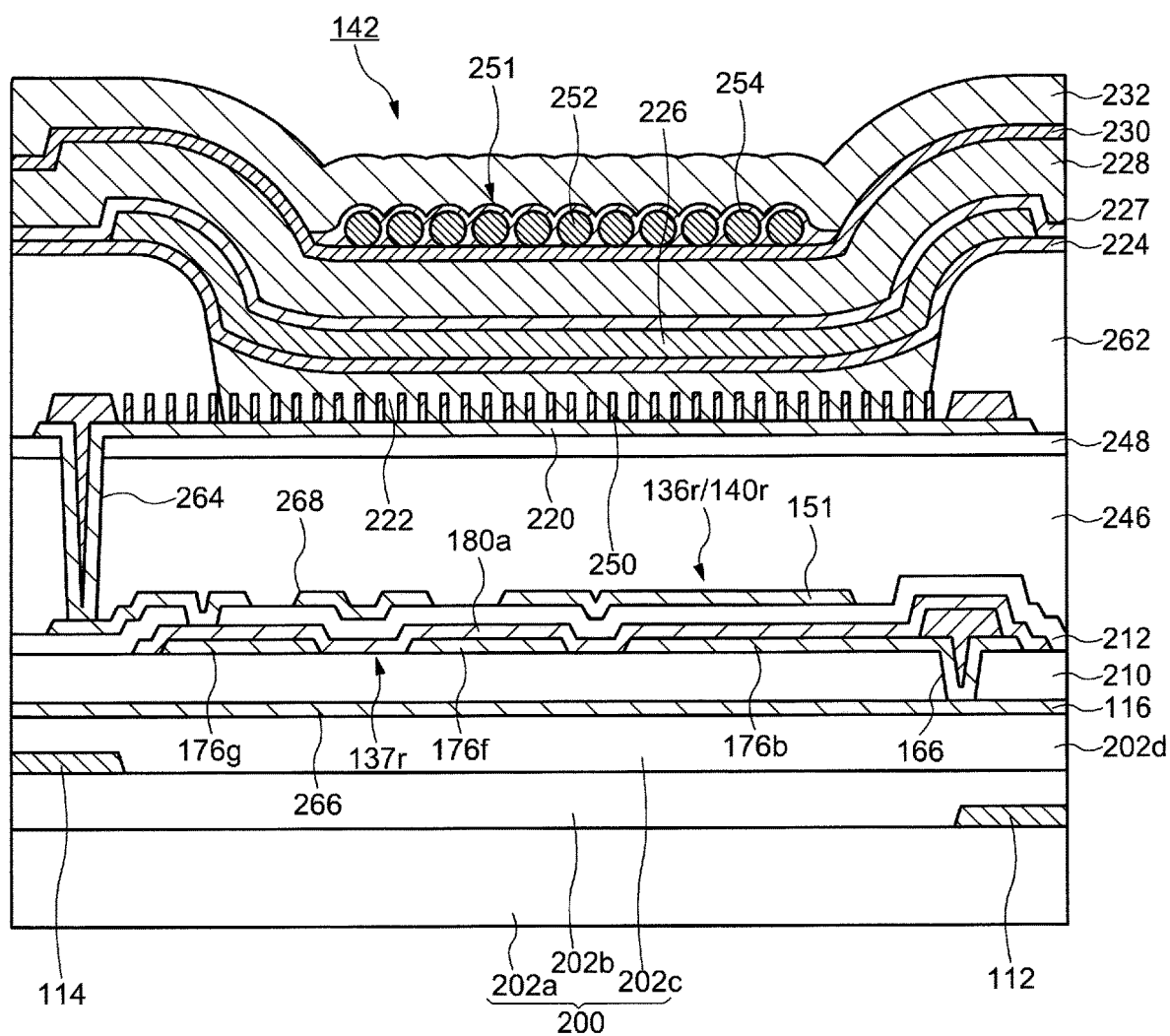
FIG. 66 is a cross-sectional view of a sub-pixel of a display device with a touch and fingerprint sensor according to an embodiment of the present invention, and shows a structure with a wire-grid polarizer and a light scattering layer.

FIG. 66 shows an example of the wire-grid polarizer 250 on the top surface of the first electrode 220. The fine metal wires 258 and the light-absorbing layer 256 included in the wire-grid polarizer 250 are formed on top of the transparent conductive layer forming the first electrode 220. The fine metal wires 258 and the light absorbing layer 256 form an uneven structure on the top surface of the first electrode 220, but the electron transport layer 222 is disposed with a coated material to embed the fine metal wires 258 so that it does not affect the light emitting layer 226 and prevents a short circuit with the second electrode 232.

Figure 67:
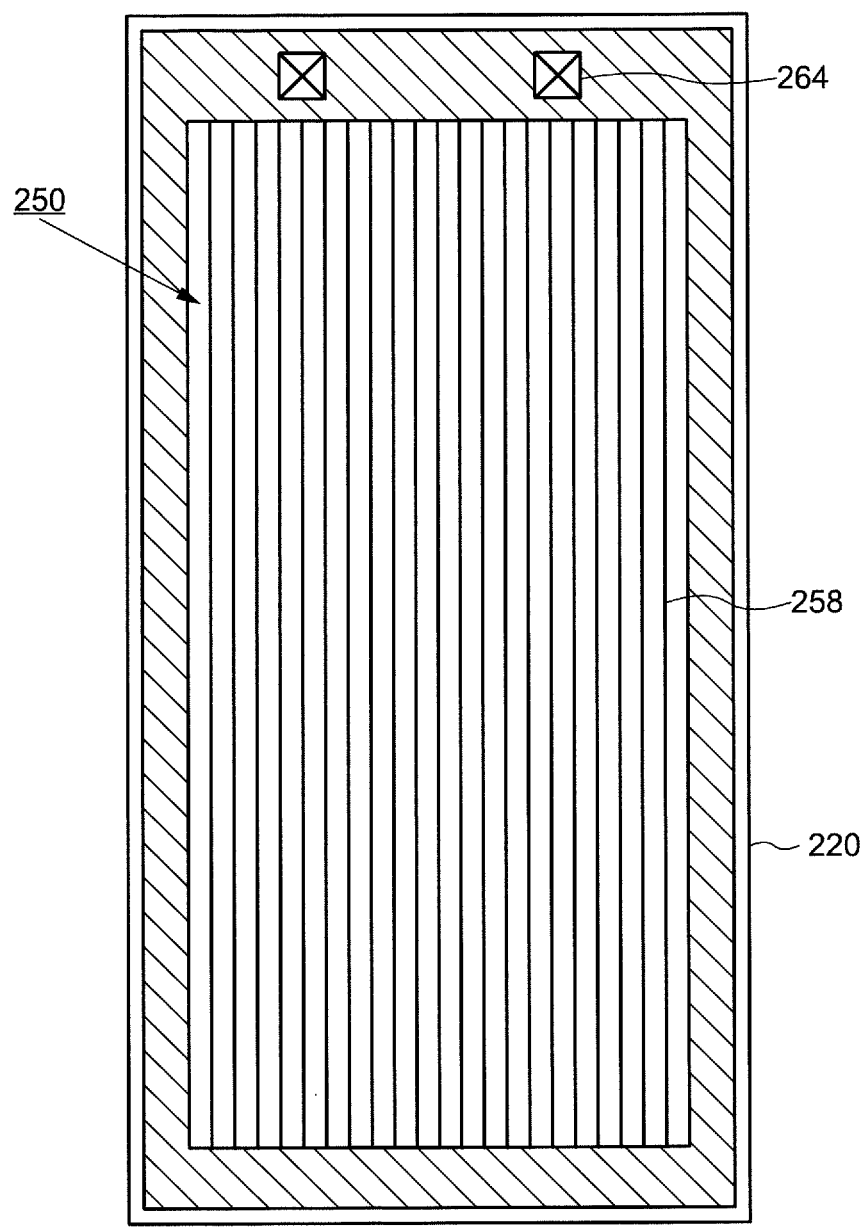
FIG. 67 is an arrangement of a wire-grid polarizer on a display part of a display device with a touch and fingerprint sensor according to an embodiment of the present invention.

FIG. 67 shows a plan view of the first electrode 220 and the metal fine wires 258. The fine metal wires 258 are disposed on top of the transparent conductive film that forms the first electrode 220. The fine metal wires 258 is formed to extend from the side of one end of the first electrode 220 to the side of the other end. As shown in FIG. 67, a metal pattern surrounding the periphery of the first electrode 238 is disposed with the metal film forming the metallic thin wire 258, and the transparent conductive film (first electrode 220) can be made less resistant by connecting the fine metal wires 258.

As shown in this embodiment, the wire-grid polarizer 250 is disposed in the layer forming the display device with the touch and fingerprint sensor 100, so that even if the polarization axis rotating plate is disposed to improve contrast, the light extraction efficiency can be greatly improved.

Tenth Embodiment

This embodiment shows further aspects of the sealing structure and drawer wiring structure shown in the first embodiment.

Figure 63A:
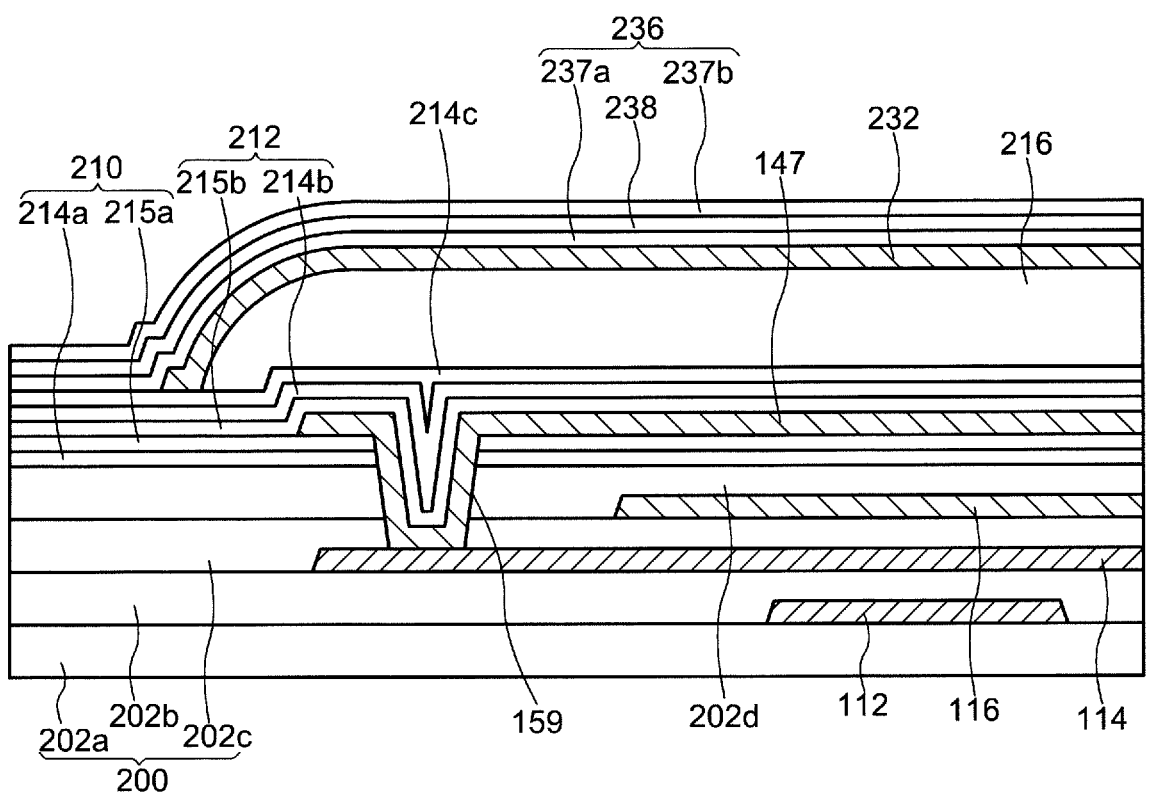
FIG. 63A is an example of a connection structure between a first sensor electrode and a drawer wiring of a display device with a touch and fingerprint sensor according to an embodiment present invention, and shows a connection structure between a second sensor electrode and a drawer wiring formed in the same layer as a data signal line.

FIG. 63A shows a configuration in which the second sensor electrode 114 is connected to some wiring or circuit on the transparent resin substrate 200 by the drawer wiring 147 formed of the same layer as the data signal line 108. The drawer wiring 147 is disposed on the first insulating layer 210 and has a structure connected to the contact hole 159 through the first insulating layer 210, the fourth transparent resin layer 202*d*, and the third transparent resin layer 202*c*. The second insulating layer 212 is disposed on the first drawer wiring 147 and the first contact hole 159 and is further covered with a silicon nitride film 214*c* to prevent moisture from entering from the outside.

Figure 63B:
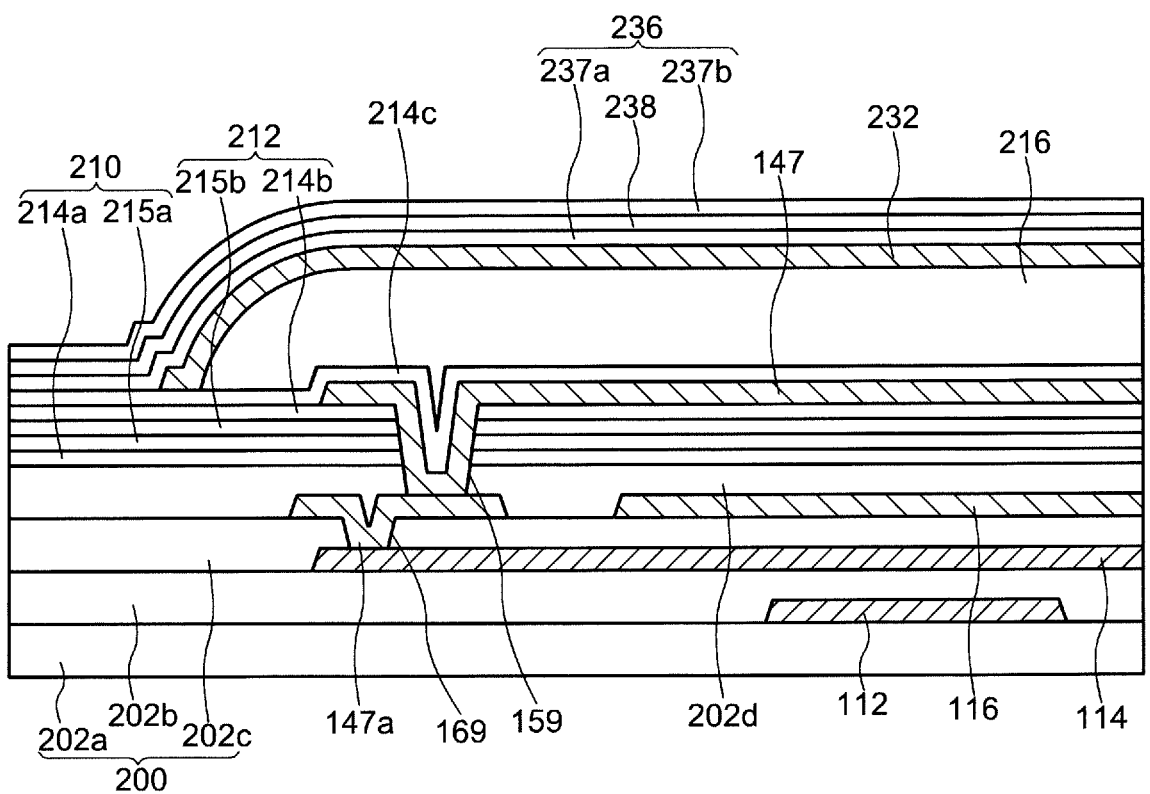
FIG. 63B is an example of a connection structure between a first sensor electrode and a drawer wiring of a display device with a touch and fingerprint sensor according to an embodiment present invention, and shows a connection structure between a second sensor electrode, and a drawer wiring formed in the same layer as a scanning signal line.

FIG. 63B shows a configuration in which the second sensor electrode 114 is connected to a wiring or circuit on the transparent resin substrate 200 by the drawer wiring 147 formed of the same layer as the scanning signal line 106 or the second scanning signal line 107. The drawer wiring 147 is disposed on the second insulating layer 212 and is connected to the first drawer wiring 147*a* formed on the third transparent resin layer 202*c* in the same layer as the shield electrode 116 by the contact hole 159 passing through the second insulating layer 212, the first insulating layer 210, and the fourth transparent resin layer 202*d*. Further, the first drawer wiring 147*a* is connected to the second sensor electrode 114 by the contact hole 169 formed in the third transparent resin layer 202*c*. Such structures also allow the second sensor electrode 114 to connect to wirings or circuitry on the transparent resin substrate 200.

Figure 64A:
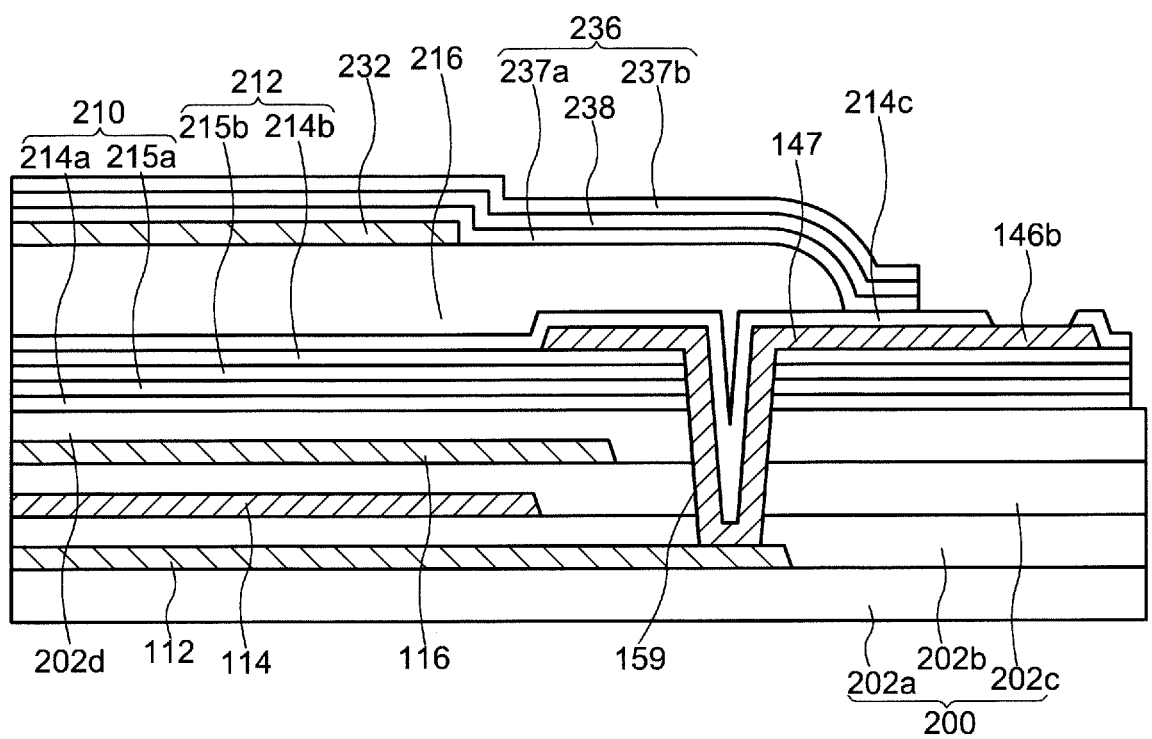
FIG. 64A is an example of a connection structure between a first sensor electrode and a drawer wiring of a display device with a touch and fingerprint sensor according to an embodiment present invention, and shows a connection structure between a first sensor electrode, and a drawer wiring formed in the same layer as a scanning signal line.

FIG. 64A shows a configuration in which the drawer wiring 147 is disposed on the second insulating layer 212 with respect to the structure shown in FIG. 22A. The drawer wiring 147 is formed of the same layer as the second scanning signal line 107. The overlying of the drawer wiring 147 with the silicon nitride film 214*c* allows the drawer wiring 147 to form a structure that is in intimate contact with the sealing layer 236, even though the drawer wiring 147 has an outwardly extending structure to form the second connecting terminal 146*b*, thereby increasing reliability.

Figure 64B:
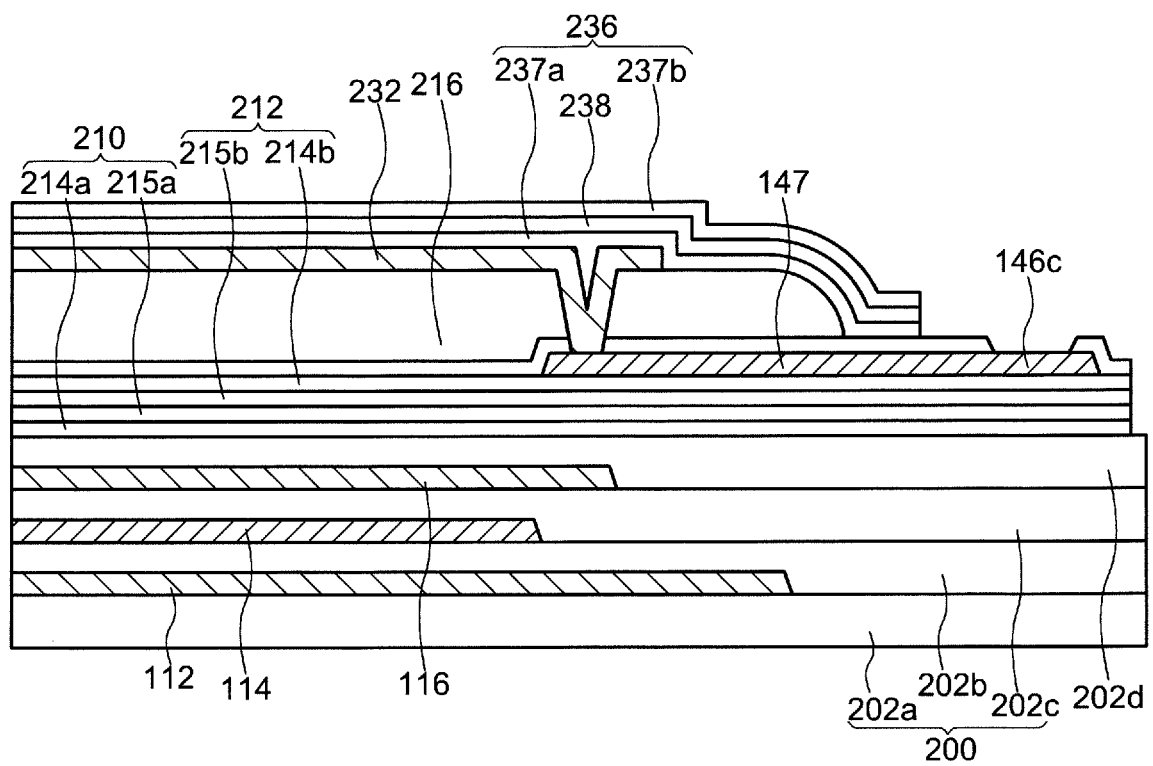
FIG. 64B is an example of a connection structure between a first sensor electrode and a drawer wiring of a display device with a touch and fingerprint sensor according to an embodiment present invention, and shows a connection structure between a second electrode of an organic EL element and a drawer wiring.

FIG. 64B shows a connection structure between the second electrode 232 and the third connecting terminal 146*c*. The second electrode 232 is drawn out to the end of the transparent resin substrate 200 and connected to the drawer wiring 147 formed in the same layer as the second scanning signal line 107. The drawer wiring 147 has a structure that extends outward to form the third connecting terminal 146*c*, but even in this structure, the drawer wiring 147 is covered with the silicon nitride film 214*c*, so that a structure that adheres closely to the sealing layer 236 can be formed and reliability can be enhanced.

Figure 65A:
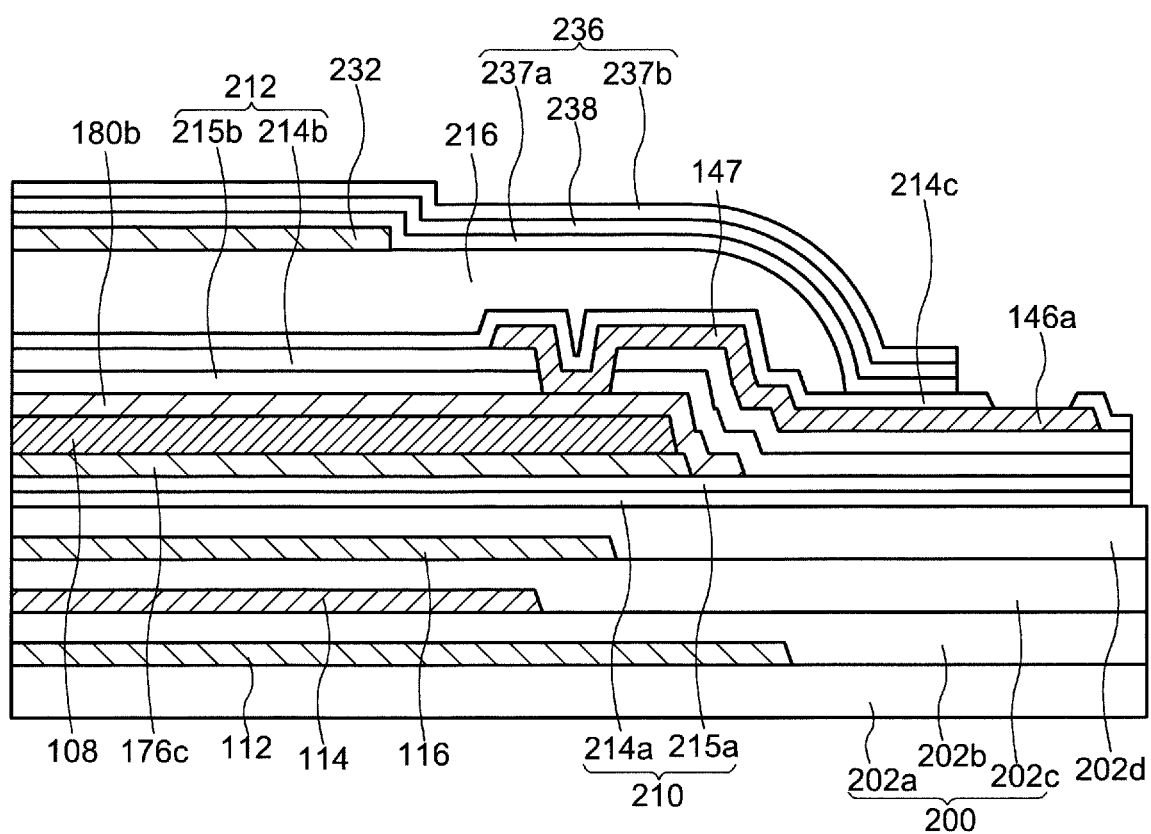
FIG. 65A is an example of a connection structure between a first sensor electrode and a drawer wiring of a display device with a touch and fingerprint sensor according to an embodiment present invention, and shows a connection structure between a data signal line and a drawer wiring.

FIG. 65A shows a connecting structure of the data signal line 108 and the first connecting terminal 146*a*. The data signal line 108 is drawn to the end of the transparent resin substrate 200 and connected to the drawer wiring 147 formed of the same layer as the second scanning signal line 107. Although the drawer wiring 147 has an outer extending structure to form the first connecting terminal 146*a*, the drawer wiring 147 can also be covered with the silicon nitride film 214*c* to form a structure that is in close contact with the sealing layer 236, thereby enhancing reliability.

Figure 65B:
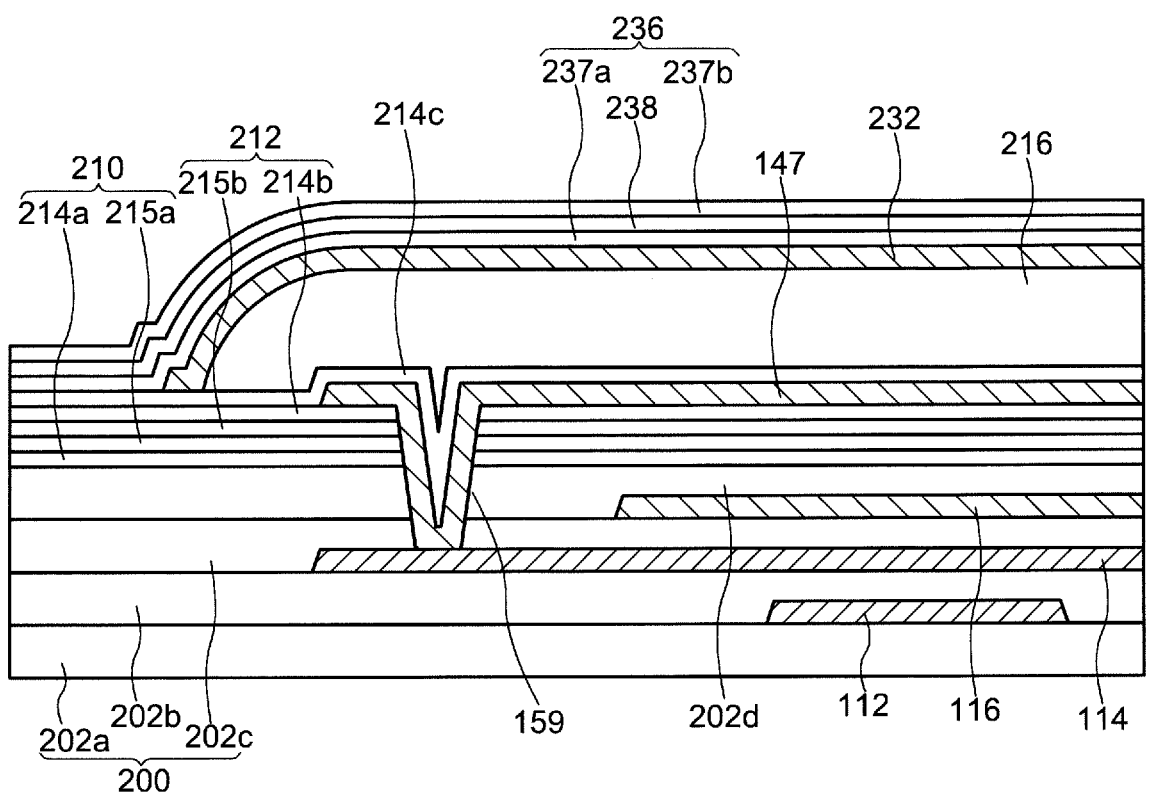
FIG. 65B is an example of a connection structure between a first sensor electrode and a drawer wiring of a display device with a touch and fingerprint sensor according to an embodiment present invention, and shows a connection structure between a second sensor electrode and a drawer wiring.

FIG. 65B shows a configuration in which the drawer wiring 147 is directly connected to the second sensor electrode 114 by a contact hole 159 passing through the second insulating layer 212, the first insulating layer 210, the fourth transparent resin layer 202*d*, and the third transparent resin layer 202*c* with respect to FIG. 63B. Such an arrangement also allows the second sensor electrode 114 to connect to wirings or circuitry on the transparent resin substrate 200.

In the structures shown in FIG. 16A, FIG. 16B, FIG. 19A, FIG. 19B, FIG. 21A, FIG. 21B, FIG. 49, FIG. 53, and FIG.

55, when external light enters the display panel from the outside, it is reflected by the various metals that make the display panel and is emitted again to the outside, which may cause a significant decrease in contrast. To prevent such a reduction in contrast, a circular polarizer (an optical member combining a linear polarizer and a quarter-wave plate) is actually installed in close contact with the transparent resin layer 202a, but is not shown in the drawings above.

FIG. 56, FIG. 57, and FIG. 66 show display panels with built-in wire-grid polarizers 250 to improve light extraction efficiency, but when external light enters the panel, it is reflected by the various electrodes and wiring formed by the metal materials that make up the display panel and is emitted again to the outside world, resulting in a significant drop in contrast. To prevent such a reduction in contrast, it is preferable to provide a light-absorbing layer similar to the light-absorbing layer 256 that constitutes the wire-grid polarizer 250 on the lower layer of the electrodes and wiring formed by the metallic materials that constitute the display panel, but this layer is omitted in the above drawing.

What is claimed is:

1. A display device with touch and fingerprint sensor, comprising:
   a transparent resin substrate laminated with a first transparent resin layer, a second transparent resin layer, and a third transparent resin layer,
   a plurality of first sensor electrodes extending in a first direction and a plurality of second sensor electrodes extending in a second direction intersecting the first direction;
   a plurality of scanning signal lines extending in the second direction;
   a plurality of pixels overlapping the plurality of second sensor electrodes;
   a select transistor disposed in each of the plurality of pixels; and
   a shield electrode between the select transistor disposed in each of the plurality of pixels and the plurality of second sensor electrodes,
   wherein a gate electrode of the select transistor disposed in each of the plurality of pixels is connected to each of the plurality of scanning signal lines,
   wherein each of the plurality of scanning signal lines is connected to each of the plurality of second sensor electrodes,
   wherein the plurality of first sensor electrodes is disposed between the first transparent resin layer and the second transparent resin layer, and
   wherein the plurality of second sensor electrodes and the plurality of scanning signal lines are disposed between the second transparent resin layer and the third transparent resin layer.

2. The display device with a touch and fingerprint sensor according to claim 1, wherein each of the plurality of scanning signal lines is disposed in contact with each of the second sensor electrodes.

3. The display device with a touch and fingerprint sensor according to claim 2, further comprising at least one insulating layer between the gate electrode gate electrode of the select transistor disposed in each of the plurality of pixels and the plurality of scanning signal lines,
   wherein the gate electrode of the select transistor disposed in each of the plurality of pixels is connected to each of the plurality of scanning signal lines through each of contact holes in the at least one insulating layer.

4. The display device with a touch and fingerprint sensor according to claim 1, further comprising at least one insulating layer between the gate electrode of the select transistor disposed in each of the plurality of pixels and the plurality of scanning signal lines and the plurality of second sensor electrodes,
   wherein each of the plurality of scanning signal lines is connected to each of the plurality of second sensor electrodes through each of the contact holes in the at least one insulating layer.

5. The display device with a touch and fingerprint sensor according to claim 1, further comprising a light shielding layer,
   wherein the light shielding layer is disposed in contact with the plurality of second sensor electrodes.

6. The display device with a touch and fingerprint sensor according to claim 5, wherein the plurality of first sensor electrodes and the plurality of second sensor electrodes are translucent, and the plurality of scanning signal lines and the light shielding layer are composed of metal.

7. The display device with a touch and fingerprint sensor according to claim 5, further comprising a first drive circuit connected to the plurality of scanning signal lines and the second plurality of sensor electrodes,
   wherein the first drive circuit includes an output switching circuit for switching connections between the plurality of scanning signal lines and the plurality of second sensor electrodes.

8. The display device with a touch and fingerprint sensor according to claim 1, wherein the shield electrode includes a plurality of openings in each of the plurality of pixels,
   wherein the gate electrode of the select transistor disposed in each of the plurality of pixels is connected to the plurality of scanning signal lines via contact holes in each of the plurality of openings.

9. A display device with touch and fingerprint sensor, comprising:
   a transparent resin substrate laminated with a first transparent resin layer, a second transparent resin layer, and a third transparent resin layer,
   a plurality of first sensor electrodes extending in a first direction and a plurality of second sensor electrodes extending in a second direction intersecting the first direction;
   a plurality of scanning signal lines extending in the second direction;
   a plurality of pixels overlapping the plurality of second sensor electrodes;
   a select transistor disposed in each of the plurality of pixels; and
   a shield electrode between the select transistor disposed in each of the plurality of pixels and the plurality of second sensor electrodes,
   wherein the plurality of first sensor electrodes is disposed between the first transparent resin layer and the second transparent resin layer,
   wherein the plurality of second sensor electrodes and the plurality of scanning signal lines are disposed between the second transparent resin layer and the third transparent resin layer,
   wherein the shied electrode is disposed between the third transparent resin layer and the plurality of scanning signal lines,
   wherein the plurality of pixels configures a display part,
   wherein the shield electrode includes a plurality of openings in a region around the display part, and each of the plurality of second sensor electrodes is connected to each of the plurality of scanning signal lines via a contact hole in a region inside each of the plurality of openings.

10. The display device with a touch and fingerprint sensor according to claim 9, wherein gate electrode of the select transistor disposed in each of the plurality of pixels and the plurality of scanning signal lines are formed by same conductive layer and are disposed on a same layer.

11. The display device with a touch and fingerprint sensor according to claim 9, wherein the shield electrode includes a plurality of openings in each of the plurality of pixels,
wherein the gate electrode of the select transistor disposed in each of the plurality of pixels is connected to the plurality of scanning signal lines via contact holes in each of the plurality of openings.

12. A display device with touch and fingerprint sensor, comprising:
a transparent resin substrate laminated with a first transparent resin layer, a second transparent resin layer, and a third transparent resin layer,
a plurality of first sensor electrodes extending in a first direction and a plurality of second sensor electrodes extending in a second direction intersecting the first direction;
a plurality of scanning signal lines extending in the second direction;
a plurality of pixels overlapping the plurality of second sensor electrodes;
a select transistor disposed in each of the plurality of pixels; and
a shield electrode between the plurality of scanning signal lines and the plurality of second sensor electrodes; and
a first drive circuit outputting signals to the plurality of scanning signal lines and the plurality of second sensor electrodes,
wherein the first drive circuit includes an output switching circuit for switching connections between the plurality of scanning signal lines and the plurality of second sensor electrodes,
wherein the plurality of first sensor electrodes is disposed between the first transparent resin layer and the second transparent resin layer,
wherein the plurality of second sensor electrodes and the plurality of scanning signal lines are disposed between the second transparent resin layer and the third transparent resin layer,
wherein the output switching circuit is connected to each of the plurality of second sensor electrodes via each of contact holes arranged in the third transparent resin layer.

13. The display device with a touch and fingerprint sensor according to claim 12, wherein a number of the plurality of second sensor electrodes is the same as a number of the plurality of scanning signal lines.

14. The display device with a touch and fingerprint sensor according to claim 12, wherein a number of the plurality of second sensor electrodes is half a number of the plurality of scanning signal lines.

* * * * *